(12) United States Patent
Qasem et al.

(10) Patent No.: US 11,142,468 B2
(45) Date of Patent: Oct. 12, 2021

(54) DESALINATION SYSTEMS, APPARATUS, AND RELATED METHODS FOR USE WITH SALINE FLUIDS

(71) Applicant: King Fahd University of Petroleum and Minerals, Dhahran (SA)

(72) Inventors: Naef A. A. Qasem, Dhahran (SA); Syed M. Zubair, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 16/600,021

(22) Filed: Oct. 11, 2019

(65) Prior Publication Data
US 2021/0107807 A1    Apr. 15, 2021

(51) Int. Cl.
| | |
|---|---|
| C02F 1/26 | (2006.01) |
| C02F 1/16 | (2006.01) |
| C02F 1/28 | (2006.01) |
| C02F 103/08 | (2006.01) |
| C02F 1/14 | (2006.01) |

(52) U.S. Cl.
CPC ............ C02F 1/265 (2013.01); C02F 1/16 (2013.01); C02F 1/28 (2013.01); C02F 1/14 (2013.01); C02F 2103/08 (2013.01)

(58) Field of Classification Search
CPC .... C02F 1/14; C02F 1/16; C02F 1/265; C02F 1/28; C02F 2103/08
See application file for complete search history.

(56) References Cited

FOREIGN PATENT DOCUMENTS

| CN | 202117113 U | 1/2012 |
|---|---|---|
| CN | 102328965 B | 1/2013 |
| CN | 106564979 A | 4/2017 |

OTHER PUBLICATIONS

Capocelli, et al. ; Process analysis of a novel humidification-dehumidification-adsorption (HDHA) desalination method ; Desalination 429 ; pp. 155-166 ; 2018 ; 12 Pages.

Rostamzadeh, et al. ; Performance assessment and optimization of a humidification dehumidification (HDH) system driven by absorption-compression heat pump cycle ; Desalination 447 ; pp. 84-101 ; 2018 ; 18 Pages.

Qasem, et al. ; Performance evaluation of a novel hybrid humidification-dehumidification (air-heated) system with an adsorption desalination system ; Desalination 461 ; pp. 37-54 ; 2019 ; 18 Pages.

*Primary Examiner* — Brian A McCaig
(74) *Attorney, Agent, or Firm* — Oblon, McClelland, Maier & Neustadt, L.L.P.

(57) ABSTRACT

Desalination systems, apparatus, and related methods for use with saline fluids are disclosed. A disclosed desalination system includes an HDH system including a humidifier and a dehumidifier that, together, are configured to process a first saline fluid to produce freshwater in the dehumidifier. The desalination system also includes an AD system operatively coupled to the HDH system. The AD system includes a first bed, a second bed, an evaporator, and a condenser that, together, are configured to process a second saline fluid to produce freshwater in the condenser. The condenser is configured to transfer heat exhausted by the first or second bed from a vapor, obtained from the second saline fluid, to air circulating through the humidifier and the dehumidifier to drive the HDH system. The evaporator is configured to provide a cooling effect.

19 Claims, 28 Drawing Sheets

DESALINATION SYSTEMS, APPARATUS, AND RELATED METHODS FOR USE WITH SALINE FLUIDS

STATEMENT REGARDING PRIOR DISCLOSURE BY THE INVENTORS

Aspects of this technology are described in an article "Performance evaluation of a novel hybrid humidification-dehumidification (air-heated) system with an adsorption desalination system" published in Desalination, 461, 37-54, 10.1016/j.desal.2019.03.011, on Apr. 3, 2019, which is incorporated herein by reference in its entirety.

FIELD OF THE DISCLOSURE

This disclosure relates generally to fluid processing and, more particularly, to desalination systems, apparatus, and related methods for use with saline fluids.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Nowadays, freshwater scarcity is a well-known and serious issue in many countries. This issue is magnified with population, agriculture, and industrial growth. The water resources are expected to be deficient by 40% in 2030. See F. R. Rijsberman, Water scarcity: fact or fiction? Agric. Water Manag. 80 (2006) 5-22, world wide web.doi.org/10.1016/j.agwat.2005.07.001, incorporated herein by reference in its entirety. Consequently, many efforts are excreted for enhancing water purification and desalination, especially where the drinking water is fading. See A. K. Venkatesan, S. Ahmad, W. Johnson, J. R. Batista, Salinity reduction and energy conservation in direct and indirect potable water reuse, Desalination 272 (2011) 120-127, world wide web-.doi.org/10.1016/j.desal.2011.01.007, incorporated herein by reference in its entirety. Desalination technologies, which include thermal based (e.g., humidification-dehumidification (HDH) and multi effect desalination) or membrane based separation (e.g., reverse osmoses (RO) and electrodialysis (ED)), are a vital solution used these days to secure the needed amounts of freshwater. See G. P. Narayan, M. G. St. John, S. M. Zubair, J. H. Lienhard V, Thermal design of the humidification dehumidification desalination system: an experimental investigation, Int. J. Heat Mass Transf 58 (2013) 740-748, world wide web.doi.org/10.1016/j.ijheatmasstransfer.2012.11.035; I. S. Park, S. M. Park, J. S. Ha, Design and application of thermal vapor compressor for multi-effect desalination plant, Desalination 182 (2005) 199-208, world wide web.doi.org/10.1016/j.desa1.2005.02.027; S. Mitra, K. Thu, B. B. Saha, P. Dutta, Performance evaluation and determination of minimum desorption temperature of a two-stage air cooled silica gel/water adsorption system, Appl. Energy 206 (2017) 507-518, world wide web.world wide web.doi.org/10.1016/j.apenergy.2017.08.198; and N. A. A. Qasem, B. A. Qureshi, S. M. Zubair, Improvement in design of electrodialysis desalination plants by considering the Donnan potential, Desalination 441 (2018), world wide web.doi.org/10.1016/j.desal.2018.04.023, each of which is incorporated herein by reference in its entirety. Recently, adsorption desalination (AD) was introduced as an energy efficient method to obtain freshwater even from high saline water resources. See X. Wang, K. C. Ng, Experimental investigation of an adsorption desalination plant using low-temperature waste heat, Appl. Therm. Eng. 25 (2005) 2780-2789, world wide web.doi.org/10.1016/j.appltherma-leng.2005.02.011; and E. S. Ali, A. S. Alsaman, K. Harby, A. A. Askalany, M. R. Diab, S. M. Ebrahim Yakoot, Recycling brine water of reverse osmosis desalination employing adsorption desalination: a theoretical simulation, Desalination 408 (2017) 13-24, world wide web.doi.org/10.1016/j.desal.2016.12.002, each of which is incorporated herein by reference in its entirety.

Both known HDH and AD systems are attractive technologies since they can be constructed in small sizes and powered by low energy sources. See S. Mitra, K. Srinivasan, P. Kumar, S. S. Murthy, P. Dutta, Solar driven Adsorption Desalination system, Energy Procedia 49 (2013) 2261-2269, world wide web.doi.org/10.1016/j.egypro.2014.03.239; and M. H. Sharqawy, M. A. Antar, S. M. Zubair, A. M. Elbashir, Optimum thermal design of humidification dehumidification desalination systems, Desalination 349 (2014) 10-21, each of which is incorporated herein by reference in its entirety. Such known HDH systems were extensively studied in the literature. An early study (1968) of a known HDH system to produce freshwater was conducted in India. See S. K. Garg, S. D. Gomkale, R. L. Datta, D. S. Datar, Development of humidification-dehumidification technique for water desalination in arid zones of India, Desalination 5 (1968) 55-63, world wide web.doi.org/10.1016/S0011-9164(00)80192-7, incorporated herein by reference in its entirety. Other known HDH systems powered by solar energy were also reviewed. See S. Parekh, M. M. Farid, J. R. Selman, S. Al-Hallaj, Solar desalination with a humidification-dehumidification technique—a comprehensive technical review, Desalination 160 (2004) 167-186, world wide web.doi.org/10.1016/S0011-9164(04) 90007-0, incorporated herein by reference in its entirety. The effect of heating source temperature (<90° C.) and seawater inlet temperature of these known HDH systems was investigated based on air heated or water heated methods for a closed air open water (CAOW) arrangement. See N. Qasem, B. Imteyaz, M. A. Antar, Investigation of the effect of the top and the bottom temperatures on the performance of humidification dehumidification desalination systems, ASME Int. Mech. Eng. Congr. Expo. Proc, 2016, world wide web.doi.org/10.1115/IMECE201667985, incorporated herein by reference in its entirety. It was proven that the HDH performance could substantially be improved by extracting humid air from the humidifier to be injected into the dehumidifier. See G. P. Narayan, K. M. Chehayeb, R. K. McGovern, G. P. Thiel, S. M. Zubair, J. H. Lienhard V, Thermodynamic balancing of the humidification dehumidification desalination system by mass extraction and injection, Int. J. Heat Mass Transf. 57 (2013) 756-770, world wide web.doi.org/10.1016/j.ijheatmasstransfer.2012.10.068, incorporated herein by reference in its entirety. Furthermore, a desiccant based HDH system was proposed to produce freshwater. See M. A. Ahmed, N. A. A. Qasem, S. M. Zubair, P. Gandhidasan, H. M. Bahaidarah, Thermodynamic balancing of the regeneration process in a novel liquid desiccant cooling/desalination system, Energy Conyers. Manag. 176 (2018) 86-98, world wide web.doi.org/10.1016/j.encon-man.2018.09.012, incorporated herein by reference in its entirety.

Known adsorption systems have been studied for air conditioning and ice production. See M. M. Younes, I. I. El-Sharkawy, A. E. Kabeel, B. B. Saha, A review on adsorbent-adsorbate pairs for cooling applications, Appl. Therm. Eng. 114 (2017) 394-414, world wide web.doi.org/10.1016/j.applthermaleng.2016.11.138; and N. A. A. Qasem, M. A. I. El-Shaarawi, Improving ice productivity and performance for an activated carbon/methanol solar adsorption ice-maker, Sol. Energy 98 (2013), world wide web.doi.org/10.1016/j.solener.2013.10.018, each incorporated herein by reference in their entirety. Some successful studies showed that adsorption technology can be efficiently used for desalination purposes as well as for producing cooling effect. See A. S. Alsaman, A. A. Askalany, K. Harby, M. S. Ahmed, A state of the art of hybrid adsorption desalination-cooling systems, Renew. Sust. Energ. Rev. 58 (2016) 692-703, world wide web.doi.org/10.1016/j.rser.2015.12.266, incorporated herein by reference in its entirety. The seawater or (high) saline water can be the working fluid in the known AD evaporator, so that water evaporates and is adsorbed into an adsorbent bed, then desorbed to be condensed as freshwater. The chemical tests of distillate water from the known AD system showed that the freshwater quality is independent of the evaporator salinity (>220 part per thousand—ppt). See Y. D. Kim, K. Thu, M. E. Masry, K. C. Ng, Water quality assessment of solar-assisted adsorption desalination cycle, Desalination 344 (2014) 144-151, world wide web.doi.org/10.1016/j.desal.2014.03.021, incorporated herein by reference in its entirety. Silica gel is mostly studied for such known AD systems due to its low cost, availability in local markets, and high adsorption stability. See K. Thu, A. Chakraborty, B. B. Saha, K. C. Ng, Thermo-physical properties of silica gel for adsorption desalination cycle, Appl. Therm. Eng. 50 (2013) 1596-1602, world wide web.doi.org/10.1016/j.applthermaleng.2011.09.038, incorporated herein by reference in its entirety.

The first known HDH system including adsorption beds as new components was recently modeled. See M. Capocelli, M. Balsamo, A. Lancia, D. Barba, Process analysis of a novel humidification-dehumidification-adsorption (HDHA) desalination method, Desalination 429 (2018) 155-166, world wide web.doi.org/10.1016/j.desal.2017.12.020, incorporated herein by reference in its entirety. The system could produce about 30 m$^3$/day of freshwater with GOR value of 7 using four extractions between system humidifier and dehumidifier. The HDH circulated air passes through an adsorption bed for more dehydration. The system was introduced as a modified HDH system with adsorption beds rather than a hybrid system. On the other side, the HDH and AD system were individually hybridized with other systems. Multi effect desalination with AD hybrid system was introduced and assessed to enhance the water recovery. See M. W. Shahzad, K. C. Ng, K. Thu, B. B. Saha, W. G. Chun, Multi effect desalination and adsorption desalination (ME-DAD): a hybrid desalination method, Appl. Therm. Eng. 72 (2014) 289-297, world wide web.doi.org/10.1016/j.applthermaleng.2014.03.064, incorporated herein by reference in its entirety. A known AD system could efficiently desalinate brine products of the reverse osmosis (RO) system. See M. Sarai Atab, A. J. Smallbone, A. P. Roskilly, A hybrid reverse osmosis/adsorption desalination plant for irrigation and drinking water, Desalination 444 (2018) 44-52, world wide web.doi.org/10.1016/j.desal.2018.07.008, incorporated herein by reference in its entirety. Concerning the HDH system, it was found that the HDH system could be efficiently driven by a compression heat pump or an absorption heat pump. See D. Lawal, M. Antar, A. Khalifa, S. Zubair, F. Al-Sulaiman, Humidification-dehumidification desalination system operated by a heat pump, Energy Convers. Manag. 161 (2018) 128-140, world wide web.doi.org/10.1016/j.enconman.2018.01.067; see also H. Rostamzadeh, A. S. Namin, H. Ghaebi, M. Amidpour, Performance assessment and optimization of a humidification dehumidification (HDH) system driven by absorption-compression heat pump cycle, Desalination 447 (2018) 84-101, world wide web.doi.org/10.1016/j.desal.2018.08.015, each of which is incorporated herein by reference in its entirety.

Accordingly it is one object of the present disclosure to provide methods and systems based on AD and HDH to act as a low energy source and produce a good amount of freshwater for a small (portable) design. The methods and systems disclosed herein hybridize the HDH and AD systems and improve the energy consumption per unit of freshwater production.

SUMMARY

An example desalination system includes an HDH system including a humidifier and a dehumidifier that, together, are configured to process a first saline fluid to produce freshwater in the dehumidifier. The desalination system also includes an AD system operatively coupled to the HDH system. The AD system includes a first bed, a second bed, an evaporator, and a condenser that, together, are configured to process a second saline fluid to produce freshwater in the condenser. The condenser is configured to transfer heat exhausted by the first or second bed from a vapor, obtained from the second saline fluid, to air circulating through the humidifier and the dehumidifier to drive the HDH system. The evaporator is configured to provide a cooling effect An example method for providing a desalination system includes providing an HDH system including a humidifier and a dehumidifier that, together, are configured to process a first saline fluid to produce freshwater in the dehumidifier. The method also includes providing an AD system including a first bed, a second bed, an evaporator, and a condenser that, together, are configured to process a second saline fluid to produce freshwater in the condenser. The method also includes operatively coupling the HDH system and the AD system together such that heat exhausted by the first or second bed is transferrable via the condenser from a first vapor, obtained from the second saline fluid, to the first saline fluid to drive the HDH system.

An example desalination method includes processing a first saline fluid via an HDH system to produce freshwater in a dehumidifier of the HDH system. The method also includes processing a second saline fluid via an AD system to produce freshwater in a condenser of the AD system. The method also includes transferring, via the condenser, heat exhausted by a first or second bed of the AD system from a vapor, obtained from the second saline fluid, to the first saline fluid to drive the HDH system. The method also includes providing a cooling effect via an evaporator of the AD system.

The foregoing paragraphs have been provided by way of general introduction, and are not intended to limit the scope of the following claims.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

The figures are not to scale. In general, the same reference numbers will be used throughout the drawing(s) and accompanying written description to refer to the same or like parts.

DETAILED DESCRIPTION

Figure 1A:
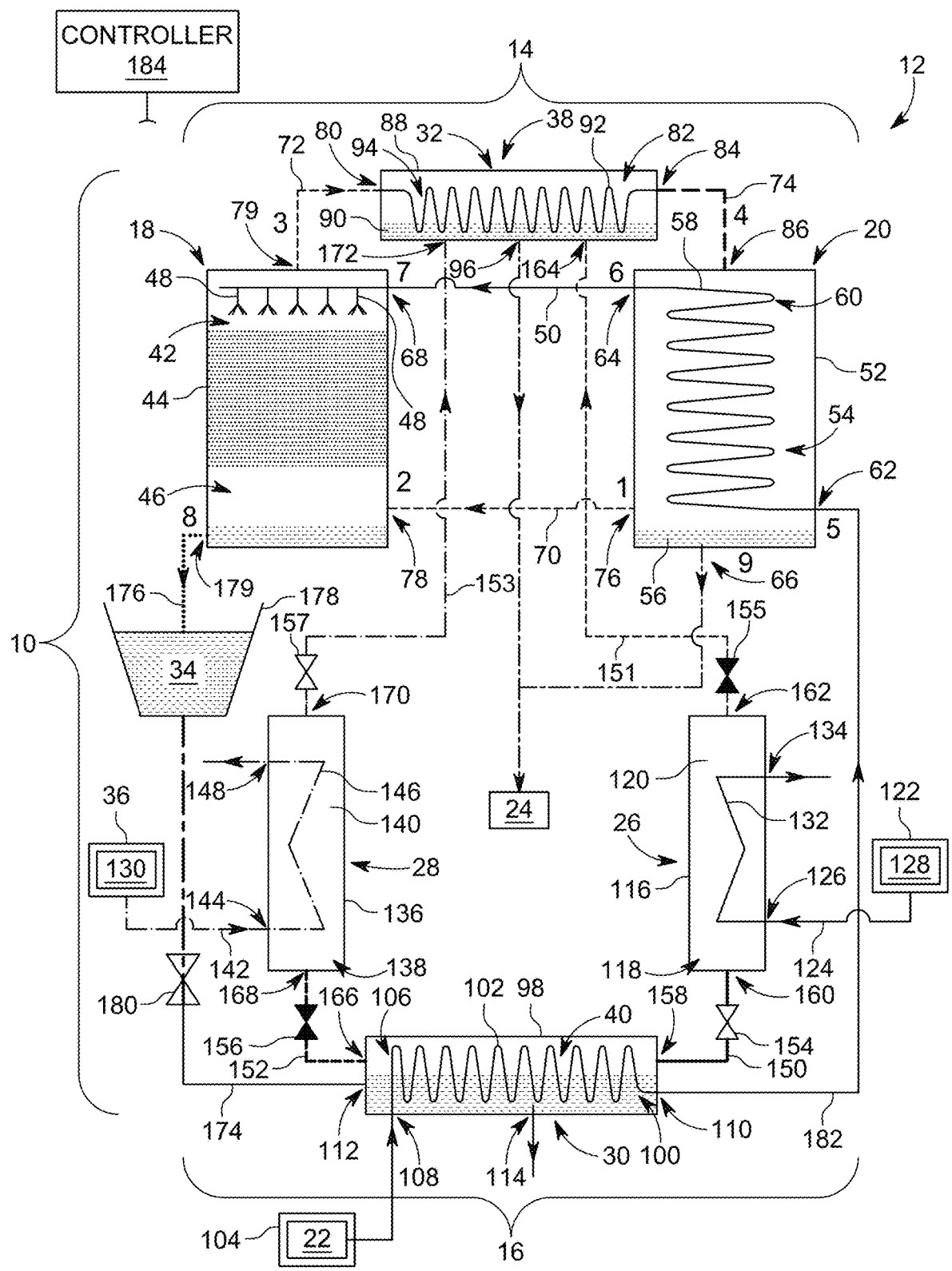
FIG. 1A illustrates a schematic diagram of an example desalination system and shows a first scheme thereof in accordance with the teachings of this disclosure.

A known or traditional HDH system is configured to process a saline fluid, such as seawater, to produce freshwater. Such known HDH systems may be constructed to be relatively small in size, which is desirable in certain fluid processing applications where space is limited. Some other known desalination systems include an AD system configured to process seawater to produce freshwater. Such known AD systems also produce a cooling effect for use in are conditioning applications. However, these known HDH and AD systems (each as a stand alone system) have relatively low performance. That is, energy consumption (i.e., input energy) per unit of freshwater production is relatively high. As a result, these known desalination systems incur substantial costs to produce the freshwater.

Desalination systems, apparatus, and related methods for use with saline fluids are disclosed. Examples disclosed herein provide an example desalination system (e.g., a hybrid HDH AD system) that includes an example HDH system coupled with an example AD system to produce freshwater as well as to obtain chilled water for an air conditioning purpose. To implement the disclosed desalination system, two hybrid HDH AD schemes (i.e., a first scheme and a second scheme) are disclosed in which a condenser of the AD system replaces an HDH heater. That is, the disclosed desalination system includes a single heating source configured for use with both the HDH system and the AD system. For example, the HDH system is structured and/or configured to be driven by heat released inside the AD condenser (e.g., due to cooling and condensing the water vapor coming out from desorption processes associated with the AD system). Such a heat recovery process improves performance of the disclosed systems such as, for example, gained output ratio (GOR) values. The difference between the two disclosed schemes is that, in the first scheme, a first saline fluid (e.g., seawater, brackish water, etc.) for the HDH system is precooled in an evaporator of the AD system before feeding the HDH system. While in the second scheme, the first saline fluid is used to cool an adsorption process associated with the AD system. Mass flowrate and temperature of the first saline fluid, heating source mass flowrate and temperature, cycling time, and HDH mass flowrate ratio are key parameters investigated and/or selected to influence the hybrid system performance. The results exhibit that the GOR and cost values are higher in the first scheme (e.g., about 7.8 and 0.64 ¢/Liter, respectively). The second scheme achieves excellent GOR and cost values (e.g., about 7.6 and 0.65 ¢/Liter) with a cooling effect as a by-product (e.g., coefficient of performance (COP) is >0.45 under the same conditions of optimal GOR value). For the disclosed desalination system, the contribution of the HDH system in the total performance is important while the AD system can be used to control operating conditions of the HDH system.

Thus, examples disclosed herein combine the two systems (i.e., the HDH system and the AD system) so that only one energy source (e.g., an energy source for the AD system) is used. In particular, the HDH system is driven by the heat that is recovered from the AD system. In this way, the HDH is also controlled by the AD system. As a result, the performance of the disclosed desalination system is substantially improved and the freshwater cost is minimized (e.g., by about 3 times compared to the traditional HDH systems). For example, a combined GOR of the disclosed systems is higher than the traditional HDH (e.g., by more than 2.5 times) while the freshwater cost is lower than the traditional system (e.g., by about three times).

The disclosed desalination system can process seawater, brackish water, brine water, etc. Additionally, because the heating source can be provided by solar radiation or waste heat, the disclosed HDH system and the AD system can be designed to have a relatively small size and/or fit within a relatively small space and can be used in off-grid areas. As such, the disclosed desalination system can be configured, for example, for use in brine desalination plants as well as in industrial sectors to produce water from oil and gas hydraulic fracturing. Additionally or alternatively, the disclosed desalination system can be configured for use in portable separation units to be used in rural zones and ships.

System Description

FIG. 1A illustrates a schematic diagram of an example desalination system (e.g., a hybrid HDH AD system) 10 and shows a first scheme 12 thereof in accordance with the teachings of this disclosure. According to the illustrated example of FIG. 1A, the desalination system 10 includes an HDH system 14 (sometimes referred to as an HDH desalination system) and an AD system 16 that is operatively coupled to the HDH system 14. The HDH system 14 of FIG. 1A includes a humidifier 18 and a dehumidifier 20 that, together, are configured to process a first saline fluid (e.g., seawater) 22 to produce at least some freshwater 24 in the dehumidifier 20. The first saline fluid 22 is sometimes referred to as an inlet saline fluid. Further, the AD system 16 of FIG. 1A includes first and second beds 26, 28 (e.g., for continuous adsorption and desorption processes), an evaporator 30, and a condenser 32 that, together, are configured to process a second saline fluid (e.g., brine water) 34 to produce at least some of the freshwater 24 in the condenser 32. Additionally, the AD system 16 of FIG. 1A also includes a first or primary heating source 36, and the HDH system 14 includes a second or auxiliary heating source 38. According to one or more disclosed examples, the desalination system 10 is structured and/or configured such that the primary heating source 36 drives the AD system 16 and, in turn, drives the HDH system 14 (i.e., the primary heating source 36 drives both systems 14, 16), which will be discussed in greater detail below in connection with FIGS. 1A, 1B, 2-18, and 19-22. For example, the condenser 32 of FIG. 1A is configured to transfer heat exhausted by at least one of the beds 26, 28 from a vapor (e.g., water vapor) 40, obtained from the second saline fluid 34, to air (e.g., humid air) 42 circulating through the humidifier 18, the dehumidifier 20, and the condenser 32 to drive the HDH system 14. In such examples, the auxiliary heating source 38 of the HDH system 14 corresponds to and/or is implemented by at least one component of the AD system 16 such as, for example, the condenser 32.

The humidifier 18 of FIG. 1A can be implemented, for example, using one of (a) a spray mist or atomizing humidifier, (b) a by-pass flow-through humidifier, (c) a disc wheel humidifier, (e) a drum humidifier, (0 an evaporative humidifier, (g) etc., or (d) a combination thereof. According to the illustrated example of FIG. 1A, the humidifier 18 includes a housing 44 forming a chamber (e.g., a sealed fluid chamber) 46 that receives one or more fluids such as, for example, the air 42 and/or the first saline fluid 22. In particular, the humidifier 18 is configured to provide moisture or water vapor to the air 42 and/or otherwise increase a water content in the air 42 when the air 42 and the first saline fluid 22 pass into the chamber 46 of the humidifier 18 during operation of the desalination system 10. That is, the humidifier 18 of FIG. 1A humidifies the air 42 and/or the chamber 46. Further, in some examples, the humidifier 18 generates and/or rejects the second saline fluid 34 for input to the AD system 16. In such examples, the second saline fluid 34 includes brine water having a salinity that is substantially higher than a salinity of the first saline fluid 22.

Additionally, in some examples, to facilitate humidifying the chamber 46, the humidifier 18 also includes one or more nozzles 48 operatively coupled thereto and positioned in the chamber 46 of the humidifier 18, five of which are shown in this example. The nozzle(s) 48 of FIG. 1A can be implemented, for example, using one or more atomizer nozzles or any other suitable nozzle(s). In such examples, the nozzle(s) 48 of FIG. 1A receive the first saline fluid 22 from the dehumidifier 20, for example, via a first fluid conduit 50, as discussed further below. In particular, the nozzle(s) 48 are configured to spray (e.g., atomize) the first saline fluid 22 in the chamber 46 of the humidifier 18, thereby providing the moisture to the air 42 and/or increasing the water content therein. In such examples, the first saline fluid 22 may be provided to the nozzle(s) 48 at a relatively high pressure (e.g., a fluid pressure that is above an ambient fluid pressure). Additionally, in some examples, each of the nozzle(s) 48 may include a valve (e.g., a solenoid valve) operatively coupled thereto. The nozzle(s) 48 of FIG. 1A can be constructed of one or more materials having suitable properties and/or characteristics associated therewith such as, for example, metal(s) such as stainless steel.

Although FIG. 1A depicts the humidifier 18 that is particularly configured, in some examples, the humidifier 18 is implemented differently to similarly provide sufficient humidification during operation of the desalination system 10. Further, although FIG. 1A depicts a single humidifier 18, in some examples, the HDH system 14 is implemented differently, for example, using one or more other humidifiers (e.g., connected together in parallel and/or series) in addition or alternatively to the humidifier 18 of FIG. 1A. In such examples, aspects depicted in connection with the humidifier 18 of FIG. 1A likewise apply to the other humidifier(s) of the HDH system 14.

The dehumidifier 20 of FIG. 1A can be implemented, for example, using a heat pump dehumidifier and/or any other suitable dehumidifier. Additionally or alternatively, in some examples, the dehumidifier 20 includes and/or is otherwise implemented using one or more heat exchangers such as, for example, (a) one or more helical-coil heat exchangers, (b) one or more shell and tube heat exchangers, (c) one or more multi-pass heat exchangers, (d) etc., or (e) a combination thereof. According to the illustrated example of FIG. 1A, the dehumidifier 20 includes a housing 52 forming a chamber 54 that receives one or more fluids such as, for example, the air 42 and/or first saline fluid 22. In particular, the dehumidifier 20 is configured to extract a first portion 56 of the freshwater 24 from the air 42 and/or otherwise decrease the water content therein when the air 42 and the first saline fluid 22 are supplied or provided the dehumidifier 20 during operation of the desalination system 10. That is, the dehumidifier 20 of FIG. 1A dehumidifies the air 42 and/or the chamber 54, for example, via condensing the water vapor in the air 42 using the first saline fluid 22, as discussed further below.

In some examples, to facilitate such dehumidification, the dehumidifier 20 includes one or more heat transfer control members 58 positioned in the chamber 54 and/or coupled to the housing 52, one of which is shown in this example (i.e., a first heat transfer control member 58). In such examples, the heat transfer control member(s) 58 of the dehumidifier 20 are configured to transfer heat between the fluids 22, 42 in the dehumidifier 20, for example, without mixing the fluids 22, 42. Each of the heat transfer control member(s) 58 of the dehumidifier 20 can be implemented, for example, using one or more fluid conduits such as tube(s), pipe(s), etc. that may have fins connected thereto. In particular, the heat transfer control member(s) 58 of the dehumidifier 20 are configured receive the first saline fluid 22 and convey the first saline fluid 22 through the chamber 54 of the dehumidifier 20. Further, the heat transfer control member(s) 58 of the dehumidifier 20 are exposed (e.g., directly) to the air 42. According to the illustrated example of FIG. 1A, the heat transfer control member(s) 58 of the dehumidifier 20 are configured to receive the first saline fluid 22 from the evaporator 30 and provide the first saline fluid 22 to the nozzle(s) 48 of the humidifier 18. Additionally or alternatively, in some examples, the heat transfer control member(s) 58 of the dehumidifier 20 are configured to receive the first saline fluid 22 from the first bed 26, which is discussed in greater detail below in connection with FIG. 1B.

As shown in FIG. 1A, the heat transfer control member(s) 58 of the dehumidifier 20 form at least one coil (e.g., a helical coil) 60 and/or multiple passes. However, in some examples, one or more of the heat transfer control member(s) 58 of the dehumidifier 20 are sized and/or shaped differently.

According to the illustrated example of FIG. 1A, the first saline fluid 22 passes through the dehumidifier 20 during operation of the desalination system 10 via the heat transfer control member(s) 58 of the dehumidifier 20, which enables condensation of the water vapor in the air 42. For example, the first heat transfer control member 58 extends through the dehumidifier chamber 54 from a first inlet (e.g., an opening positioned on the dehumidifier housing 52) 62 of the dehumidifier 20 to a first outlet (e.g., an opening positioned on the dehumidifier housing 52) 64 of the dehumidifier 20. As such, the first saline fluid 22 is flowable through the first heat transfer control member 58 from the first inlet 62 to the first outlet 64. In particular, when the first saline fluid 22 flows through the first heat transfer control member 58 while an exterior of first heat transfer control member 58 is exposed to the air 42, at least some of the water vapor in the air 42 condenses on the first heat transfer control member 58, for example, in the form of freshwater droplets. In this manner, the dehumidifier 20 produces the first portion 56 of the freshwater 24 in the dehumidifier housing 52 from the air 42 circulating through the HDH system 14, which is then collected from the dehumidifier 20 via a second outlet (e.g., an opening positioned on the dehumidifier housing 52) 66 of the dehumidifier 20. Further, as a result of such dehumidification, heat is provided to a portion of the first saline fluid 22 that flows through the first heat transfer control member 58, thereby increasing a temperature of the first saline fluid 22 before the first saline fluid 22 is conveyed from the dehumidifier 20 to the humidifier 18. That is, the water vapor in the air 42 releases energy in response to condensing on the first heat transfer control member 58. This energy is then transmitted (e.g., via conduction heat transfer) through a wall of the first heat transfer control member 58 from an outer surface of the wall to an inner surface of the wall that is exposed to the first saline fluid 22.

After the first saline fluid 22 passes through the dehumidifier 20, the first saline fluid 22 is expelled from the dehumidifier 20 at the first outlet 64 and conveyed, via the first fluid conduit 50, to a first inlet (e.g., an opening positioned on the humidifier housing 44) 68 of the humidifier 18. In such examples, the first fluid conduit 50 is coupled to a portion of the humidifier 18 and a portion of the dehumidifier 20. Further, as shown in FIG. 1A, the first fluid conduit 50 extends from the first outlet 64 of the dehumidifier 20 to the first inlet 68 of the humidifier 18. In particular, the first fluid conduit 50 of FIG. 1A fluidly couples the humidifier 18 and the dehumidifier 20 together such that the first saline fluid 22 is flowable through the first fluid conduit 50 from the dehumidifier 20 to the humidifier 18. In this manner, the first saline fluid 22 is conveyed from the heat transfer control member(s) 58 of the dehumidifier 20 to the chamber 46 of the humidifier 32 during operation of the desalination system 10.

Although FIG. 1A depicts aspects in connection with the first heat transfer control member 58, in some examples, such aspects likewise apply to one or more other heat transfer control members of the dehumidifier 20. Further, although FIG. 1A depicts the dehumidifier 20 that is particularly configured, in some examples, the dehumidifier 20 of FIG. 1A is implemented differently to similarly provide sufficient dehumidification during operation of the desalination system 10. Further still, although FIG. 1A depicts a single dehumidifier 20, in some examples, the HDH system 14 is implemented differently, for example, using one or more other dehumidifiers (e.g., connected together in parallel and/or series) in addition or alternatively to the dehumidifier 20 of FIG. 1A. In such examples, aspects depicted in connection with the dehumidifier 20 of FIG. 1A likewise apply to the other dehumidifier(s) of the HDH system 14.

To allow circulation of the air 42 through the HDH system 14, the desalination system 10 of FIG. 1A also includes one or more other fluid conduits 70, 72, 74, three of which are shown in this example (i.e., a second fluid conduit 70, a third fluid conduit 72, and a fourth fluid conduit 74). The second fluid conduit 70 of FIG. 1A is coupled to a portion of the humidifier 18 and a portion of the dehumidifier 20. As shown in FIG. 1A, the second fluid conduit 70 extends from a third outlet (e.g., an opening positioned on the dehumidifier housing 52) 76 of the dehumidifier 20 to a second inlet (e.g., an opening positioned on the humidifier housing 44) 78 of the humidifier 18. In particular, the second fluid conduit 70 of FIG. 1A fluidly couples the humidifier 18 and the dehumidifier 20 together such that the air 42 is flowable through the second fluid conduit 70 from the dehumidifier 20 to the humidifier 18. In this manner, the air 42 is conveyed from the chamber 54 of the dehumidifier 20 to the chamber 46 of the humidifier 18 during operation of the desalination system 10.

The third fluid conduit 72 of FIG. 1A is coupled to a portion of the humidifier 18 and a portion of the condenser 32. As shown in FIG. 1A, the third fluid conduit 72 extends from a first outlet (e.g., an opening positioned on the humidifier housing 44) 79 of the humidifier 18 to a first inlet 80 of the condenser 32. In particular, the third fluid conduit 72 of FIG. 1A fluidly couples the humidifier 18 and the condenser 32 together such that the air 42 is flowable through the third fluid conduit 72 from the humidifier 18 to the condenser 32. In this manner, the air 42 is conveyed from the chamber 46 of the humidifier 18 to a chamber 82 of the condenser 32 during operation of the desalination system 10.

The fourth fluid conduit 74 is coupled to a portion of the condenser 32 and a portion of the dehumidifier 20. As shown in FIG. 1A, the fourth fluid conduit 74 extends from a first outlet 84 of the condenser 32 to a second inlet (e.g. an opening positioned on the dehumidifier housing 52) 86 of the dehumidifier 20. In particular, the fourth fluid conduit 74 fluidly couples the condenser 32 and the dehumidifier 20 together such that the air 42 is flowable through the fourth fluid conduit 74 from the condenser 32 to the dehumidifier 20. In this manner, the air 42 is conveyed from the chamber 82 of the condenser 32 to the chamber 54 of the dehumidifier 20 during operation of the desalination system 10. As such, the condenser 32 of FIG. 1A is fluidly coupled between the humidifier 18 and the dehumidifier 20 such that the air 42 is conveyable through the condenser 32 from the humidifier 18 to the dehumidifier 20.

The condenser 32 of FIG. 1A can be implemented, for example, using one of (a) an air-cooled condenser, (b) a water-cooled condenser, (c) etc., or (d) a combination thereof. Additionally or alternatively, in some examples, the condenser 32 includes and/or is otherwise implemented using one or more heat exchangers such as, for example, (a) one or more helical-coil heat exchangers, (b) one or more shell and tube heat exchangers, (c) one or more multi-pass heat exchangers, (d) etc., or (e) a combination thereof. According to the illustrated example of FIG. 1A, the condenser 32 includes a housing 88 forming the chamber (e.g., a sealed fluid chamber) 82 that receives one or more fluids such as, for example, the air 42 and/or the vapor 40. In particular, the condenser 32 is configured to extract a second portion 90 of the freshwater 24 from the vapor 40 when the vapor 40 and the air 42 are supplied or provided to the condenser 32 during operation of the desalination system 10. That is, the condenser 32 advantageously utilizes the air 42 to condense the vapor 40, as discussed further below.

In some examples, to facilitate such condensation, the condenser 32 includes one or more heat transfer control members 92 positioned in the chamber 82 and/or coupled to the housing 88 of the condenser 32, one of which is shown in this example (i.e., a second heat transfer control member 92). In such examples, the heat transfer control member(s) 92 of the condenser 32 are configured to transfer heat between the fluids 40, 42 in the condenser 32, for example, without mixing the fluids 40, 42. Each of the heat transfer control member(s) 92 of the condenser 32 can be implemented, for example, using one or more fluid conduits such as tube(s), pipe(s), etc. that may have fins connected thereto. In particular, the heat transfer control member(s) 92 of the condenser 32 are configured receive the air 42 from the humidifier 18 and convey the air 42 through the chamber 82 of the condenser 32. Further, the heat transfer control member(s) 92 of the condenser 32 are exposed (e.g., directly) to the vapor 40.

As shown in FIG. 1A, the heat transfer control member(s) 92 of the condenser 32 form at least one coil (e.g., a helical coil) 94 and/or multiple passes. However, in some examples, the heat transfer control member(s) 92 of the dehumidifier 20 is/are sized and/or shaped differently.

According to the illustrated example of FIG. 1A, the air 42 passes through the condenser 32 during operation of the desalination system 10 via the heat transfer control member(s) 92 of the condenser, which enables condensation of water vapor (e.g., generated by the first bed 26 and/or the second bed 28) in the condenser 32. For example, the second heat transfer control member 92 extends through the condenser housing 88 from the first inlet 80 of the condenser 32 to the first outlet 84 of the condenser 32. Each of the first inlet 80 and/or the first outlet 84 of the condenser 32 may include an opening positioned on the condenser housing 88. As such, the air 42 is flowable through the second heat transfer control member 92 from the first inlet 80 to the first outlet 84. In particular, when the air 42 flows through the second heat transfer control member 92 while an exterior of second heat transfer control member 92 is exposed to the vapor 40, at least some of the vapor 40 condenses on the second heat transfer control member 92, for example, in the form of freshwater droplets. In this manner, the condenser 32 produces the second portion 90 of the freshwater 24 in the condenser housing 88 from the vapor 40, which is then collected from the condenser 32 via a second outlet (e.g., an opening positioned on the condenser housing 88) 96 of the condenser 32.

Further, as a result of such condensation, heat is provided to a portion of the air 42 that is flowing through the second heat transfer control member 92, thereby increasing a temperature of the air 42 before the air 42 is conveyed from the condenser 32 to the dehumidifier 20. That is, the vapor 40 releases energy (i.e., latent heat associated with condensation) in response to condensing on second heat transfer control member 92. This energy is then transmitted through a wall of the second heat transfer control member 92 from an outer surface of the wall to an inner surface of the wall that is exposed to the air 42. Further, this energy is subsequently provided to the first saline fluid 22 when the air 42, after being heated in the condenser 32, is conveyed from the condenser 32 to the dehumidifier 20 or the humidifier 18. Thus, the condenser 32 drives the HDH system 14 by transferring heat from the vapor 40 to the air 42 and/or the first saline fluid 22 in such manner. In such examples, the condenser 32 corresponds to the secondary heat source 38 of the HDH system 14, as previously mentioned.

Although FIG. 1A depicts aspects in connection with the second heat transfer control member 92, in some examples, such aspects likewise apply to one or more other heat transfer control members of the condenser 32. Further, although FIG. 1A depicts the condenser 32 that is particularly configured, in some examples, the condenser 32 of FIG. 1A is implemented differently to similarly provide sufficient condensation of the vapor 40 and/or sufficient heating of the air 42 during operation of the desalination system 10. Further still, although FIG. 1A depicts a single condenser 32, in some examples, the AD system 16 is implemented differently, for example, using one or more other condensers (e.g., connected together in parallel and/or series) in addition or alternatively to the condenser 32 of FIG. 1A. In such examples, aspects depicted in connection with the condenser 32 of FIG. 1A likewise apply to the other condenser(s) of the AD system 16.

The evaporator 30 of FIG. 1A can be implemented, for example, using one of (a) a shell and tube evaporator, (b) a bare tube evaporator, (c) a finned-tube evaporator, (d) a plate evaporator, (e) etc., or (e) a combination thereof. Additionally or alternatively, in some examples, the evaporator 30 includes and/or is otherwise implemented using one or more heat exchangers such as, for example, (a) one or more helical-coil heat exchangers, (b) one or more shell and tube heat exchangers, (c) one or more multi-pass heat exchangers, (d) etc., or (e) a combination thereof. According to the illustrated example of FIG. 1A, the evaporator 30 includes a housing 98 forming a chamber (e.g., a sealed fluid chamber) 100 that receives one or more fluids such as, for example, the first saline fluid 22 and/or the second saline fluid 34. In particular, the evaporator 30 is configured to generate the vapor 40 in the evaporator housing 98 from the second saline fluid 34 when the first and second saline fluids 22, 34 are supplied or provided to the evaporator 30 during operation of the desalination system 10. That is, the evaporator 30 of FIG. 1A advantageously utilizes the first saline fluid 22 to evaporate at least a portion of the second fluid 34, as discussed further below.

In some examples, to facilitate such evaporation, the evaporator 30 includes one or more heat transfer control members 102 positioned in the chamber 100 and/or coupled to the housing 98 of the evaporator 30, one of which is shown in this example (i.e., a third heat transfer control member 102). In such examples, the heat transfer control member(s) 102 of the evaporator 30 are configured to transfer heat between the fluids 22, 34 in the evaporator 30, for example, without mixing the fluids 22, 34. Each of the heat transfer control member(s) 102 of the evaporator 30 can be implemented, for example, using one or more fluid conduits such as pipe(s), tube(s), etc. that may have fins connected thereto. In particular, the heat transfer control member(s) 102 of the evaporator 30 are configured to receive the first saline fluid 22 and convey the first saline fluid 22 through the chamber 100 of the evaporator 30. Further, the heat transfer control member(s) 102 of the evaporator 30 are exposed (e.g., directly) to the second saline fluid 34. For example, the heat transfer control member(s) 102 of the evaporator 30 are at least partially submerged in the second saline fluid 34, and/or the second saline fluid 34 flows across at least a portion of the heat transfer control member(s) 102. As shown in FIG. 1A, the heat transfer control member(s) 102 of the evaporator 30 receive the first saline fluid 22 from a saline fluid source 104 and provide the first saline fluid 22 to the dehumidifier 20. Additionally or alternatively, in some examples, the heat transfer control member(s) 102 of the evaporator 30 receive a different fluid for evaporating the second saline fluid 34, which is discussed in greater detail below in connection with FIG. 1B.

As shown in FIG. 1A, the heat transfer control member(s) 102 of the evaporator 30 form at least one coil (e.g., a helical coil) 106 and/or multiple passes. However, the heat transfer control member(s) 102 of the evaporator 30 may be sized and/or shaped differently.

According to the illustrated example of FIG. 1A, the first saline fluid 22 passes through the evaporator 30 during operation of the desalination system 10 via the heat transfer control member(s) 102 of the evaporator 30, which enables evaporation of a relatively high salinity fluid (e.g., the second saline fluid 34) in the evaporator 30. For example, the third heat transfer control member 102 extends through the evaporator housing 98 from a first inlet (e.g., an opening positioned on the evaporator housing 98) 108 of the evaporator 30 to a first outlet (e.g., an opening positioned on the evaporator housing 98) 110 of the evaporator 30. As such, the first saline fluid 22 is flowable through the third heat transfer control member 102 from the first inlet 108 to the first outlet 110. In particular, when the first saline fluid 22 flows through the third heat transfer control member 102 while an exterior of third heat transfer control member 102 is exposed to the second saline fluid 34, at least some of the second saline fluid 34 evaporates in the chamber 100. That is, heat is transferred from the first saline fluid 22 to the second saline fluid 34, thereby decreasing a temperature of the first saline fluid 22. In such examples, energy is transmitted through a wall of the third heat transfer control member 102 from an inner surface of the wall to an outer surface of the wall exposed to the second saline fluid 34. In this manner, the evaporator 30 of FIG. 1A provides a cooling effect for the desalination system 10 to improve performance thereof. Additionally or alternatively, in some examples, the evaporator 30 is configured to provide a cooling effect for an environment external to the desalination system 10. In any case, the second saline fluid 34 is sometimes referred to as a refrigerant.

In some examples, during operation of the desalination system 10, the second saline fluid 34 also passes into and/or through the evaporator 30. For example, the second saline fluid 34 is flowable through the evaporator chamber 100 from a second inlet (e.g., an opening positioned on the evaporator housing 98) 112 of the evaporator 30 to a second outlet (e.g., an opening positioned on the evaporator housing 98) 114 of the evaporator 30.

Although FIG. 1A depicts aspects in connection with the third heat transfer control member 102, in some examples, such aspects likewise apply to one or more other heat transfer control members of the evaporator 30. Further, although FIG. 1A depicts the evaporator 30 that is particularly configured, in some examples, the evaporator 30 of FIG. 1A is implemented differently to similarly provide sufficient evaporation of the second saline fluid 34 during operation of the desalination system 10. Further still, although FIG. 1A depicts a single evaporator 30, in some examples, the AD system 16 is implemented differently, for example, using one or more other evaporators (e.g., connected together in parallel and/or series) in addition or alternatively to the evaporator 30 of FIG. 1A. In such examples, aspects depicted in connection with the evaporator 30 of FIG. 1A likewise apply to the other evaporator(s) of the AD system 16.

The first bed 26 of FIG. 1A can be implemented, for example, using a fixed bed adsorber. According to the illustrated example of FIG. 1A, the first bed 26 includes a housing 116 forming a chamber (e.g., a sealed fluid chamber) 118 and a first adsorbent (e.g., silica gel and/or water) 120 positioned in the housing 116. In particular, the first bed 26 is changeable between a first state (e.g., an unsaturated state) and a second state (e.g., a saturated state) different from the first state. For example, when in the second state, the first bed 26 is substantially saturated with water vapor. Conversely, when in the first state, the first bed 26 is not substantially saturated with water vapor and/or is otherwise unsaturated. Some disclosed examples carry out one or more first cooling processes (e.g., a first precooling process, a first cooling process, etc.) to provide a first adsorption process associated with the first bed 26, which transitions the first bed 26 from the first state to the second state. During the first adsorption process, the first bed 26 is sometimes referred to as an adsorption bed. Additionally or alternatively, examples disclosed herein carry out one or more first heating processes (e.g., a first preheating process, a first heating process, etc.) to provide a first desorption process associated with the first bed 26, which transitions the first bed 26 from the second state to the first state. During the first desorption process, the first bed 26 is sometimes referred to as a desorption bed.

In some examples, a temperature of the first bed 26 is adjusted to change the state of the first bed 26, for example, via the primary heating source 36 and/or a primary cooling source 122. In particular, when the temperature of the first bed 26 decreases and/or is relatively low, the first adsorbent 120 adsorbs the vapor 40 as the first bed 26 transitions from the first state to the second state during the first adsorption process. That is, in such examples, adsorption occurs in at least a portion of the first bed 26. Conversely, when the temperature of the first bed 26 increases and/or is relatively high, the first adsorbent 120 desorbs the vapor 40 as the first bed 26 transitions from the second state to the first state during the first desorption process. That is, in such examples, desorption occurs in at least a portion of the first bed 26

In some examples, to facilitate transporting one or more fluids to the first bed 26 from the primary heating source 36 and/or the primary cooling source 122, the desalination system 10 of FIG. 1A also includes one or more other fluid conduits 124, one of which is shown in this example (i.e., a fifth fluid conduit 124). The fifth fluid conduit 124 is coupled to a portion of the first bed 26. As shown in FIG. 1A, the fifth fluid conduit 124 extends from the primary cooling source 122 to a first inlet (e.g., an opening positioned on the bed housing 116) 126 of the first bed 26. In particular, the fifth fluid conduit 124 fluidly couples the first bed 26 to the primary cooling source 122 such that a first auxiliary fluid (e.g., chilled water or water having an ambient temperature) 128 supplied by the primary cooling source 122 is flowable through the fifth fluid conduit 124 from the primary cooling source 122 to the first bed 26 during the first adsorption process. Additionally or alternatively, in a similar manner, a second auxiliary fluid (e.g., heating water or water having a relatively high temperature) 130 supplied by the primary heating source 36 is flowable through the fifth fluid conduit 124 (and/or a different fluid conduit) from the primary heating source 36 to the first bed 26 to heat the first bed 26 during the first desorption process. In such examples, the fifth fluid conduit 124 (and/or a different fluid conduit) extends from the primary heating source 36 to the first bed 26 and fluidly couples the first bed 26 to the primary heating source 36. The first auxiliary fluid 128 is sometimes referred to as a cooling fluid, and the second auxiliary fluid 130 is sometimes referred to as a heating fluid.

In some examples, to facilitate temperature control of the first bed 26, the first bed 26 includes one or more heat transfer control members 132 positioned in the chamber 118 and/or coupled to the housing 116 of the first bed 26, one of which is shown in this example (i.e., a fourth heat transfer control member 132). In such examples, the heat transfer control member(s) 132 of the first bed 26 are configured to transfer heat, for example, from the first adsorbent 120 to the first auxiliary fluid 128, thereby cooling the first adsorbent 120 during the first adsorption process associated with the first bed 26. Each of the heat transfer member(s) 132 of the first bed 26 can be implemented, for example, using one or more fluid conduits such as pipe(s), tube(s), etc. that may have fins connected thereto. In particular, the heat transfer control member(s) 132 of the first bed 26 are configured to receive the first auxiliary fluid 128 and convey the first auxiliary fluid 128 through the chamber 118 of the first bed 26. Further, the heat transfer control member(s) 132 of the first bed 26 are exposed (e.g., directly) to the first adsorbent 120. For example, the heat transfer control member(s) 132 of the first bed 26 are in direct contact with the first adsorbent 120. According to the illustrated example of FIG. 1A, the heat transfer control member(s) 132 of the first bed 26 receive the first auxiliary fluid 128 from the cooling source 122 and expel the first auxiliary fluid 128 from the first bed 26. Additionally or alternatively, in some examples, the heat transfer control member(s) 132 of the first bed 26 receive a different fluid (e.g., the first saline fluid 22) for cooling the first bed 26, which is discussed in greater detail below in connection with FIG. 1B.

According to the illustrated example of FIG. 1A, the first auxiliary fluid 128 passes through the first bed 26 during operation of the desalination system 10 via the heat transfer control member(s) 132 of the first bed 26, which causes the temperature of the first bed 26 to decrease and/or remain relatively low. For example, the fourth heat transfer control member 132 extends through the bed housing 116 from the first inlet 126 of the first bed 26 to a first outlet (e.g., an opening positioned on the bed housing 116) 134 of the first bed 26. As such, the first auxiliary fluid 128 (and/or the second auxiliary fluid 130) is flowable through the fourth heat transfer control member 132 from the first inlet 126 to the first outlet 134. In such examples, when the first auxiliary fluid 128 flows through the fourth heat transfer control member 132, energy is transmitted through a wall of the fourth heat transfer control member 132 from an outer surface of the wall exposed to or near the first adsorbent 120 to an inner surface of the wall that is exposed to the first auxiliary fluid 128.

Although FIG. 1A depicts aspects in connection with the first bed 26, in some examples, such aspects likewise apply to one or more other beds of the AD system 16 such as, for example, the second bed 28. Further, although FIG. 1A depicts the first bed 26 that is particularly configured, in some examples, the first bed 26 of FIG. 1A is implemented differently to similarly provide such adsorption and/or desorption of the second saline fluid 34 during operation of the desalination system 10.

The second bed 28 of FIG. 1A is similar (e.g., identical) to the first bed 26. For example, the second bed 28 of FIG. 1A can be implemented, for example, using a fixed bed adsorber. According to the illustrated example of FIG. 1A, the second bed 28 includes a housing 136 forming a chamber (e.g., a sealed fluid chamber) 138 and a second adsorbent (e.g., silica gel and/or water) 140 positioned in the housing 136. Similar to the first bed 26, the second bed 28 of FIG. 1A is changeable between a first state (e.g., an unsaturated state) and a second state (e.g., a saturated state) different from the first state. Some disclosed examples carry out one or more second heating processes (e.g., a second preheating process, a second heating process, etc.) to provide a second desorption process associated with the second bed 28, which transitions the second bed 28 from the second state to the first state. During the second desorption process, the second bed 28 is sometimes referred to as desorption bed. Additionally or alternatively, examples disclosed herein carry out one or more second cooling processes (e.g., a second precooling process, a second cooling process, etc.) to provide a second adsorption process associated with the second bed 28, which transitions the second bed 28 from the first state to the second state. During the second adsorption process, the second bed 28 is sometimes referred to as an adsorption bed.

In some examples, a temperature of the second bed 28 is adjusted to change the state of the second bed 28, for example, via the primary heating source 36 and/or the primary cooling source 122. In particular, when the temperature of the second bed 28 decreases and/or is relatively low, the second adsorbent 140 adsorbs the vapor 40 as the second bed 28 transitions from the first state to the second state during the second adsorption process. Conversely, when the temperature of the second bed 28 increases and/or is relatively high, the second adsorbent 140 desorbs the vapor 40 as the second bed 28 transitions from the second state to the first state of the second bed 28 during the second desorption process.

In some examples, to facilitate transporting one or more fluids to the second bed 28 from the primary heating source 36 and/or the primary cooling source 122, the desalination system 10 of FIG. 1A also includes one or more other fluid conduits 142, one of which is shown in this example (i.e., a sixth fluid conduit 142). The sixth fluid conduit 142 is coupled to a portion of the second bed 28. As shown in FIG. 1A, the sixth fluid conduit 142 extends from the primary heating source 36 to a first inlet (e.g., an opening positioned on the bed housing 116) 144 of the second bed 28. In particular, the fifth fluid conduit 124 fluidly couples the second bed 28 to the primary heating source 36 such that the second auxiliary fluid 130 supplied by the primary heating source 36 is flowable through the sixth fluid conduit 142 from the primary heating source 36 to the second bed 28 during the second desorption process. Additionally or alternatively, in a similar manner, the first auxiliary fluid 128 supplied by the primary cooling source 122 is flowable through the sixth conduit 142 (and/or a different fluid conduit) from the primary cooling source 122 to the second bed 28 to cool the second bed 28 during the second adsorption process. In such examples, the sixth fluid conduit 142 (and/or a different fluid conduit) extends from the primary cooling source 122 to the second bed 28.

In some examples, to facilitate temperature control of the second bed 28, the second bed 28 includes one or more heat transfer control members 146 positioned in the chamber 138 and/or coupled to the housing 136 of the second bed 28, one of which is shown in this example (i.e., a fifth heat transfer control member 146). In such examples, the heat transfer control member(s) 146 of the second bed 28 are configured to transfer heat, for example, from the second auxiliary fluid 130 to the second adsorbent 140, thereby heating the second adsorbent 140 during the second desorption process associated with the second bed 28. Each of the heat transfer member(s) 146 of the second bed 28 can be implemented, for example, using one or more fluid conduits such as pipe(s), tube(s), etc. that may have fins connected thereto. In particular, the heat transfer control member(s) 146 of the second bed 28 are configured to receive the second auxiliary fluid 130 and convey the second auxiliary fluid 130 through the chamber 138 of the second bed 28. Further, the heat transfer control member(s) 146 of the second bed 28 are exposed (e.g., directly) to the second adsorbent 140. For example, the heat transfer control member(s) 146 of the second bed 28 are in direct contact with the second adsorbent 140. According to the illustrated example of FIG. 1A, the heat transfer control member(s) 146 of the second bed 28 receive the second auxiliary fluid 130 from the primary heating source 36 and expel the second auxiliary fluid 130 from the second bed 28.

According to the illustrated example of FIG. 1A, the second auxiliary fluid 130 passes through the second bed 28 during operation of the desalination system 10 via the heat transfer control member(s) 146 of the second bed 28, which causes the temperature of the second bed 28 to increase and/or remain relatively high. For example, the fifth heat transfer control member 146 extends through the bed housing 136 from the first inlet 144 of the second bed 28 to a first outlet (e.g., an opening positioned on the bed housing 136) 148 of the second bed 28. As such, the second auxiliary fluid 130 is flowable through the fourth heat transfer control member 132 from the first inlet 144 to the first outlet 148. In such examples, when the second auxiliary fluid 130 flows through the fifth heat transfer control member 146, energy is transmitted through a wall of the fifth heat transfer control member 146 from an inner surface of the wall that is exposed to the second auxiliary fluid 130 to an outer surface of the wall that is exposed to or near the second adsorbent 140.

Although FIG. 1A depicts aspects in connection with the second bed 28, in some examples, such aspects likewise apply to one or more other beds of the AD system 16 such as, for example, the first bed 26. Further, although FIG. 1A depicts the second bed 28 that is particularly configured, in some examples, the second bed 28 of FIG. 1A is implemented differently to similarly provide such adsorption and/or desorption of the second saline fluid 34 during operation of the desalination system 10. Further, although FIG. 1A depicts the two beds 26, 28, in some examples, the AD system 16 is implemented differently, for example, using one or more additional or fewer beds.

In some examples, to facilitate transporting one or more fluids between components of the AD system 16, the desalination system 10 of FIG. 1A also includes one or more other fluid conduits 150, 151, 152, 153, four of which are shown in this example (i.e., a seventh fluid conduit 150, an eighth fluid conduit 151, a ninth fluid conduit 152, and a tenth fluid conduit 153). Additionally, in such examples, to facilitate controlling a related flow of the vapor 40 through the fluid conduit(s) 150, 151, 152, 153, the desalination system 10 also includes one or more valves 154, 155, 156, 157, four of which are shown in this example (i.e., a first valve 154, a second valve 155, a third valve 156, and a fourth valve 157).

The seventh fluid conduit 150 of FIG. 1A is coupled to a portion of the evaporator 30 and a portion of the first bed 26. As shown in FIG. 1A, the seventh fluid conduit 150 extends from a third outlet (e.g., an opening positioned on the evaporator housing 98) 158 of the evaporator 30 to a second inlet (e.g., an opening positioned on the bed housing 116) 160 of the first bed 26. In particular, the seventh fluid conduit 150 fluidly couples the evaporator 30 to the first bed 26 such that the vapor 40 is flowable through the seventh fluid conduit 150 from the evaporator 30 to the first bed 26, for example, during the first adsorption process associated with the first bed 26 when the first valve 154 is at least partially open (as shown in FIG. 1A). In this manner, the vapor 40 is conveyed from the chamber 100 of the evaporator 30 to the chamber 118 of the first bed 26. On the other hand, in some examples, during the first desorption process associated with the first bed 26 when the first valve 154 is closed, the first valve 154 prevents the vapor 40 from flowing to the first bed 26 from the evaporator 30.

The first valve 154 of FIG. 1A is operatively interposed between the first bed 26 and the evaporator 30. For example, the first valve 154 is fluidly coupled to a portion of the seventh fluid conduit 150. In particular, the first valve 154 is configured to control a first flow of the vapor 40 from the evaporator 30 to the first bed 26 based on a position (e.g., an open position, a closed position, or a position between the open and closed position) of the first valve 154.

The eighth fluid conduit 151 of FIG. 1A is coupled to a portion of the first bed 26 and a portion of the condenser 32. As shown in FIG. 1A, the eighth fluid conduit 151 extends from a second outlet (e.g., an opening positioned on the bed housing 116) 162 of the first bed 26 to a second inlet (e.g., an opening positioned on the condenser housing 88) 164 of the condenser 32. In particular, the eighth fluid conduit 151 fluidly couples the first bed 26 to the condenser 32 such that the vapor 40 is flowable through the eighth fluid conduit 151 from the first bed 26 to the condenser 32, for example, during the first desorption process associated with the first bed 26 when the second valve 155 is at least partially open. In this manner, the vapor 40 is conveyed from the chamber 118 of the first bed 26 to the chamber 82 of the condenser 32. On the other hand, in some examples, during the first adsorption process associated with the first bed 26 when the second valve 155 is closed (as shown in FIG. 1A), the second valve 155 prevents the vapor 40 from flowing to the condenser 32 from the first bed 26. As such, the first bed 26 of FIG. 1A is fluidly coupled between the evaporator 30 and the condenser 32 via the seventh and eighth fluid conduits 150, 151.

The second valve 155 of FIG. 1A is operatively interposed between the first bed 26 and the condenser 32. For example, the second valve 155 is fluidly coupled to a portion of the eighth fluid conduit 151. In particular, the second valve 155 is configured to control a second flow of the vapor 40 from the first bed 26 to the condenser 32 based on a position (e.g., an open position, a closed position, or a position between the open and closed position) of the second valve 155.

The ninth fluid conduit 152 of FIG. 1A is coupled to a portion of the evaporator 30 and a portion of the second bed 28. As shown in FIG. 1A, the ninth fluid conduit 152 extends from a fourth outlet (e.g., an opening positioned on the evaporator housing 98) 166 of the evaporator 30 to a second inlet (e.g., an opening positioned on the bed housing 116) 168 of the second bed 28. In particular, the ninth fluid conduit 152 fluidly couples the evaporator 30 to the second bed 28 such that the vapor 40 is flowable through the ninth fluid conduit 152 from the evaporator 30 to the second bed 28, for example, during the second adsorption process associated with the second bed 28 when the third valve 156 is at least partially open. In this manner, the vapor 40 is conveyed from the chamber 100 of the evaporator 30 to the chamber 138 of the second bed 28. On the other hand, in some examples, during the second desorption process associated with the second bed 28 when the third valve 156 is closed (as shown in FIG. 1A), the third valve 156 prevents the vapor 40 from flowing to the second bed 28 from the evaporator 30.

The third valve 156 of FIG. 1A is operatively interposed between the second bed 28 and the evaporator 30. For example, the third valve 156 is fluidly coupled to the ninth fluid conduit 152. In particular, the third valve 156 is configured to control a third flow of the vapor 40 from the evaporator 30 to the second bed 28 based on a position (e.g., an open position, a closed position, or a position between the open and closed position) of the third valve 156.

The tenth fluid conduit 153 of FIG. 1A is coupled to a portion of the second bed 26 and a portion of the condenser 32. As shown in FIG. 1A, the tenth fluid conduit 153 extends from a second outlet (e.g., an opening positioned on the bed housing 136) 170 of the second bed 28 to a third inlet (e.g., an opening positioned on the condenser housing 88) 172 of the condenser 32. In particular, the tenth fluid conduit 153 fluidly couples the second bed 28 to the condenser 32 such that the vapor 40 is flowable through the tenth fluid conduit 153 from the second bed 28 to the condenser 32, for example, during the second desorption process associated with the second bed 28 when the fourth valve 157 is at least partially open (as shown in FIG. 1A). In this manner, the vapor 40 is conveyed from the chamber 138 of the second bed 28 to the chamber 82 of the condenser 32. On the other hand, in some examples, during the second adsorption process associated with the second bed 28 when the fourth valve 157 is closed, the fourth valve 157 prevents the vapor 40 from flowing to the condenser 32 from the second bed 28. As such, the second bed 28 of FIG. 1A is fluidly coupled between the evaporator 30 and the condenser 32 via the ninth and tenth fluid conduits 152, 153.

The fourth valve 157 of FIG. 1A is operatively interposed between the second bed 28 and the condenser 32. For example, the fourth valve 157 is fluidly coupled to the tenth fluid conduit 153. In particular, the fourth valve 157 is configured to control a fourth flow of the vapor 40 from the second bed 28 to the condenser 32 based on a position (e.g., an open position, a closed position, or a position between the open and closed position) of the fourth valve 157.

According to the illustrated example of FIG. 1A, the evaporator 30 is fluidly coupled to the humidifier 18 to receive the second saline fluid 34 from the humidifier 18. In some examples, to provide such fluid coupling, the desalination system 10 of FIG. 1A also includes one or more other fluid conduits 174, 176 defining a fluid path from the humidifier 18 to the evaporator 30, two of which are shown in this example (i.e., an eleventh fluid conduit 174 and a twelfth fluid conduit 176). In such examples, the second saline fluid 34 is flowable through the eleventh fluid conduit 174 and/or the twelfth fluid conduit 176 from the humidifier 18 to the evaporator 30 during operation of the desalination system 10. In this manner, the second saline fluid 34 is conveyed from the chamber 46 of the humidifier 18 to the chamber 100 of the evaporator 30.

In some examples, to facilitate storing the second saline fluid 34 and/or maintaining a level of the second saline fluid 34 in the humidifier 18 or the evaporator 30, the desalination system 10 includes a container (e.g., a brine container) 178 that is interposed between the humidifier 18 and the evaporator 30. For example, the container 178 is connected to the twelfth fluid conduit 176 to receive the second saline fluid 34 from the humidifier 18. Further, the container 178 is also connected to the eleventh fluid conduit 174 to provide to the second saline fluid 34 to the evaporator 30. As shown in FIG. 1A, the eleventh fluid conduit 174 extends from the container 178 to the second inlet 112 of the evaporator 30. Further, the twelfth fluid conduit 176 of FIG. 1A extends from a second outlet (e.g., an opening positioned on the humidifier housing 44) 179 of the humidifier 18 to the container 178. Although FIG. 1A depicts a single container 178, in some examples, the desalination system 10 includes one or more other containers in addition or alternatively to the container 178 of FIG. 1A.

Additionally, in some examples, the AD system 16 includes a throttling device 180 operatively interposed between the container 178 and the evaporator 30. For example, the throttling device 180 is fluidly coupled to a portion of the eleventh fluid conduit 174. In particular, the throttling device 180 is configured to adjust one or more fluid parameters associated with the second saline fluid 34 when the second saline fluid 34 passes across the throttling device 180. For example, the throttling device 180 decreases a fluid pressure associated with the second saline fluid 34, which may decrease a temperature of the second saline fluid 34 and/or evaporate at least some of the second saline fluid 34 in the eleventh fluid conduit 174. The throttling device 180 of FIG. 1 can be implemented, for example, using a flow control valve or any other suitable throttling device. As such, the throttling device 180 is sometimes referred to as a throttling valve or a valve.

Further, the evaporator 30 of FIG. 1A is fluidly coupled to the dehumidifier 20 to provide the first saline fluid 22 thereto, for example, after the evaporator 30 cools the first saline fluid 22 using the second saline fluid 34. In some examples, to provide such a fluid coupling, the desalination system 10 also includes one or more other fluid conduits 182 defining a fluid path from the evaporator 30 to the dehumidifier 20, one of which is shown in this examples (i.e., a thirteenth fluid conduit) 182. The thirteenth fluid conduit 182 is coupled to a portion of the evaporator 30 and a portion of the dehumidifier 20. As shown in FIG. 1A, the thirteenth fluid conduit 182 extends from the first outlet 110 of the evaporator 30 to the first inlet 62 of the dehumidifier 20. In such examples, the first saline fluid 22 is flowable through the thirteenth fluid conduit 182 from the evaporator 30 to the dehumidifier 20. In particular, the evaporator 30 of FIG. 1A is configured to cool, via the second saline fluid 34, the first saline fluid 22 before the first saline fluid 22 is conveyed from the evaporator 30 to the dehumidifier 20, which improves performance of the HDH system 14. In such examples, the dehumidifier 20 of FIG. 1A is fluidly coupled between the humidifier 18 and the saline fluid source 104 such that the first saline fluid 22 is conveyable through the dehumidifier 20 from the saline fluid source 104 to the humidifier 18.

One or more (e.g., all) of the valves 154, 155, 156, 157, 180 of FIG. 1A can be implemented using a flow control valve such as, for example, one of (a) a rotary valve (e.g., a butterfly valve, a ball valve, a plug valve, etc.), (b) a linear valve (e.g., a globe valve, a gate valve, a diaphragm valve, etc.), (c) etc., or (d) any other suitable valve. Additionally or alternatively, one or more (e.g., all) of the valve(s) 154, 155, 156, 157 can be implemented using an on/off valve such as, for example, a shut off valve. In some examples, to facilitate changing a position of a valve 154, 155, 156, 157, 180, each of the valve(s) 154, 155, 156, 157, 180 includes a valve actuator operatively coupled thereto such as, for example, an electric valve actuator, a pneumatic valve actuator, a hydraulic valve actuator, etc.

In some examples, to facilitate controlling operating parameters associated with the HDH system 14 and the AD system 16, the desalination system 10 includes an example controller 184. The controller 184 of FIG. 1A can be implemented, for example, using one or more microprocessors, one or more control panels, one or more servers, etc., or a combination thereof. The controller 184 is communicatively coupled to the valve actuator(s) associated with the valve(s) 154, 155, 156, 157, 180 to provide one or more control signals or commands and/or electrical power thereto, for example, via one or more transmission or signal wires, a bus, radio frequency, etc., as discussed further below in connection with FIG. 19. In some examples, the controller 184 is configured to control, via the valve actuator(s), one or more (e.g., all) of the first valve 154, the second valve 155, the third valve 156, and/or the fourth valve 157 to synchronize (a) the first adsorption and desorption processes associated with the first bed 26 and (b) the second adsorption and desorption processes associated with the second bed 28. As a result of such synchronization, the first and second beds 26, 28 alternate exhausting the heat for the condenser 32 during operation of the desalination system 10, which enables the HDH system 14 and the AD system 16 to provide a substantially continuous production of the freshwater 24. Additionally or alternatively, in some examples, the controller 184 is configured to control one or more other fluid control devices of the desalination system 10 to adjust and/or maintain the operating parameters during desalination such as, for example, one or more heating elements, one or more pumps, one or more air blowers, etc.

Figure 1B:
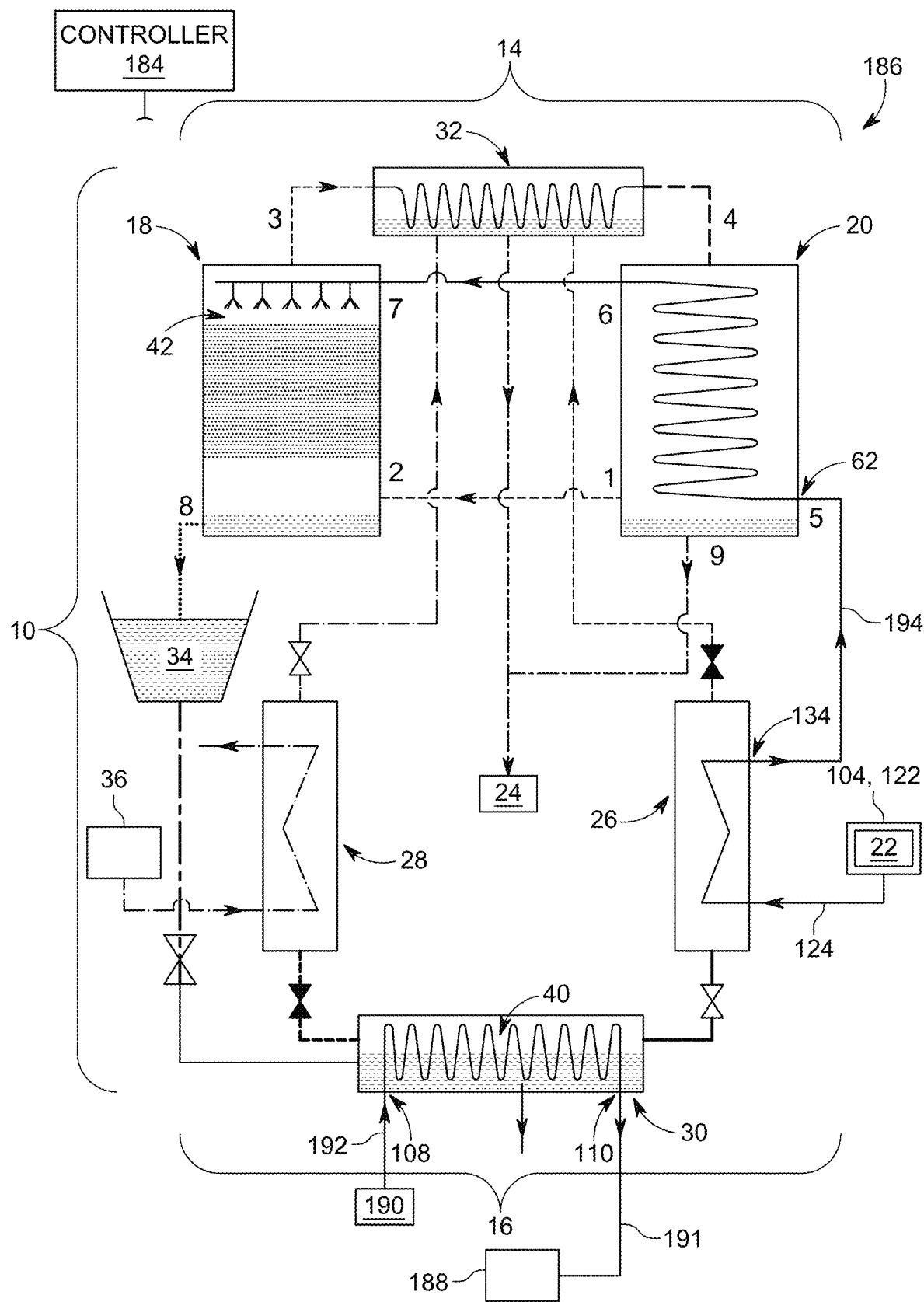
FIG. 1B illustrates another schematic diagram of the example desalination system of FIG. 1A and shows a second scheme thereof in accordance with the teachings of this disclosure.

FIG. 1B illustrates another schematic diagram of the example desalination system 10 of FIG. 1A and shows a second scheme 186 thereof in accordance with the teachings of this disclosure. The second scheme 186 of the desalination system 10 is substantially similar to the first scheme 12. For example, the HDH system 14 of FIG. 1B includes the humidifier 18 and the dehumidifier 20 that, together, are configured to process the first saline fluid 22 to produce at least some of the freshwater 24 in the dehumidifier 20. Further, the AD system 16 of FIG. 1B includes the first and second beds 26, 28, the evaporator 30, and the condenser 32 that, together, are configured to process the second saline fluid 34 to produce at least some of the freshwater 24 in the condenser 32. According to one or more disclosed examples, the desalination system 10 of FIG. 1B is structured and/or configured such that the primary heating source 36 of the AD system 16 drives the AD system 16 and, in turn, drives the HDH system 14. For example, the condenser 32 of FIG. 1B is configured to transfer heat exhausted by at least one of the beds 26, 28 from the vapor 40, obtained from the second saline fluid 34, to the air (e.g., humid air) 42 circulating through the humidifier 18, the dehumidifier 20, and the condenser 32 to drive the HDH system 14.

Unlike the illustrated example of FIG. 1A, the evaporator 30 of FIG. 1B is configured to cool an external environment (e.g., an environment that is external to the desalination system 10) 188 via the second saline fluid 34 and a third auxiliary fluid (e.g., water) 190. According to the illustrated example of FIG. 1B, the evaporator 30 is fluidly coupled to the external environment 188, for example, via a fourteenth fluid conduit 191 of the desalination system 10. The fourteenth fluid conduit 191 of FIG. 1B is coupled to a portion of the evaporator 30 and extends from the first outlet 110 of the evaporator 30 to the external environment 188. As such, the third auxiliary fluid 190 is flowable through the fourteenth fluid conduit 191 from evaporator 30 to the external environment 188. During desalination, the third auxiliary fluid 190 is conveyed to the first inlet 108 of the evaporator 30 (e.g., from a fluid source or the external environment 188) via a fifteenth fluid conduit 192 coupled to a portion of the evaporator 30, which causes at least some of the second saline fluid 34 in the evaporator 30 to evaporate. That is, heat is transferred in the evaporator 30 from the third auxiliary fluid 190 to the second saline fluid 34, thereby decreasing a temperature of the third auxiliary fluid 190 and generating the vapor 40. Then, the third auxiliary fluid 190, which has been cooled, is conveyed from the evaporator 30 to the external environment 188 via the fourteenth fluid conduit 191 for further heat exchange with the external environment 188.

Additionally, unlike the illustrated example of FIG. 1A, the first bed 26 of FIG. 1B is fluidly coupled to the dehumidifier 20, for example, via a sixteenth fluid conduit 194 of the desalination system 10. The sixteenth fluid conduit 194 of FIG. 1B is coupled to a portion of the first bed 26 and a portion of the dehumidifier 20. As shown in FIG. 1B, the sixteenth fluid conduit 194 extends from the first outlet 134 of the first bed 26 to the first inlet 62 of the dehumidifier 20. In such examples, the first saline fluid 22 is flowable through the sixteenth fluid conduit 194 from the first bed 26 to the dehumidifier 20. Further, as shown in FIG. 1B, the first bed 26 is fluidly coupled to the saline fluid source 104, for example, via the fifth fluid conduit 124. That is, the first bed 26 of FIG. 1B is fluidly coupled between the dehumidifier 20 and the saline fluid source 104. In particular, in such examples, the first saline fluid 22 cools the first bed 26 when the first saline fluid 22 is conveyed through the first bed 26 from the saline fluid source 104 to the dehumidifier 20. As such, the saline fluid source 104 of FIG. 1B is used to implement and/or corresponds to the primary cooling source 122.

According to the illustrated examples of FIGS. 1A and 1B, for the two proposed hybridizations, the second saline fluid 34 is rejected from the HDH system 14 (e.g., via the humidifier 18) and used as an input to the AD evaporator 30. For both of the schemes 12, 186, the AD condenser 32 is used as a heating source for the HDH system 14; it is employed as a heat recovery process. For the first scheme 12, the first saline fluid 22 enters the HDH system 14 after passing through the AD evaporator 30 to get some cooling. This cold saline fluid 22 then passes through the dehumidifier 20 (state 5-state 6) for condensing a water content in the humid air 42 (coming from the dehumidifier 20). Then, the first saline fluid 22 is sprayed (e.g., via the nozzle(s) 48) inside the humidifier 18 (state 7) to exchange some heat and mass (water content) with the air 42 coming from the dehumidifier 20 (state 2). The remaining saline fluid 34 is extracted at the bottom of the humidifier 18 (state 8) to the container 178 to be used as a water resource feeding the AD evaporator 30. The air 42 is recirculated in the HDH system 14 in a closed loop passing through the dehumidifier 20, the AD condenser 32, and the humidifier 18. It is then collected as a water content by exchanging with the first saline fluid 22 in the humidifier 18 to be condensed in the dehumidifier 20 and accumulated as freshwater.

The AD system 16 works in two primary processes (e.g., adsorption and desorption). In some examples, these two primary processes occur simultaneously. In the adsorption process, the evaporator 30 is connected with an adsorption bed through an open valve 154 such as, for example, the first bed 26. In such examples, some of the second saline fluid 34 is evaporated in the evaporator 30 and gets adsorbed in the first bed 26, thereby producing some cooling in the evaporator 30 (e.g., which is used to cool down a portion of the first saline fluid 22 that is input to the HDH system 14) and some heating in the first bed 26 (e.g., the first auxiliary fluid 128 is used to dissipate the adsorption heat). On the other hand, in such examples, the second bed 28, which is assumed saturated with the vapor 40 (after the second adsorption process associated with the second bed 28), is heated up using the primary heating source 36 to desorb the vapor 40 from the second adsorbent material 140 in the second bed 28 and then condensed in the condenser 32. Because the desorbed vapor 40 is considerably hot, it is cooled in the condenser 32 using the circulated air 42 coming out from the humidifier 18. The mutual benefit in this condensation process is to power the HDH system 14 by heating the recirculated air 42 and to condense the vapor 40 coming from a desorption bed (e.g., the second bed 28) to produce some amounts of the freshwater 24. In this regard, the first portion 56 of the freshwater 24 produced by HDH system 14 (state 9) plus the second portion 90 of the freshwater 24 produced in the AD condenser 32 form the total freshwater 24 of the hybrid system 10.

The second scheme 186 of FIG. 1B is similar to the first scheme 12 with an exception of that the first saline fluid 22 is used to cool down an adsorption bed (e.g., the first bed 26) and then enters the HDH dehumidifier 20 instead of getting some cooling in the evaporator 30. Therefore, a cooling effect produced by the evaporator 30 can be used for air conditioning purposes; it is considered as a byproduct. For the two schemes 12, 186, each of the beds 26, 28 in the AD system 16 works through consecutive processes such as, for example, adsorption, preheating switch, desorption, and precooling switch. In some examples, to make a continuous operation, the first adsorption process associated with the first bed 26 is synchronized with the second desorption process associated with the second bed 28. The timing details of each process are illustrated in Table 1 below. More information about the concept of adsorption cycles is described in Wu et al (2012) and Qasem et al. (2015). See J. W. Wu, E. J. Hu, M. J. Biggs, Thermodynamic cycles of adsorption desalination system, Appl. Energy 90 (2012) 316-322, world wide web.doi.org/10.1016/j.apenergy.2011.04.049; see also N. A. A. Qasem, M. A. I. El-Shaarawi, Thermal analysis and modeling study of an activated carbon solar adsorption icemaker: Dhahran case study, Energy Conyers. Manag. 10 (2015), world wide web.doi.org/10.1016/j.enconman.2015.04.054, each of which is incorporated herein by reference in their entirety.

TABLE 1

Basic processes and timing of two beds adsorption desalination.

| Cycle Time* | 0-640 s | 604-660 s | 660-1300 s | 1300-1320 s |
|---|---|---|---|---|
| Bed #1 | Adsorption | Preheated | Desorption | Precooling |
| Bed #1 | Desorption | Precooling | Adsorption | Preheated |

*Cycle time values are taken as an example.

Mathematical Modeling

The desalination system 10 of FIGS. 1A and 1B has the components of both the AD and HDH systems 16, 14; thus, its models involve the implementation of the mass and energy conservation for each component. A reliable AD system model is the one that contains the phenomena of both the adsorption behavior and adsorption kinetics. To do this, the model should be a "transient model" to include adsorption kinetics. This results in time-variant operating parameters (e.g., the temperature). So, the (prevalent) steady state processes for HDH components in the literature will be taken here as a pseudo steady state due to a variation of temperature values with time.

Adsorption Desalination Model

For modeling the AD system 16, the following assumptions are considered:

(a) the adsorbent material 120, 140 is homogenous;
(b) the system components 26, 28, 30, 32 are well insulated;
(c) thermal resistance between adsorbent tubes 132, 146 and the adjacent adsorbent 120, 140 is neglected;
(d) pumping energy of the heating and cooling fluids 130, 128 is neglected compared to the amount of energy provided for heating; and Equilibrium Adsorption Capacity and Adsorption Kinetics.

To evaluate the water vapor adsorption uptake, the adsorption uptake and kinetics are implemented. The Dubnin-Astackov (D-A) model is reported as more appropriate for water vapor sorption. See A. S. Alsaman, A. A. Askalany, K. Harby, M. S. Ahmed, Performance evaluation of a solar-driven adsorption desalination-cooling system, Energy 128 (2017) 196-207, world wide web.doi.org/10.1016/j.energy.2017.04.010, incorporated herein by reference in its entirety. This model can be expressed by Eq. (1) below:

$$q_{eq} = q_{max} \exp\left(-\left(\frac{RT}{E}\ln\left(\frac{P_{bed,sat}}{P_{sorp}}\right)\right)^n\right) \quad (1)$$

In Eq. (1) above, "$q_{eq}$" represents an equilibrium adsorption capacity that is obtained from adsorption isotherms. However, an actual adsorption uptake (q) is estimated from adsorption kinetics using a linear driving force (LDF) model. See N. A. A. Qasem, R. Ben-Mansour, Adsorption breakthrough and cycling stability of carbon dioxide separation from CO2/N2/H2O mixture under ambient conditions using 13× and Mg-MOF-74, Appl. Energy 230 (2018) 1093-1107, world wide web.doi.org/10.1016/j.apenergy.2018.09.069; R. Ben-Mansour, N. A. A. Qasem, M. A. Antar, Carbon dioxide adsorption separation from dry and humid CO2/N2 mixture, Comput. Chem. Eng. 117 (2018), world wide web.doi.org/10.1016/j.compchemeng.2018.06.016; N. A. A. Qasem, R. Ben-Mansour, M. A. Habib, An efficient CO2 adsorptive storage using MOF-5 and MOF-177, Appl. Energy 210 (2018) 317-326, world wide web.doi.org/10.1016/j.apenergy.2017.11.011; and N. A. A. Qasem, R. Ben-Mansour, Energy and productivity efficient vacuum pressure swing adsorption process to separate CO2 from CO2/N2 mixture using Mg-MOF-74:a CFD simulation, Appl. Energy 209 (2018) 190-202, world wide web.doi.org/10.1016/j.apenergy.2017.10.098, each of which is incorporated herein by reference in its entirety.

$$\frac{dq}{dt} = k_L(q_{eq} - q) \quad (2)$$

In Eq. (2) above, $k_L$ (in 1/s) is an LDF constant that can be determined from the adsorption kinetics as, $$k_L = \frac{A_o D_c}{r_p^2} \exp\left(\frac{-E_a}{RT}\right) \quad (3)$$

See Alsaman et al. (2017).

Sorption Beds

The energy conservation of a sorption (e.g., adsorption or desorption) bed, such as the first bed 26 or the second bed 28, involves the heat stored into the bed (adsorbent, metal (tubes and fins), and adsorbed water vapor), heat transfer between the bed and heating or cooling water, and adsorption or desorption heat. Such energy conservation is represented by Eq. (4) below, $$\left[(mc_p)_{tubes} + (mc_p)_{fins} + (mc_p)_s + m_s c_v q\right]_{bed} \frac{dT_{bed}}{dt} = \quad (4)$$
$$m_s \Delta H \frac{dq}{dt} + \dot{m}_w c_{p,w}(T_{w,i} - T_{w,e})$$

In Eq. (4) above, the subscript 'w' can represent heating water (hw) during adsorption and preheating processes or cooling water (cw) during adsorption and precooling processes. For preheating and precooling switching processes, the first term in the left hand side of Eq. (4) is zero. The ΔH in Eq. (4) represents the adsorption heat that is estimated from adsorption isotherm curves as, $$\Delta H = h_{fg} + E\ln\left(\frac{q_{max}}{q_{eq}}\right)^{1/n} + \frac{ET\alpha}{n}\ln\left(\frac{q_{max}}{q_{eq}}\right)^{(1-n)/n} \quad (5)$$

See D. M. Ruthven, Fundamentals of adsorption equilibrium and kinetics in microporous solids, Mol. Sieves Sci. Technol. 7 (2008) 1-43, world wide web.doi.org/10.107/3829_007, incorporated herein by reference in its entirety.

Condenser

The AD condenser 32 is used to condense the desorbed water vapor from the desorption process; its heat rejected can be used to heat up the HDH air 42 recirculated between state 3 and state 4 (e.g., refer to FIGS. 1A and 1B). The mass balance of condenser inputs and outputs is expressed in Eq. (6) below.

$$\frac{dm_{cond}}{dt} = m_s\left(\frac{dq}{dt}\right)_{des} \quad (6)$$

And that can be considered as the second portion 90 of the freshwater 24 obtained from the AD system 16.

$$\dot{m}_{pw,1} = \frac{dm_{cond}}{dt} \quad (7)$$

The energy conservation of the condenser 32 includes the heat stored in the condenser 32 (e.g., heat stored in metals (tubes and fins (if any), and the accumulated water vapor), cooling energy of the vapor 40 provided by the desorption process, latent heat of condensation, heat exchange between the condensed water and another stream (e.g., HDH air or seawater). Such energy conservation is represented by Eq. (8) below, $$[(mc_p)_{tubes} + (mc_p)_{fins} + (mc_p)_w]_{cond} \frac{dT_{cond}}{dt} = m_s c_{pwv} \quad (8)$$
$$(T_{des} - T_{cond})\left(\frac{dq}{dt}\right)_{des} + m_s h_{fg}(T_{cond})\left(\frac{dq}{dt}\right)_{des} + \dot{m}_a(h_3 - h_4)$$

Evaporator

The AD evaporator 30 is a vital component in the desalination system 10 due to its participation in a desalination mechanism and producing a cooling effect. Therefore, in some examples, the mass balance equation of the evaporator 30 is important by means of some HDH brine (e.g., generated and/or rejected by the humidifier 18), which is supplied to the evaporator 30 as a water source, some water evaporates from it to be adsorbed by an adsorption bed (e.g., first bed 26 and/or the second bed 28), and some of the brine leaves the evaporator 30 at high salinity. The inlet saline fluid (e.g., the HDH brine) to the evaporator 30 can be achieved intermittently to maintain a constant level of liquid (saline water) inside the evaporator 30. While the exit highly saline brine is removed from the evaporator 30 occasionally, for example, when the highly saline brine reaches >180-220 ppt. It is recommended to be further treated for producing salt as a second byproduct (the first by-product is the cooling effect produced using the second scheme 186). The evaporator mass and salt concentration conservation equations are as follows:

$$\frac{dm_{sw,evap}}{dt} = \gamma \dot{m}_{b,HDH} - \theta \dot{m}_{b,AD} - m_s\left(\frac{dq}{dt}\right)_{ads} \quad (9)$$

$$m_{sw,evap} \frac{dC_{sw,evap}}{dt} = \gamma C_{b,HDH}\dot{m}_{b,HDH} - \theta C_{b,Ad}\dot{m}_{b,AD} - C_{ads}m_s\left(\frac{dq}{dt}\right)_{ads} \quad (10)$$

The evaporator energy conservation equation is a balance of heat stored into the evaporator 30 (metals (tubes and fins (if any)) and water), feeding HDH brine energy, leaving AD brine energy, latent heat of evaporation, heat exchange between the evaporated water and chilled stream (e.g., to cool seawater in the first scheme 12 or to produce the cooling effect (pure water) in the second scheme 186). It is given as, $$[(mc_p)_{tubes} + (mc_p)_{fins} + (mc_p)_{sw}]_{evap} \frac{dT_{evap}}{dT} = \quad (11)$$
$$\gamma \dot{m}_{b,HDH} h_{b,HDH}(T_{b,HDH}, C_{b,HDH}) - \theta \dot{m}_{b,AD} h_{b,AD}(T_{eva}, C_{eva}) -$$
$$m_s h_{fg}(T_{eva}, C_{eva})\left(\frac{dq}{dt}\right)_{ads} + \dot{m}_{ch} c_{p,chw}(T_{chw,i} - T_{chw,e})$$

The symbols γ and θ are unity when the feeding saline water and AD brine enters and leaves the evaporator 30, respectively. Otherwise, they are zero.

Heat Exchangers

The heating and cooling processes for the beds 26, 28 and the heat exchange in the condenser 32 and evaporator 30 with the secondary fluid can be written using the LMTD method as, $$T_{y,o} = T_{hx} + (T_{y,i} - T_{hx})\exp\left(\frac{-UA_{hx}}{(mc_p)_y}\right) \quad (12)$$

where the subscript "y" denotes recirculated air, heating water, cooling water, or chilled water, and "hx" indicates the heat exchanger such as, for example, the first bed 26, the second bed 28, the condenser 32, and/or the evaporator 30.

Humidification Dehumidification Desalination

The HDH is simulated under the following assumptions:
- the HDH components 18, 20 and associated fluid conduits 70, 72, 74 are well insulated;
- Energy consumption for a seawater pump and an air blower is neglected; and
- Outlet air 42 from the humidifier 18 and dehumidifier 20 is saturated.

Mass flow rate ratio

The mass flowrate ratio is defined as the mass flowrate of the first saline fluid 22 to that of the circulated air 42. It is given by:

$$MR = \frac{\dot{m}_{sw}}{\dot{m}_a} \quad (13)$$

Dehumidifier

The mass and energy conservation equations of the dehumidifier 20 include heat and mass of the first saline fluid 22, and the change in water content of the humid air 42 due to the condensation. These can be expressed by the following equations:

$$\dot{m}_{pw,2} = \dot{m}_a(\omega_4 - \omega_1) \quad (14)$$

$$\dot{m}_a(h_4 - h_1) - \dot{m}_{pw,2}h_9 = \dot{m}_{sw}(h_6 - h_5) \quad (15)$$

It is important to introduce the dehumidifier effectiveness to help in unknowns calculation. It is estimated from either the energy ratio of the first saline fluid 22 or air 42 to that of the maximum possible energy.

$$\varepsilon_{deh} = \max\left(\frac{(h_6 - h_5)}{(h_{ideal,6} - h_5)}, \frac{(h_4 - h_1)}{(h_4 - h_{ideal,1})}\right) \quad (16)$$

Here, "$h_{idea,6}$" represents an outlet enthalpy of the first saline fluid 22 when its temperature is equal to an inlet air dry bulb temperature at state 4, and "$h_{idea,1}$" is an outlet enthalpy of the saturated air 42 at an inlet temperature of the first saline fluid 22 (state 5).

Humidifier

For the humidifier 18, an inlet saline fluid (e.g., a portion of the first saline fluid 22 passing into the humidifier 18 at the first humidifier inlet 68) exchanges some heat with inlet air (e.g., a portion of the air 42 passing into the humidifier 18 at the second humidifier inlet 78). Therefore, mass and heat transfers occur. The mass and energy balance equations are given by:

$$\dot{m}_{pw,2} = \dot{m}_{sw} - \dot{m}_{b,HDH} \tag{17}$$

$$\dot{m}_a(h_3 - h_2) \times (\dot{m}_{zw}h_7 - \dot{m}_{b,HDH}h_8) \tag{18}$$

It is important to introduce the dehumidifier effectiveness to help in unknowns' calculation as, $$\varepsilon_{hum} = \max\left(\frac{(h_7 - h_8)}{(h_7 - h_{ideal,8})}, \frac{(h_3 - h_2)}{(h_{ideal,3} - h_2)}\right) \tag{19}$$

Here, "$h_{ideal,8}$" represents an outlet enthalpy of the second saline fluid 34 when its temperature is equal to an inlet air dry bulb temperature at state 2, and "$h_{ideal,3}$" is an outlet enthalpy of the saturated air 42 at an inlet temperature of the first saline fluid 22 (state 7).

On using Eqs. (16) and (19) to determine the dehumidifier and humidifier effectiveness, the entropy generation of the humidifier 18 and dehumidifier 20 should be equal or larger than zero to avoid obtained invalid results that violate the second law of thermodynamics. They can be calculated as expressed in Eq. (20) for the humidifier 18 and Eq. (21) for the dehumidifier 20, respectively.

$$\dot{S}_{gen,hum} = \dot{m}_{b,HD}s_8 - \dot{m}_{mw}s_7 + \dot{m}_a(s_3 - s_2) \geq 0 \tag{20}$$

$$\dot{S}_{gen,deh} = \dot{m}_{sw}(s_6 - s_5) + \dot{m}_a(s_2 - s_4) + \dot{m}_{pw,2}s_q \geq 0 \tag{21}$$

Hybrid System Performance

The water production from both the AD and HDH systems 16, 14 can be represented by:

$$\dot{m}_{pw} = \dot{m}_{pw,1} + \dot{m}_{pw,2} \tag{22}$$

The performance index "gained output ratio" (GOR) is used frequently to evaluate the efficiency of the HDH system 14. It is important to note that GOR values are small for the AD; so that, it is not usually used. In the present hybrid system, GOR is evaluated for the desalination system 10 as a whole and for individual systems (i.e., the AD system 16 and the HDH system 14) to show their contributions as follows.

$$GOR = \int_0^{t_{cycle}} \frac{\dot{m}_{pw} h_{fg}}{\dot{m}_{hw}(h_{hw,i} - h_{hw,0})} dt \tag{23}$$

$$GOR_{AD} = \int_0^{t_{cycle}} \frac{\dot{m}_{pw,1} h_{fg}}{\dot{m}_{hw}(h_{hw,i} - h_{hw,0})} dt \tag{24}$$

$$GOR_{HDH} = \int_0^{t_{cycle}} \frac{\dot{m}_{pw,2} h_{fg}}{\dot{m}_{hw}(h_{hw,i} - h_{hw,0})} dt \tag{25}$$

It is important to calculate the cooling effect that is obtained from the AD system 16 of the second scheme 186. This can be written in terms of the coefficient of performance (COP) i.e. the ratio of cooling effect to the heat input as, $$COP = \int_0^{t_{cycle}} \frac{\dot{m}_{chw}(h_{chw,i} - h_{chw,o})}{\dot{m}_{hw}(h_{hw,i} - h_{hw,o})} dt \tag{26}$$

Constructive and Operating Conditions

For the AD system 16, the beds 26, 28 are considered similar to those reported in the experimental work of Alsaman et al. (2017) due to an optimized bed filled with silica gel (which is available in markets as cheap, and stable). The properties of the two identical beds 26, 28, the condenser 32, and the evaporator 30 are listed below in Table 2.

TABLE 2

AD component characteristics [28].

| Property | Value |
|---|---|
| Bed overall heat transfer coefficient, $UA_{bed}$ | 0.6 kW/K |
| Evaporator overall heat transfer coefficient, $UA_{evap}$ | 0.35 kW/K |
| Condenser overall heat transfer coefficient, $UA_{cond}$ | 0.5 kW/K |
| Bed tubes mass, $m_{tube}$ | 2.97 kg |
| Bed fins mass, $m_{fin}$ | 0.72 kg |
| Bed heat exchanger cover mass, $m_{iron}$ | 15 kg |
| Condenser metal mass, $m_{cond}$ | 1.533 kg |
| Evaporator metal mass, $m_{evap}$ | 1.3 kg |
| Silica-gel mass in each bed, $m_s$ | 6.75 kg |
| Specific heat capacity of bed tubes, $C_{p,tube}$ | 0.386 kJ/kg · K |
| Specific heat capacity of bed fins, $c_{p,fin}$ | 0.905 kJ/kg · K |
| Specific heat capacity of silica-gel, $c_{p,tube}$ | 0.924 kJ/kg · K |
| Amount of saline water in the evaporator, $m_{sw,evap}$ | 3 kg |
| Universal gas constant, R | 8.314 kJ/kmol · K |
| Typical inlet heating temperature, $T_{hw,i}$ | 80° C. |
| Typical inlet cooling temperature, $T_{cw,i} = T_{sw,i}$ | 30° C. |
| Typical inlet chilled water temperature, $T_{chw,i}$ | $T_{cw,i}$ |

The equilibrium and kinetic adsorption properties of the silica gel and $H_2O$ pair that is important to calculate equilibrium and actual uptakes (Eqs. (1)-(3)) are listed below in Table 3.

TABLE 3

Silica-gel/water adsorption properties [28].

| Property | Value |
|---|---|
| Maximum update, $q_{eq}$ | 0.36 kg/kg |
| Characteristic energy, E | 167.7 kJ/kg |
| Constant, n | 1.68 |
| Constant, $A_o$ | 32 |
| Activation energy, $E_n$ | 28.67 kJ/kg |
| Diffusion coefficient, $D_c$ | 22.5 × 10$^{-9}$ m$^2$/s |
| Adsorbent particle radius, $r_p$ | 0.00175 m |

The typical operating conditions of HDH system 14 is the output of AD component temperatures based on each hybrid design (e.g., the inlet temperature of the first saline fluid 22 of the first scheme 12 is the outlet chilled water temperature of the AD system 16). The HDH operating pressure is assumed to be at ambient pressure (i.e., 101.3 kPa). The humidifier and dehumidifier effectiveness values are taken as 0.85. The initial condition could be defined from pre tested cycles, as illustrated below in Table 4.

TABLE 4

Initial operation conditions that are taken from recycled sorption under the typical operation conditions listed in Table 1.

| Operating conditions | Value |
|---|---|
| Adsorbent bed temperature, T(Bed #1) | 79° C. |
| Desorption bed temperature, T(Bed #2) | 34° C. |
| Adsorbent bed uptake, q (Bed #1) | 0.15 kg/kg |
| Desorption bed uptake, q (Bed #2) | 0.26 kg/kg |
| Condensation temperature, $T_{cond}$ | 45° C. |
| Evaporator temperature, $T_{evap}$ | 30° C. |
| HDH terminal temperatures, $T_{sw}$ and $T_a$ | 30° C. |
| Evaporator salinity, $C_{evap}$ | 35 mol/m$^3$ |
| Brine salinity, $C_{b1}$ and $C_{b2}$ | 35 mol/m$^3$ |

It is important to note that the variation of thermal properties is considered. The water thermodynamic properties are calculated using REFPROP software whereas the saline water properties are estimated as described by Sharqawy et al. (2010); Bromley et al. (1970); and IAPWS Release on the Thermodynamic Properties of Ordinary Water Substance (1996); the salinity is considered up to 180 ppt. See REFPROP, Standard reference data, version 10, 208. world wide web.www.nist.gov/srd/refprop/(accessed Jun. 24, 2018); M. Sharqawy, J. H. Lienhard V, S. M. Zubair, The thermophysical properties of seawater: a review of existing correlations and data, Desalin. Water Treat. 16 (2010) 354-380, world wide web.doi.org/10.5004/dwt.2010.1079; L. A. Bromley, A. E. Diamond, E. Salami, D. G. Wilkins, Heat capacities and enthalpies of sea salt solutions to 200° C., J. Chem. Eng. Data 15 (1970) 246-253, world wide web.doi.org/10.1021/je60045a038; and IAPWS Release on the Thermodynamic Properties of Ordinary Water Substance, (1996), each incorporated herein by reference in their entirety. The air humid properties are taken based on the properties of water content and dry air. See E. Lemmon, R. T. Jacobsen, S. G. Peoncello, D. G. Friend, Thermodynamic properties of air and mixtures of nitrogen, argon, and oxygen from 60 to 2000 K at pressure to 2000 MPa, J. Phys. Chem. Ref. Data 29 (1985) 331-385, world wide web.doi.org/10.163/1.1285884; and EES: Engineering Equation Solver F-chart software: engineering software, 2018. http://www.fchart.com/ees/(accessed Jun. 24, 2018), each of which is incorporated herein by reference in its entirety. The MATLAB software is used to implement the simulation; "fsolve" and "ode45" algorithms are simultaneously used to solve HDH and AD equations, respectively. The computational tolerance error is taken <10$^{-10}$.

Economic Analysis

The cost of the freshwater 24 produced from the two HDH AD schemes 12, 186 is evaluated as suggested by El Dessouky and Ettouney. See H. T. El-Dessouky, H. M. Ettouney, Fundamentals of Salt Water Desalination, Elsevier Science, North Holland, 2002, incorporated herein by reference in its entirety. The capital cost of the investigated components of HDH and AD systems 14, 16 are listed below in Table 5 based on the real purchasing prices with some assumptions. These assumptions are as follows:

- the second auxiliary fluid 130 is heated using an electrical heater of the primary heating source 36 while the unit cost of electricity (COE) is 0.07$/kWh;
- specific cost of labor (1)=$0.1/m$^3$ and the annual management cost is 20% of the labor cost;
- the annual maintenance cost is 1.5% of the capital investment cost;
- the interest rate (i) is 5%;
- the plant life expectancy (y) is 30 years;
- the availability of the plant (f) is 0.9; and
- due to the outdoor location of the plant and operating in a rural zone, the land cost is neglected.

See El-Dessouky et al. (2002); Y. Wang, N. Lior, Thermoeconomic analysis of a low-temperature multi-effect thermal desalination system coupled with an absorption heat pump, Energy 36 (2011) 3878-3887, world wide web.doi.org/10.1016/j.energy.2010.09.028; A. E. Kabeel, T. A. Elmaaty, E. M. S. El-Said, Economic analysis of a small-scale hybrid air HDH-SSF (humidification and dehumidification-water flashing evaporation) desalination plant, Energy 53 (2013) 306-311, world wide web.doi.org/10.1016/j.energy.2013.02.042; and M. I. Zubair, F. A. Al-Sulaiman, M. A. Antar, S. A. Al-Dini, N. I. Ibrahim, Performance and cost assessment of solar driven humidification dehumidification desalination system, Energy Conyers. Manag. 132 (2017) 28-39, world wide web.doi.org/10.1016/j.enconman.2016.10.005, each of which is incorporated herein by reference in its entirety.

TABLE 5

The capital investment cost for HDH-AD schemes.

| Item description | Price (US $) | Ref. |
|---|---|---|
| Control devices | 80 | [42] |
| Packed bed humidifier | 133 | [42] |
| Dehumidifier | 70 | [42] |
| Condenser | 120 | |
| Evaporator | 150 | |
| Pipes and fittings | 2 × 35 | [42] |
| Water tanks | 260 | |
| Pumps and blowers | 345 | [42] |
| Accessories | 2 × 33 | [42] |
| Silica get (high quality) | 5 × 2 × 6.75 | |
| Adsorbent bed with fins | 2 × 120 | |
| Total capital cost ($C_C$) | 1601.5 | |

The capital cost of AD components in Table 5 above is reasonably assumed based on the designs of the two disclosed schemes 12, 186, as shown in FIGS. 1A and 1B. It is even higher than those assumed in the literature. See K. Thu, K. C. Ng, W. G. Chun, A. Chakraborty, B. B. Saha, Lifecycle cost analysis of adsorption cycles for desalination, Desalin. Water Treat. 20 (2010) 1-10, world wide web.doi.org/10.5004/dwt.2010.1187, incorporated herein by reference in its entirety. The total cost including the operating cost can be estimated using the following equations.

The amortization charge (a) which is also known as capital recovery ratio can be written as:

$$\alpha = \frac{i(i+1)^y}{(i+1)^y - 1} \quad (27)$$

See M. A. Jamil, S. M. Zubair, On thermoeconomic analysis of a single-effect mechanical vapor compression desalination system, Desalination 420 (2017) 292-307, world wide web.doi.org/10.1016/j.desa1.2017.07.024, incorporated herein by reference in its entirety.

The annual capital cost (in $/yr)

$$C_F = C_C \times \alpha \quad (28)$$

The annual power cost (in $/yr)

$$CP = COE \times \frac{e}{3600} \times f \times \dot{m}_{pw} \times 3600 \times 24 \times 365 \quad (29)$$

Here, e (in kJ/kg) is the energy per unit mass of product. The annual labor cost (in $/yr) can be determined as:

$$C_L = l \times f \times \frac{\dot{m}_{pw}}{100} \times 3600 \times 24 \times 365 \quad (30)$$

The annual maintenance cost (in $/yr) is $$C_M = 0.015 \times C_F \quad (31)$$

The annual management cost (in $/yr) is $$C_{Mg} = 0.0 \times C_L \quad (32)$$

Then, the total annual cost of the freshwater (in $/yr) is $$C_T = C_F + CP + C_L + C_M + C_{Mg} \quad (31)$$

and the freshwater production cost (in ¢/Liter) is $$C_p = \frac{C_T \times 100}{f \times \dot{m}_{pw} \times 3600 \times 24 \times 365} \quad (34)$$

Results and Discussion

Figure 17A:
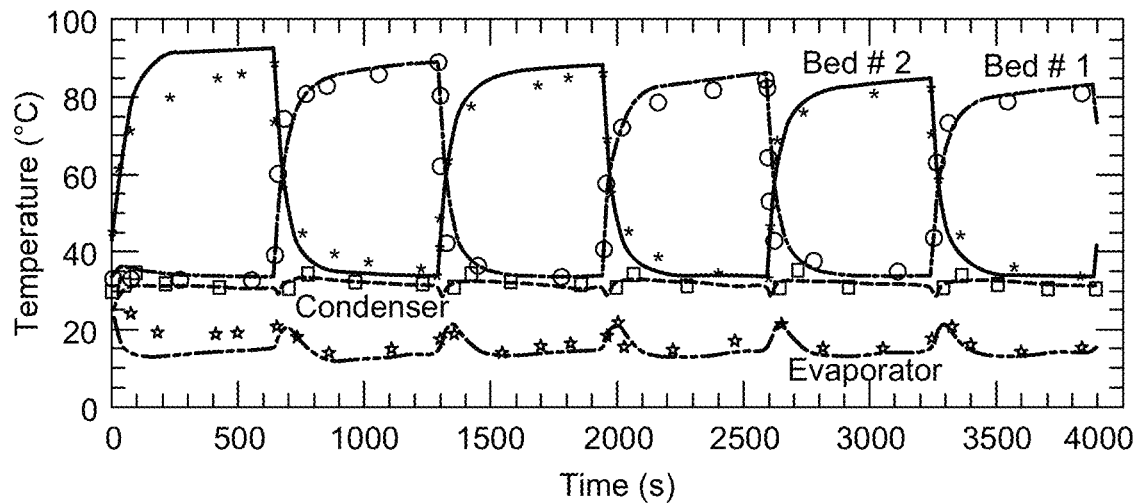
FIG. 17A illustrates a comparison of present simulation results and experimental data of AD system in terms of the beds, condenser, and evaporator temperatures over three cycles (symbols are the reported data, and lines are the present results)

The desalination system 10 is modeled using the mass, energy, adsorption uptake equations. To ascertain an accurate system modeling, the AD system 16 results are compared to the experimental data of Alsaman et al. whereas the HDH system 14 results are validated against those of Mistry et al. and Sharqawy et al. as shown in FIGS. 17C and 17D, respectively. See K. H. Mistry, J. H. Lienhard V, S. M. Zubair, Effect of entropy generation on the performance of humidification-dehumidification desalination cycles, Int. J. Therm. Sci. 49 (2010) 1837-1847, world wide web.doi.org/10.1016/j.ijthermalsci.2010.05.002, incorporated herein by reference in its entirety. The present results are in excellent match with the reported data. More details about the validation are explained below in the Appendix.

Figure 2A:
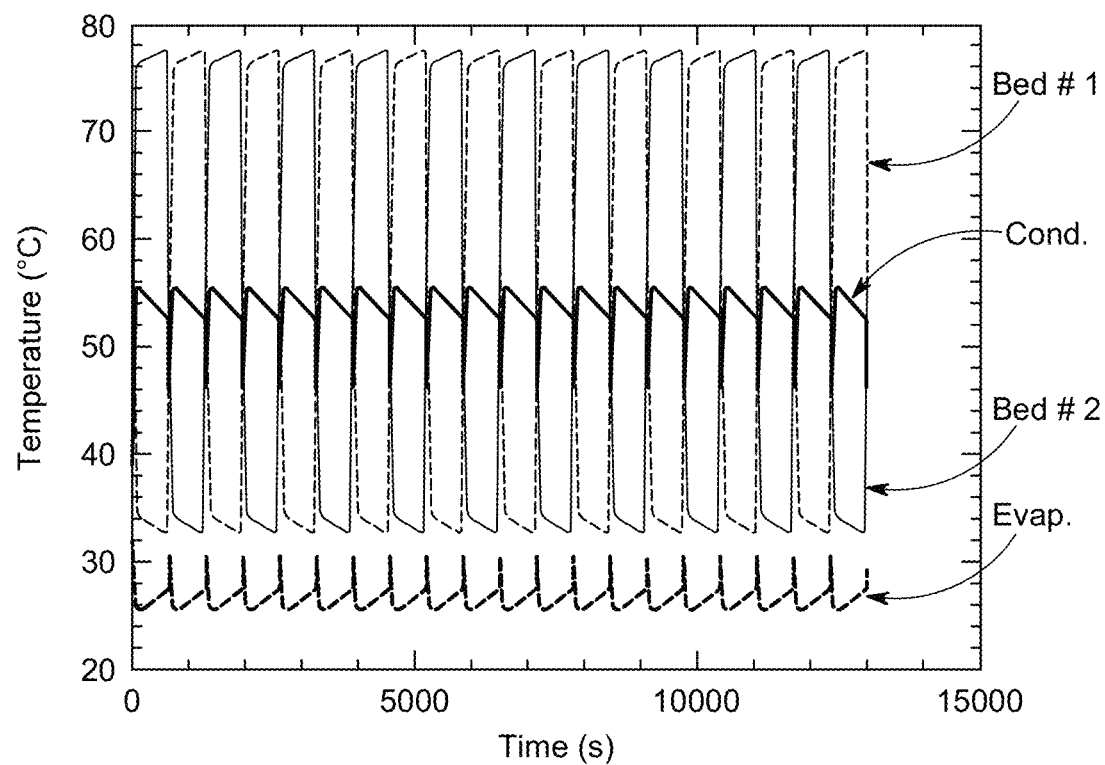
FIGS. 2A-2B illustrate a history of (a) temperature profiles of adsorption system components and (b) adsorption/desorption cycling amounts under $T_{sw,i}$=30° C., $T_{hw,i}$=80° C., $m_{sw}$=0.5 kg/s, $m_{hw}$=0.4 kg/s, $m_{cw}$=0.3 kg/s, and MR=0.85 for the first scheme of FIG. 1A.
Figure 2B:
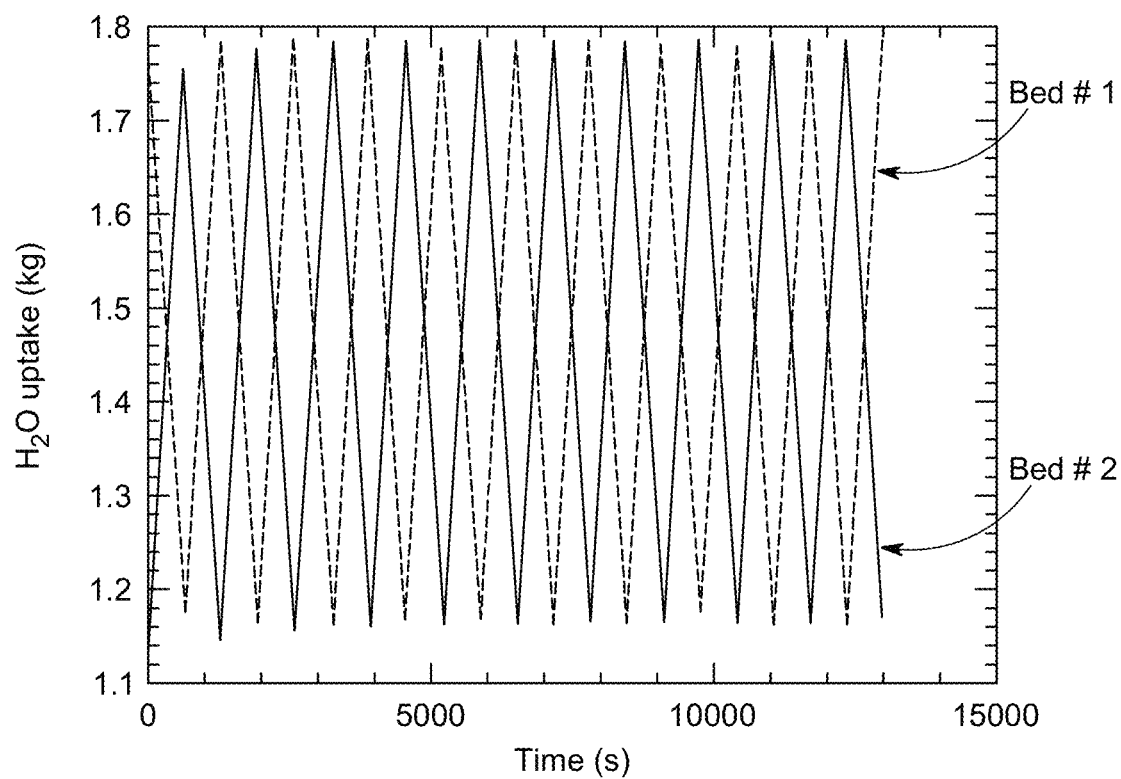

To show the general behavior of cyclic processes of the desalination system 10, the first scheme 12 is taken as an example to show the temperature and adsorption capacity (uptake) values of the AD system 16 and temperature values of the HDH system 14. For the AD component characteristics and adsorption data listed in Tables 2 and 3 and the initial conditions in Table 4, FIGS. 2A and 2B show the AD components temperature and H$_2$O adsorption uptake values over ten operating cycles (each cycle is taken along adsorption, preheating, desorption, and precooling processes). It is shown in FIG. 2A that the bed temperature fluctuates between 32 and 79° C. during the adsorption and desorption processes. The condenser temperature is considerably high (50-55° C.) which is cooled by HDH air 42 circulated which has a low thermal capacity. The evaporator 30 minimizes the first saline fluid 22 by 5° C. due to large amounts of the first saline fluid 22 (e.g., 0.5 kg/s i.e. the entire first saline fluid 22 is cooled by the evaporator 30—the first scheme 12) that exchanges heat with the refrigerant (e.g., 3 kg of the second saline fluid 34 inside the evaporator 30).

The H$_2$O uptake per adsorbent bed fluctuates between 1.1 and 1.8 kg for desorption and adsorption processes, respectively, as shown in FIG. 2B. This means >0.6 kg can be adsorbed and desorbed by a single bed 26 28 over one cycle based on the applied conditions. The adsorption process is a function of the bed cooling and evaporator temperature values while the desorption process relies on the bed heating and condenser temperature values.

Figure 3:
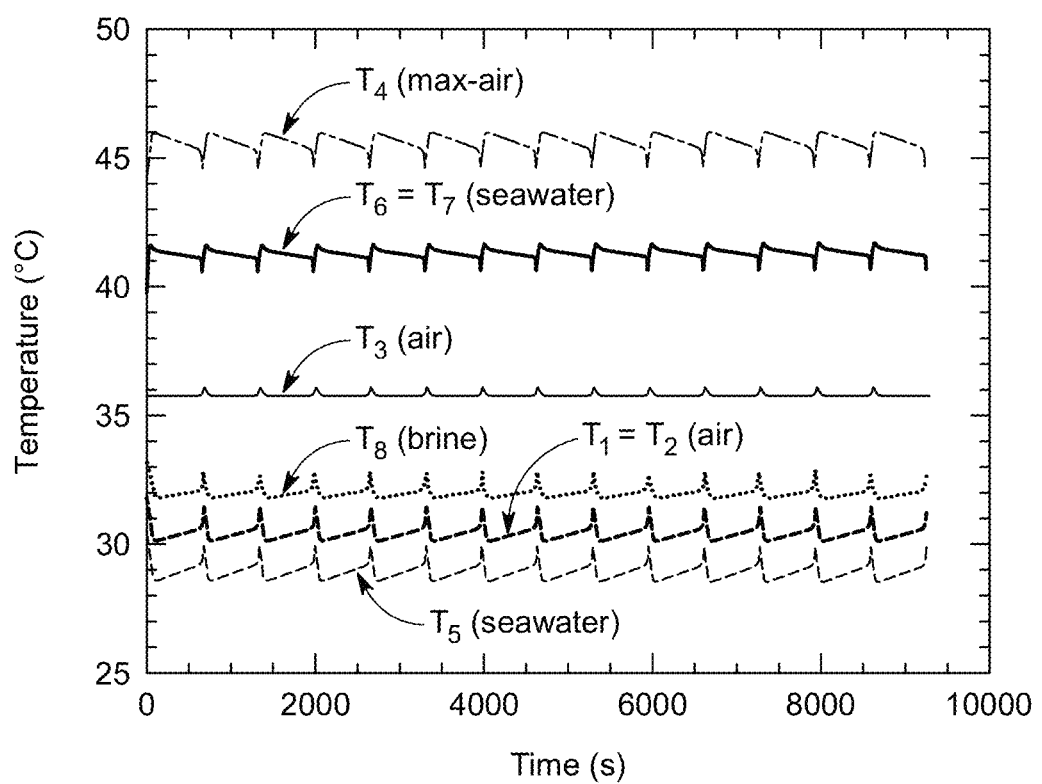
FIG. 3 illustrates a history of HDH temperature profiles under $T_{sw,i}$=30° C., $T_{hw,i}$=80° C., $\dot{m}_{sw}$=0.5 kg/s, $\dot{m}_{hw}$=0.4 kg/s, $\dot{m}_{cw}$=0.3 kg/s, and MR=0.85 for the first scheme of FIG. 1A.

In some examples, the AD processes of the AD system 16 are synchronized with the HDH cycle of the HDH system 14; therefore, they influence the HDH temperature values, as shown in FIG. 3—because a portion of the first saline fluid 22 output from the AD evaporator 30 enters the dehumidifier 20, while the AD condenser 32 is used to heat up the HDH recirculated air 42. In some examples, the maximum HDH temperature ($T_4$) is between 44 and 46° C. which is gained from the condensed (desorbed) H$_2$O. Further, the minimum circulated air temperature is 30° C. ($T_1=T_2$) at the third outlet 76 of the dehumidifier 20 and the first inlet 68 to the humidifier 18. As previously mentioned, in some examples, at least a portion of the first saline fluid 22 (at state 5 in the first scheme 12) is cooled by the evaporator 30 (e.g., to 25-28° C.) to enhance the condensation of water content in the humid air 42 inside the dehumidifier 20. As evident, the AD system 16 can control the maximum and minimum temperature values of the HDH system 14, which may result in enhancing its performance. During cycling, a part of the second saline fluid 34 enters the evaporator 30 (e.g., after passing through the throttling device 180) to keep the evaporator mass almost or substantially constant (e.g., about 3 kg in the first and second schemes 12, 186). This part of the second saline fluid 34 inside the evaporator 30 is occasionally replaced by a fresh HDH brine water generated by the humidifier 18, for example, when a concentration of the second saline fluid 34 reaches >180 ppt. The second saline fluid 34 can then be subjected to a crystallizing process to be dried to salt as a second by-product.

Figure 4A:
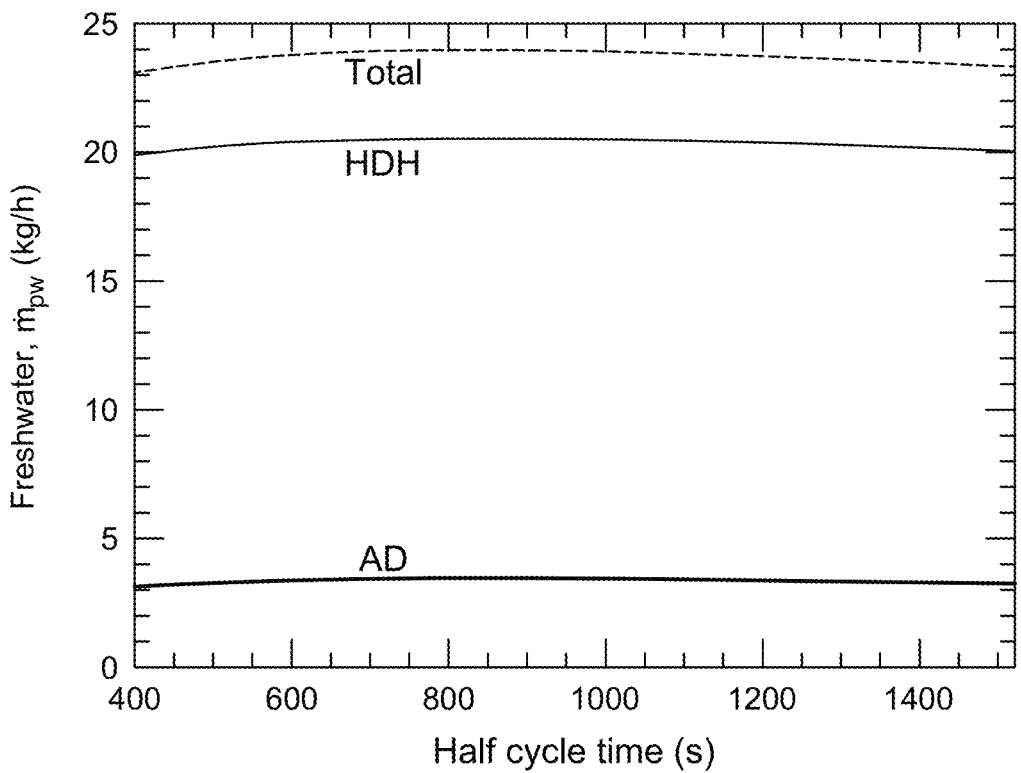
FIGS. 4A-4B are graphs illustrating the effect of adsorption/desorption time on (a) water production, and (b) system GOR under $T_{sw,i}$=30° C., $T_{hw,i}$=80° C., $\dot{m}_{sw}$=0.5 kg/s, $\dot{m}_{hw}$=0.4 kg/s, $\dot{m}_{cw}$=0.3 kg/s, and MR=0.85 for the first scheme of FIG. 1A.
Figure 4B:
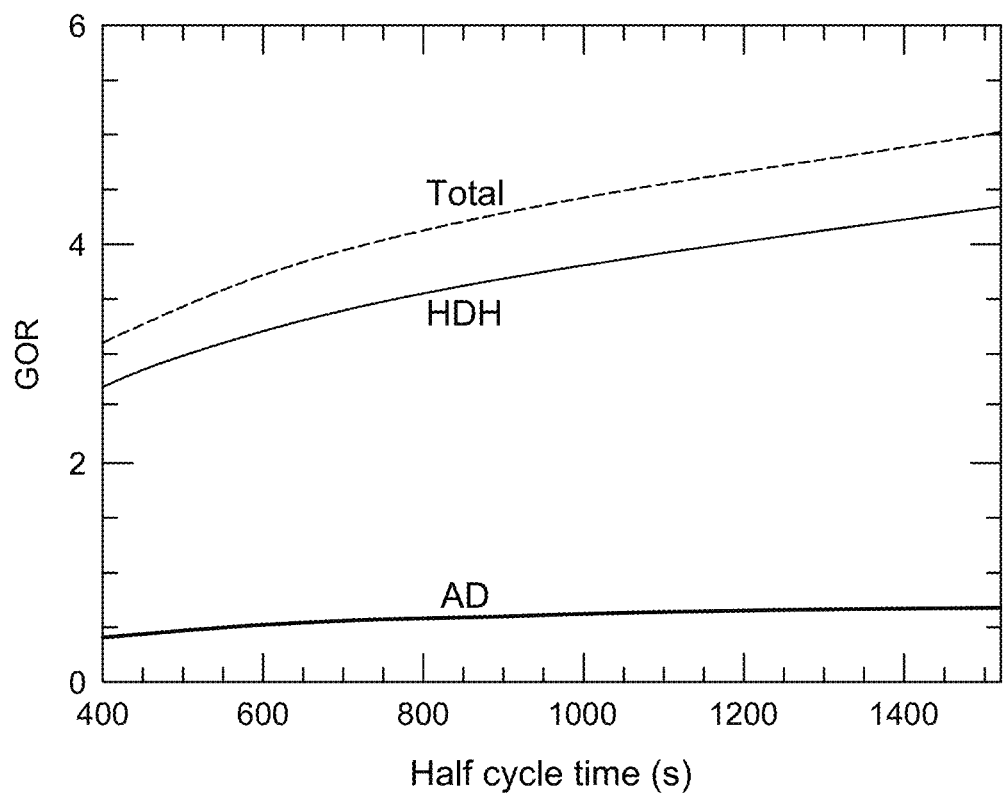

The cycling time is an important factor to improve the performance of the desalination system 10; thus, FIGS. 4A and 4B are devoted to showing the system freshwater production (FIG. 4A) and GOR (FIG. 4B). For the produced freshwater 24, the optimal values are found to be at 850 s i.e. the half cycle time (adsorption preheating time, or desorption precooling time). The HDH system 14 participates in the majority of water production (>20 kg/h) whereas the AD system 16 can produce >3 kg/h freshwater (see FIG. 4A). Similarly, the total GOR values are coming from the HDH system 14 (see FIG. 4A). Another important point is that the GOR values increase with an increase of the cycling time due to a decrease of the (needed) heating energy when a bed 26, 28 is hot (the difference between a hot bed 26, 28 and heating source temperatures decreases with increasing the heating time). For both the water production and GOR, one may select the half cycle time to be about 850 s to investigate other operating parameters.

Figure 5A:
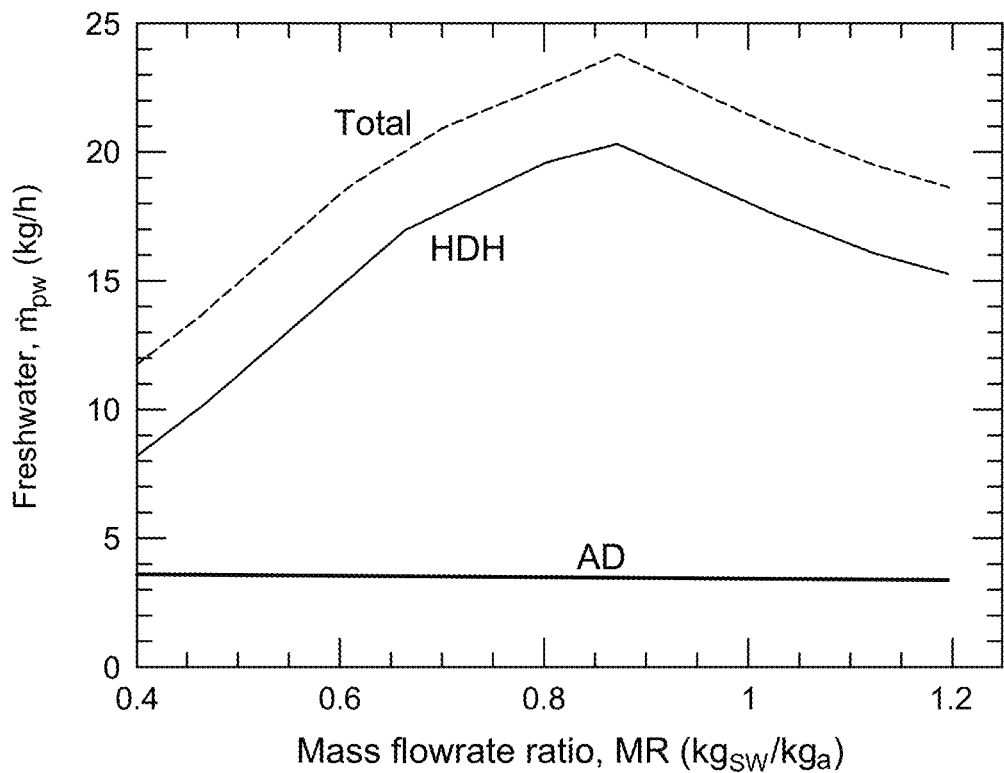
FIGS. 5A-5B are graphs illustrating the effect of HDH mass flowrate ratio on (a) water production and (b) system GOR under $T_{sw,i}$=30° C., $T_{hw,i}$=80° C., $\dot{m}_{sw}$=0.5 kg/s, $\dot{m}_{hw}$=0.4 kg/s, $\dot{m}_{cw}$=0.3 kg/s, and Half cycle time=850 s for the first scheme of FIG. 1A.
Figure 5B:
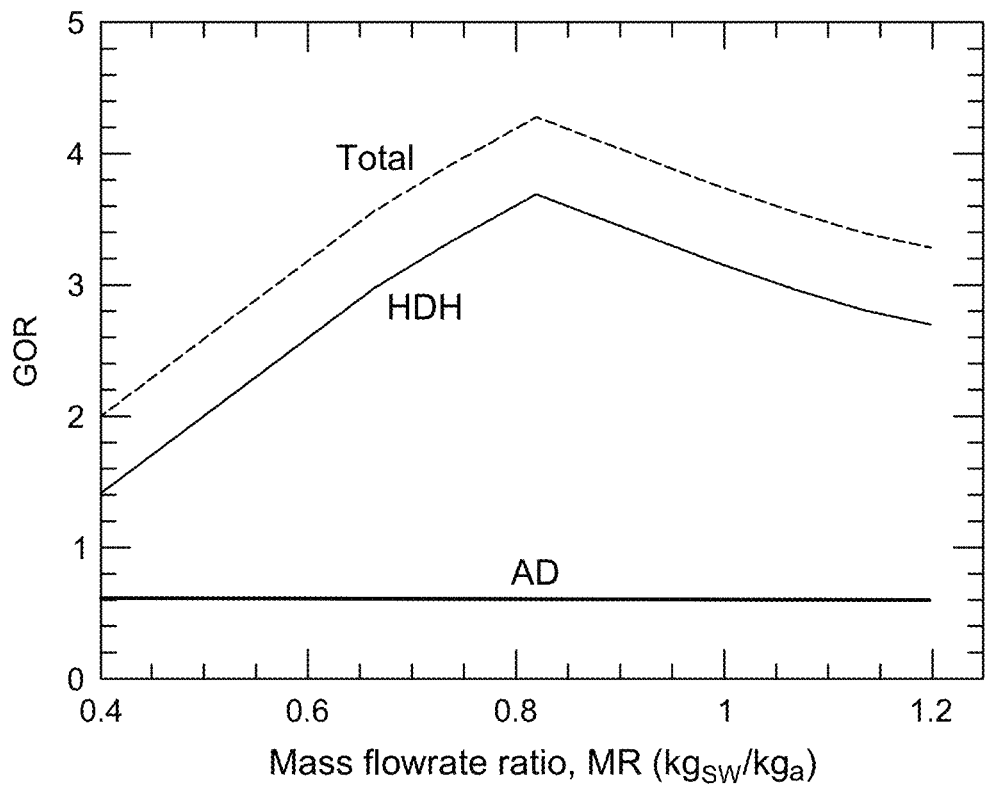

For HDH performance, the mass flowrate ratio of the first saline fluid 22 to the recirculated air 42 (MR) is critical. See G. P. Narayana, M. H. Sharqawya, J. H. Lienhard V, S. M. Zubair, Thermodynamic analysis of humidification dehumidification desalination cycles, Desalin. Water Treat. 16 (2010) 339-353, incorporated herein by reference in its entirety. Thus, an optimal performance could be obtained at a certain MR under the applied conditions. In this scenario, FIGS. 5A and 5B show both water production and GOR values against MR values (0.4-1.2). As obvious, the optimal water production is obtained at MR=0.821 whereas the optimal GOR is accomplished at MR=0.874. In this regard, the value of MR=0.85 can be appropriate for both the freshwater production and GOR.

By increasing the amount of the first saline fluid 22 sprayed in the humidifier 18 (as MR increases), the air 42 is able to carry more moisture to be condensed in the dehumidifier 20. Therefore, the GOR and freshwater production values are improved by increasing MR values, for example, up to ~0.85. The optimum mass flowrate ratio (e.g., ~0.85)

confirms that the right or a sufficient amount of the first saline fluid 22 is sprayed in the humidifier 18 to increase evaporation based on humidifier effectiveness. Greater flowrate values (e.g., MR>0.85) do not increase the humidity of the air 42 that leaves the humidifier 18; it may decrease the amount of the first saline fluid 22 that is evaporated due to a decrease in hot water temperature ($T_7$). This is primarily due to the increase in amount of the first saline fluid 22. This eventually leads to lower GOR and freshwater values.

The AD system 16 is not significantly affected by MR values. A small decrease in the GOR and water production values of the AD system 16 is recorded at high MR values due to decreasing the amount of the recirculated air 42, thereby, increasing the condensation temperature.

Figure 6A:
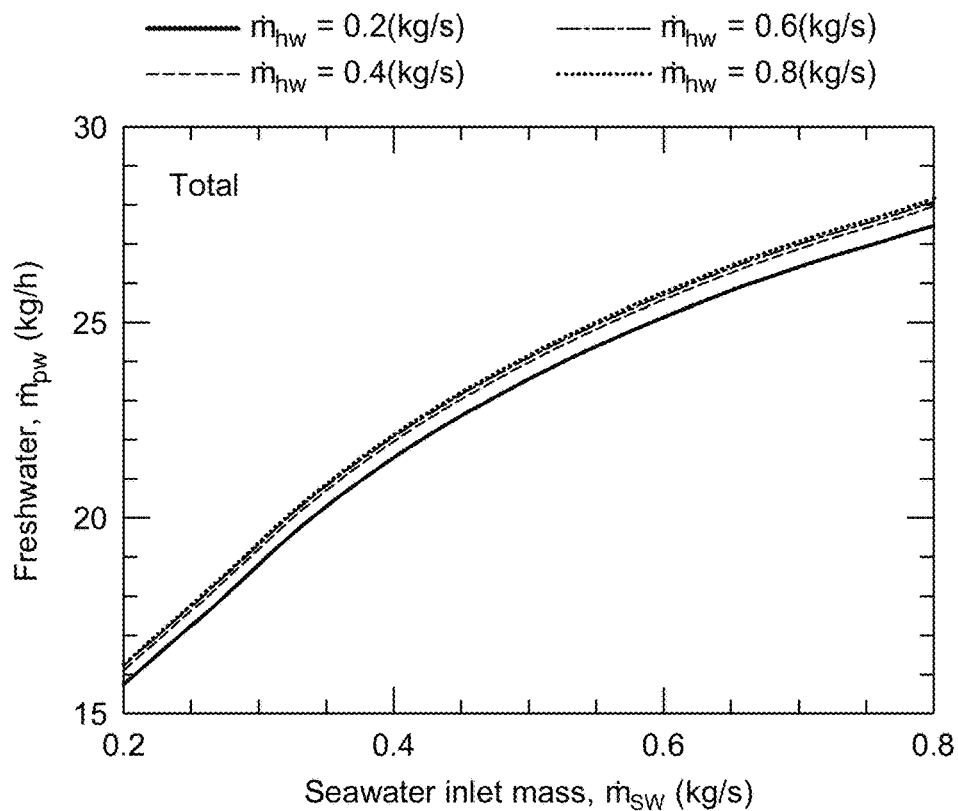
FIGS. 6A-6C are graphs illustrating the effect of mass amounts of an inlet saline fluid on the freshwater production at different heating water amounts for (a) hybrid (total), (b) HDH, and (c) AD under $T_{sw,i}$=30° C., =80° C., MR=0.85 kg/s, $\dot{m}_{cw}$=0.3 kg/s, and Half cycle time=850 s for the first scheme of FIG. 1A.
Figure 6B:
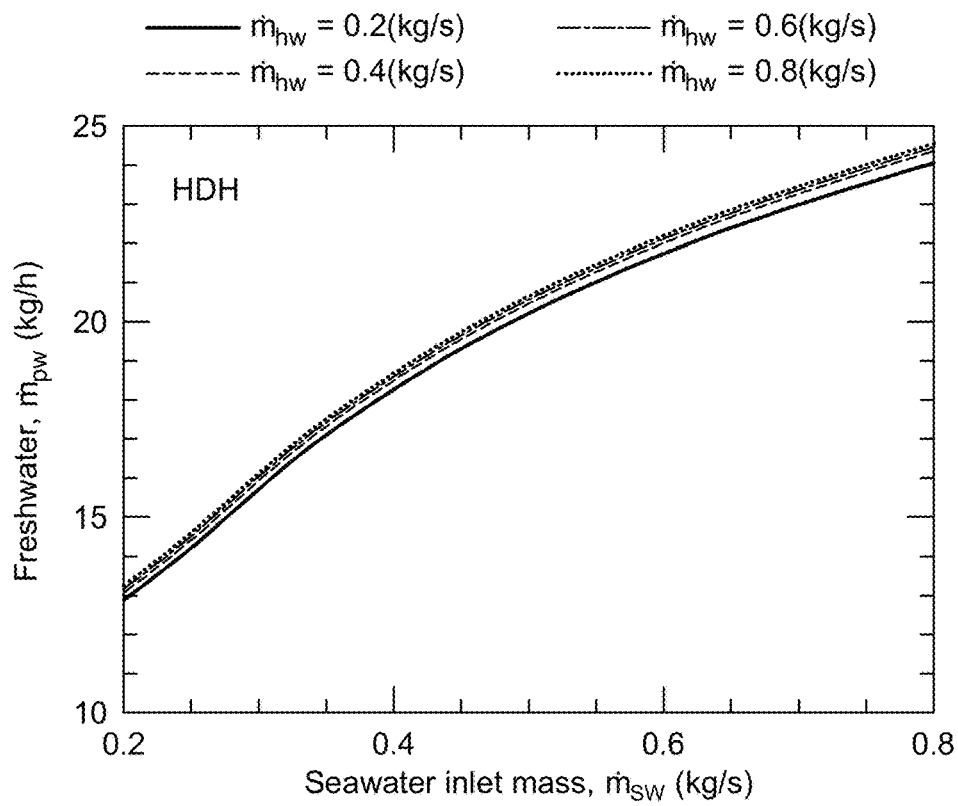
Figure 6C:
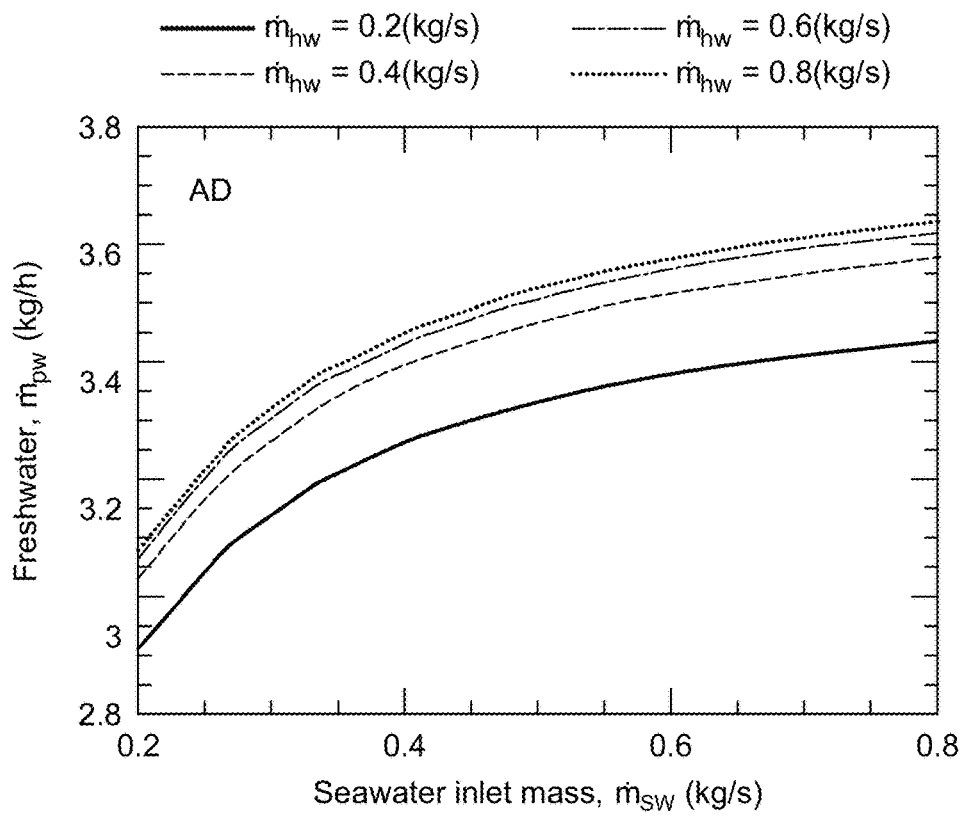

Because the first saline fluid 22 influences MR and consumes the cooling effect in the AD evaporator 30, its mass flowrate and temperature are important. Besides, the flowrate and temperature values of the second auxiliary fluid 130 could tune the performance of the desalination system 10. FIGS. 6A, 6B, and 6C show the water production for the desalination system 10 and the contribution of both the HDH and AD systems 14, 16 as a function of flowrates of the first saline fluid 22 and the second auxiliary fluid 130, respectively. In general, the increase of mass of the first saline fluid 22 increases the water production of the HDH and AD systems 14, 16, thereby enhancing that for the desalination system 10. The increase of the first saline fluid 22 could improve the condensation of water content (of a humid air) in the dehumidifier 20 and expose more of the first saline fluid 22 to exchange with the circulated air 42 in the humidifier 18, leading to an increase in the water production. Also, more water at a constant MR means more amounts of air circulated which may decrease the HDH maximum temperature until a desirable level to obtain optimal performance. The portion 90 of the freshwater 24 produced by the AD system 16 is enhanced by increasing amounts of the first saline fluid 22 because it increases the evaporation temperature; which in turn leads to lower latent heat of vaporization and then increases the adsorption amounts. In addition, the increase of circulated air amounts minimizes the condensation temperature resulting in enhancing the desorption process.

Figure 7A:
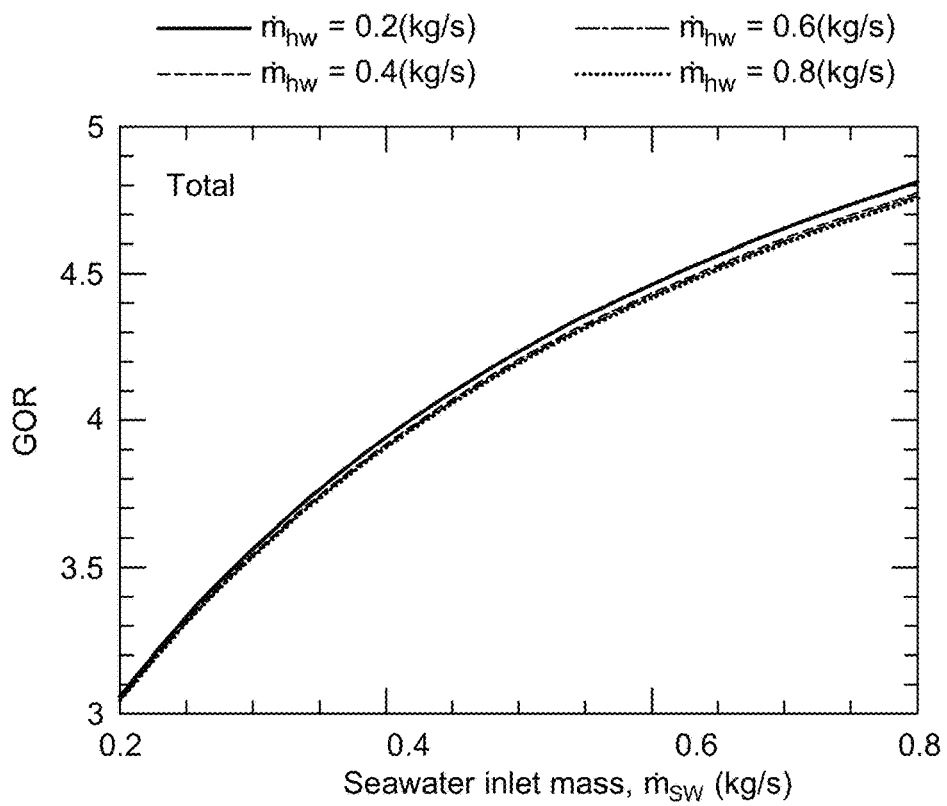
FIGS. 7A-7C are graphs illustrating the effect of mass amounts of an inlet saline fluid on the system GOR at different heating water amounts for (a) hybrid (total), (b) HDH, and (c) AD under $T_{sw,i}$=30° C., $T_{hw,i}$=80° C., MR=0.85 kg/s, $\dot{m}_{cw}$=0.3 kg/s, and Half cycle time=850 s for the first scheme of FIG. 1A.
Figure 7B:
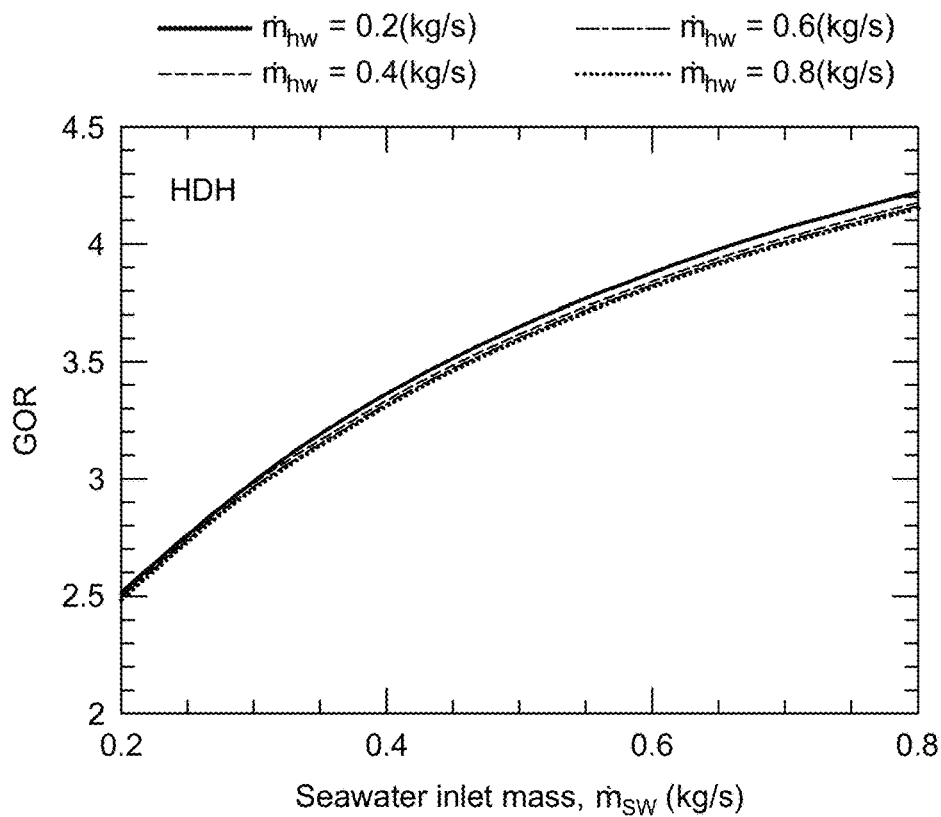
Figure 7C:
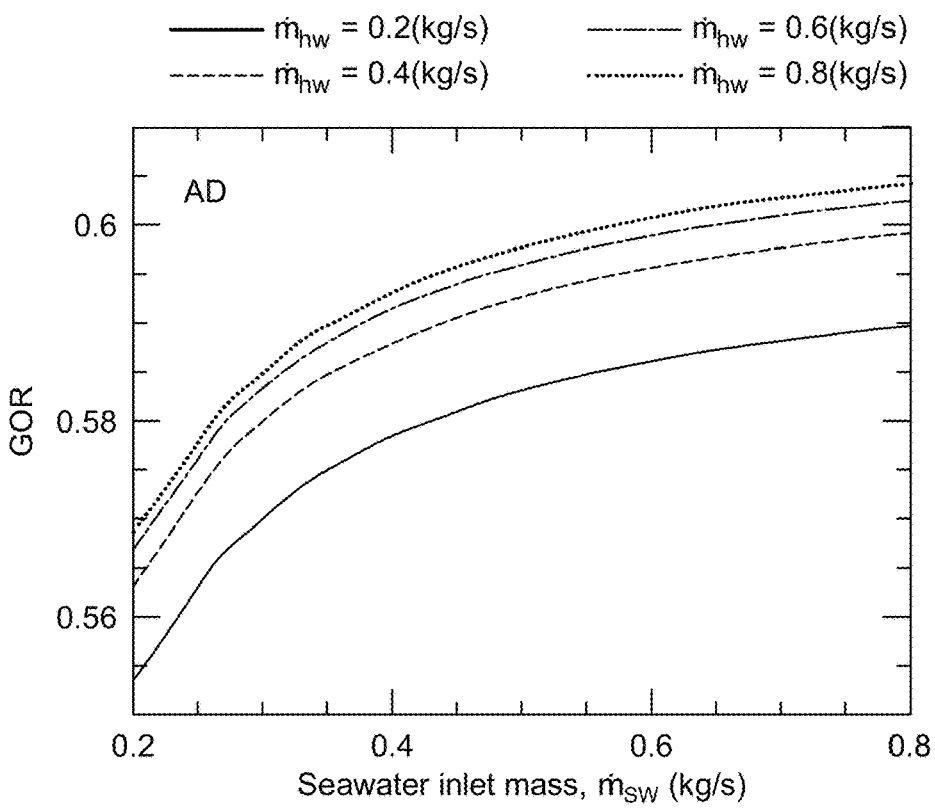
Figure 8A:
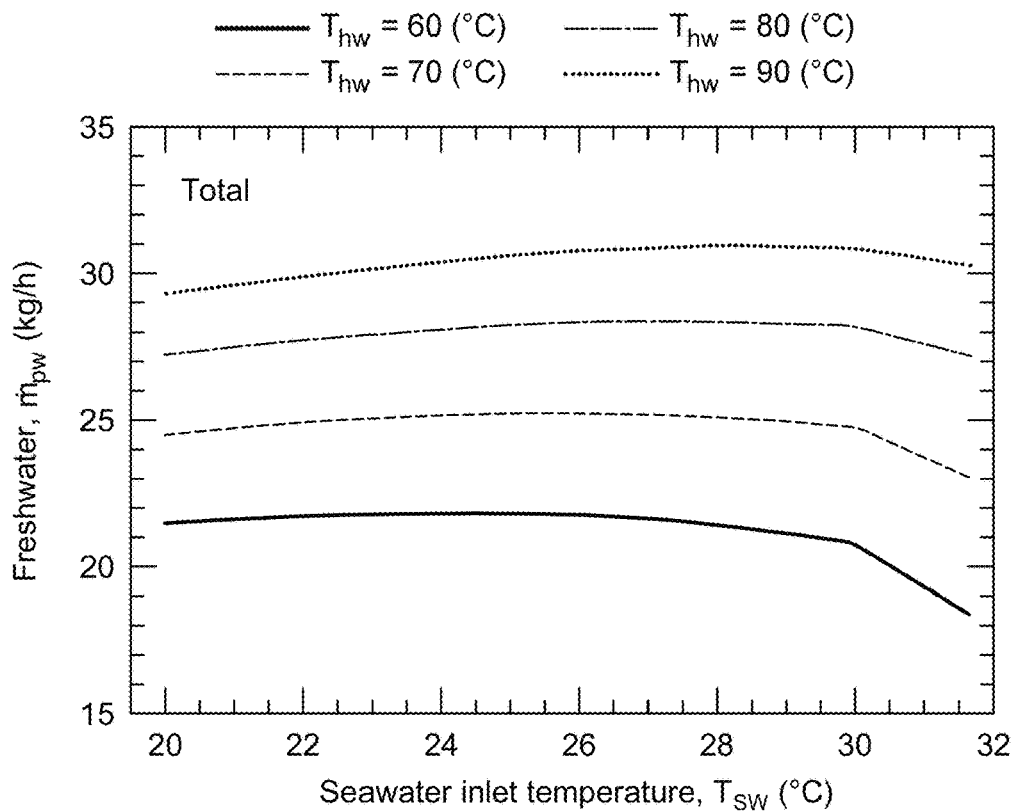
FIGS. 8A-8C are graphs illustrating the effect of heating water temperature on the system freshwater production at some selected inlet saline fluid temperature values for (a) hybrid (total), (b) HDH, and (c) AD under $\dot{m}_{sw}$=0.8 kg, $\dot{m}_{hw}$=0.4 kg, MR=0.85 kg/s, $\dot{m}_{cw}$=0.3 kg/s, and Half cycle time=850 s for the first scheme of FIG. 1A.
Figure 8B:
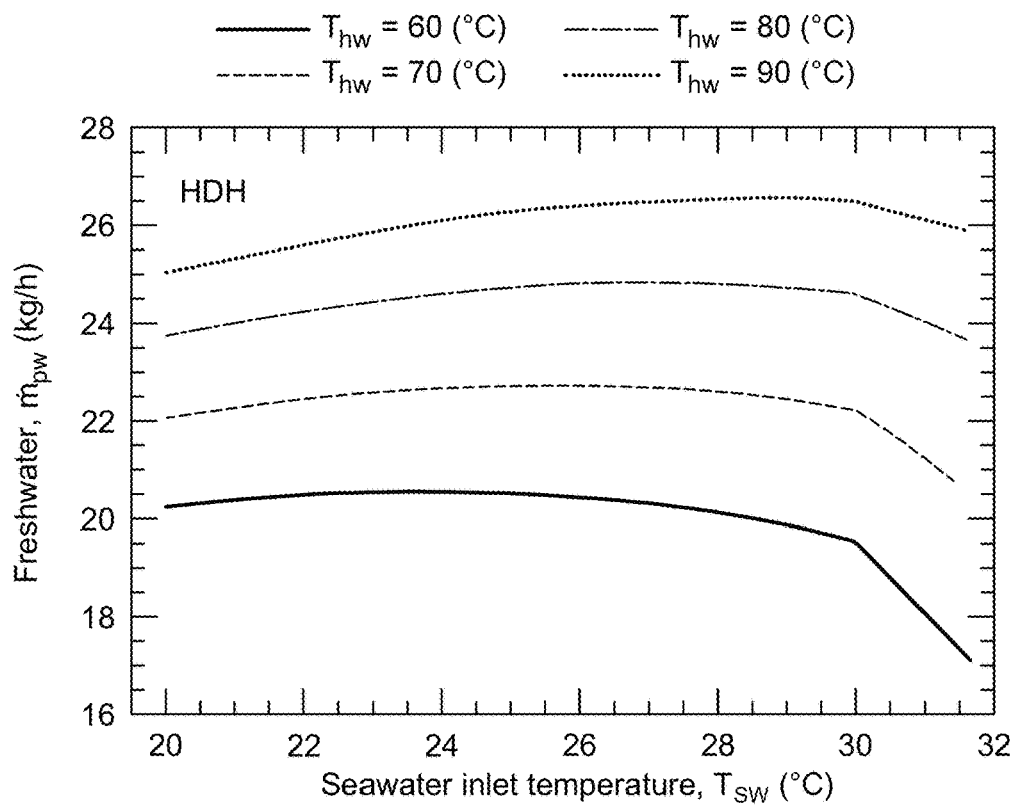
Figure 8C:
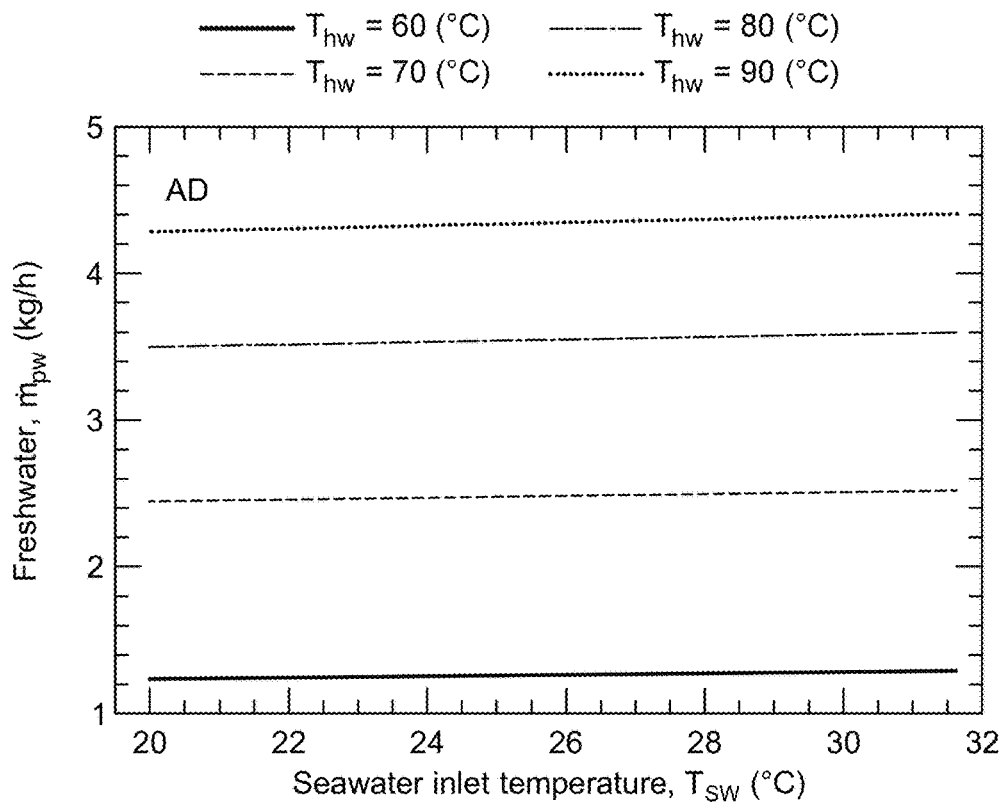
Figure 9A:
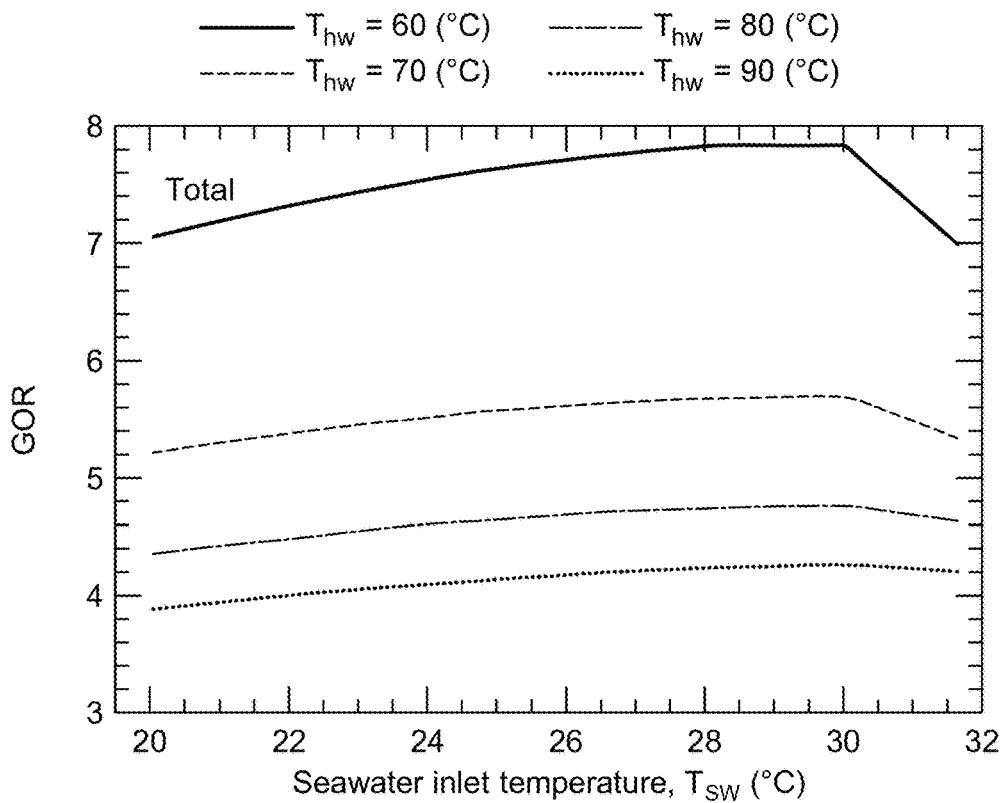
FIGS. 9A-9C are graphs illustrating the effect of heating water temperature on the system GOR at some selected inlet saline fluid temperature values for (a) hybrid (total), (b) HDH, and (c) AD under $\dot{m}_{sw}$=0.8 kg, $\dot{m}_{hw}$=0.4 kg, MR=0.85 kg/s, $\dot{m}_{cw}$=0.3 kg/s, and Half cycle time=850 s for the first scheme of FIG. 1A.
Figure 9B:
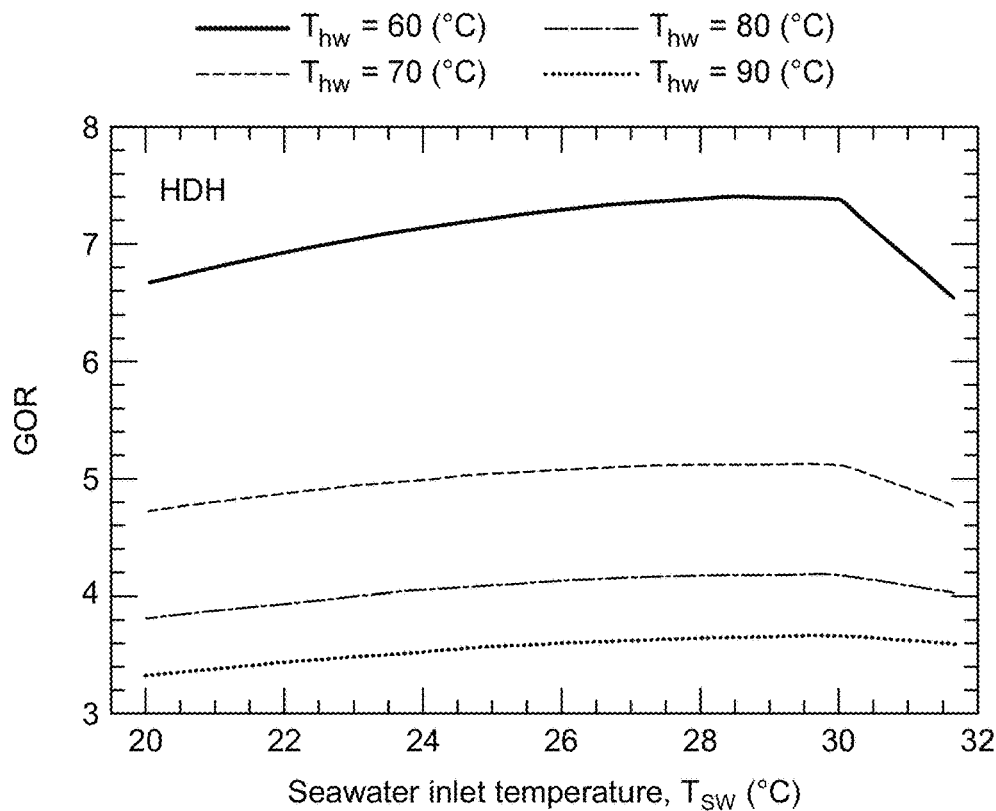
Figure 9C:
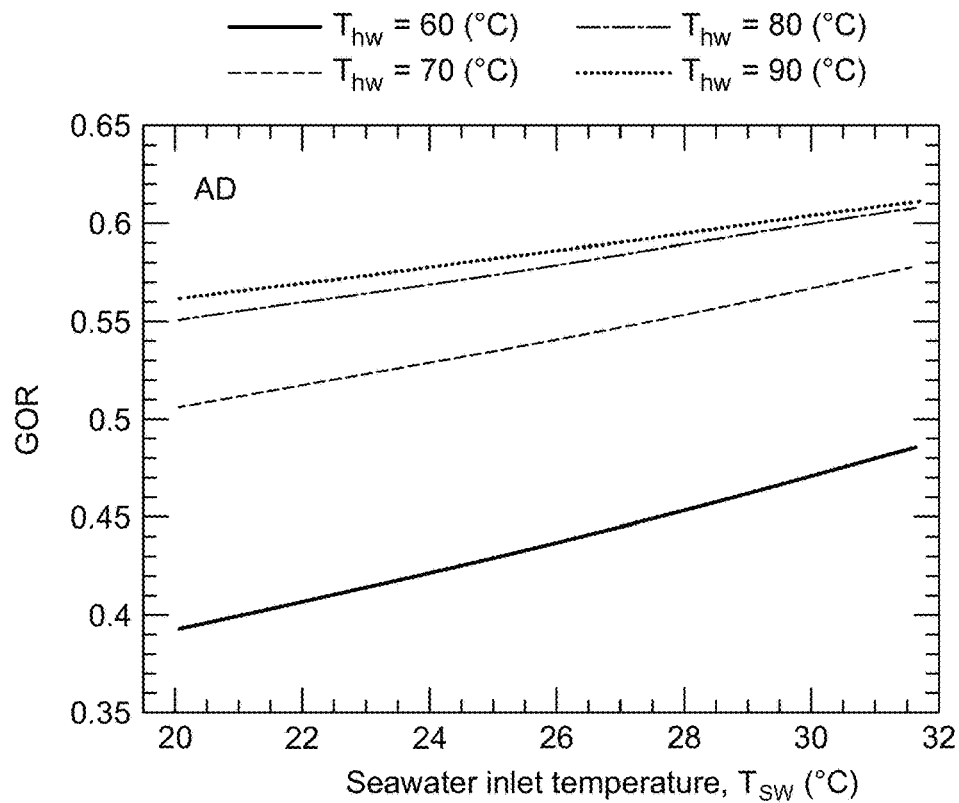
Figure 10A:
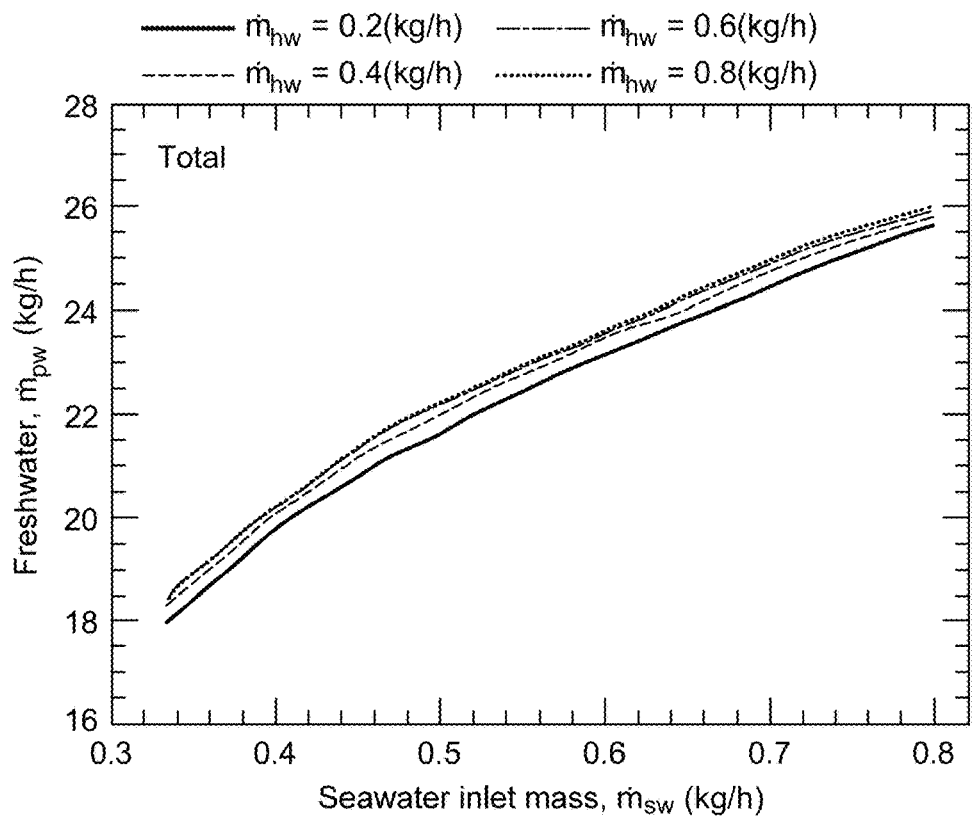
FIGS. 10A-10C are graphs illustrating the effect of mass flowrate of an inlet saline fluid on the freshwater production at different heating water amounts for (a) hybrid (total), (b) HDH, and (c) AD under $T_{sw,i}$=30° C., $T_{hw}$=80° C., MR=0.85 kg/s, $\dot{m}_{cw}$=$\dot{m}_{sw,i}$, $\dot{m}_{chw}$=0.1 kg/s, and Half cycle time=850 s for the second scheme of FIG. 1B.
Figure 10B:
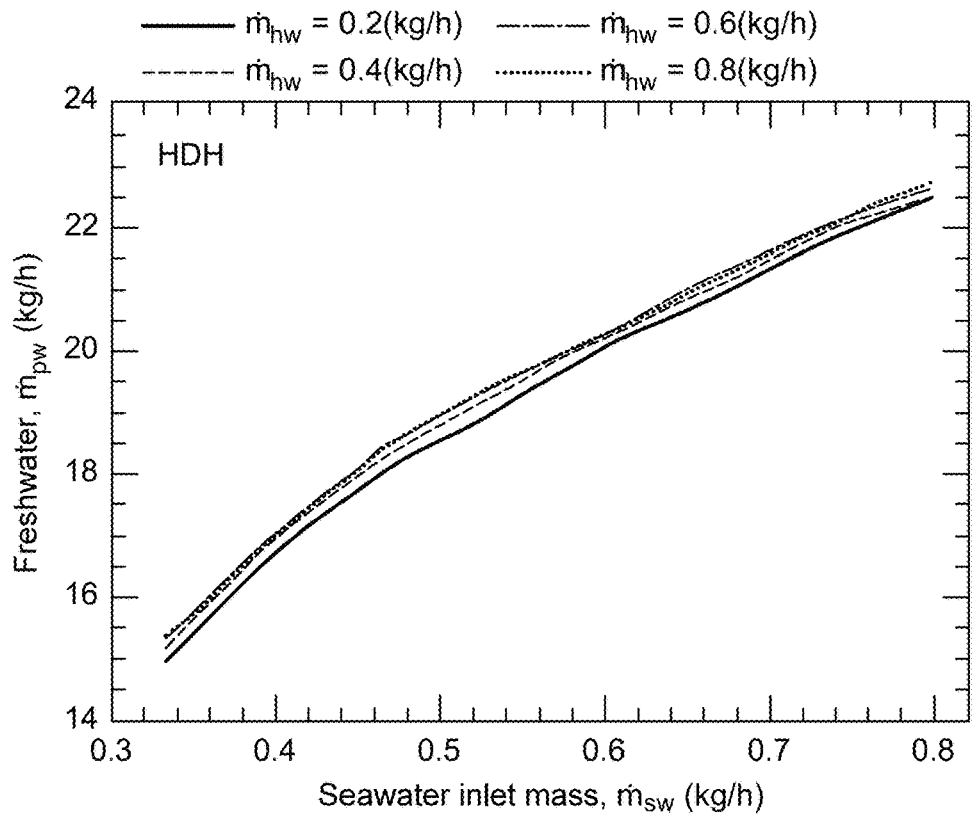
Figure 10C:
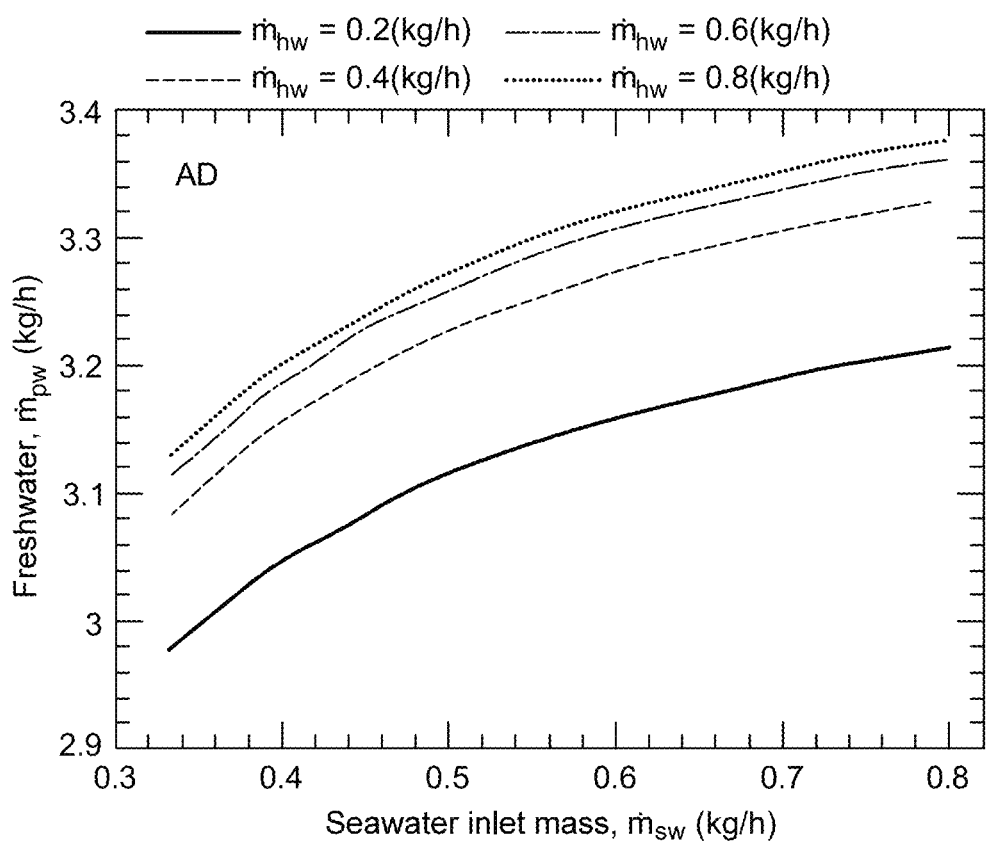

The effect of heating fluid inlet amounts (i.e., amounts of the second auxiliary fluid 130) does not much influence the performance of the hybrid (total) and HDH system, especially for $\dot{m}_{hw} \geq 0.4$ kg/s. This means the heating fluid amounts more or equal than 0.4 kg/s are adequate to desorb almost the same amounts of the adsorbed vapor 40 onto the adsorbent 120, 140. To some extent, the amounts of water production is also not much affected by the heating fluid amounts for the AD system 16 when $\dot{m}_{hw} \geq 0.4$ kg/s—the difference in the freshwater amounts is <0.1 kg/h. The similar behavior of water production with the change of the amounts of the first saline fluid 22 and the heating fluid can be noticed for GOR, as shown in FIGS. 7A, 7B, and 7C. In such examples, the maximum GOR, that can be obtained from the desalination system 10 is about 4.8 at $\dot{m}_{hw} \geq 0.4$ kg/s. The GOR of the AD system 16 is just about 0.6 (if it is alone considered). It can be seen from FIGS. 6A, 6B, 6C, 7A, 7B, and 7C that the optimal performance can be obtained under $\dot{m}_{sw}$=0.8 kg/s and $\dot{m}_{hw} \geq 0.4$ kg/s.

The effect of inlet heating temperature and inlet saline fluid temperature on the system performance is highlighted in FIGS. 8A, 8B, 8C, 9A, 9B, 9C. It is clear from FIGS. 8A, 8B, and 8C that the increase of heating temperature up to 90° C. improves the water production of both HDH and AD systems 14, 16 due to increasing the desorption amounts. This leads to enhancing the AD water production as well as rising the air circulated temperature (that exchanges in the condenser 32) resulting in improving the HDH water production when the amounts of the first saline fluid 22 are considerably high (0.8 kg/s), which exchanges with the air 42 inside the humidifier 18. However, more energy is expected to be consumed under the high heating temperature values.

The temperature of the first saline fluid 22, which is also the same inlet cooling water temperature of an adsorption bed 26, 28 (under the same ambient conditions), can enhance the system performance. It is shown that a temperature of the first saline fluid 22 corresponding to 30° C. provides the optimal water production (at a certain $T_{hw}$ value). However, >30° C. results in a decrease of GOR values. This is attributed to the increase of condensation temperature in the dehumidifier 20, which may lead to decrease the water production rate.

Concerning GOR values, the low heating temperature is better due to a low energy consumption. It can be shown from FIGS. 9A, 9B, and 9C that the desalination system 10 achieves higher GOR values at $T_{hw,i}$=60° C. In particular, according to one or more disclosed examples, a GOR value of the desalination system 10 reaches about 7.8 (total), which is an excellent improvement for the HDH technology. In comparison to FIGS. 8A, 8B, and 8C, water production is higher for higher heating temperature. This means, the system can produce more water by consuming substantial energy (GOR is about 4 at $T_{hw,i}$=90° C.) when comparing to the efficient GOR (7.8) that produces lower water production (about 21 kg/h) under $T_{hw,i}$=60° C. Similar to FIGS. 9A, 9B, and 9C, the temperature of the first saline fluid 22 can be optimized for the desalination system 10 such as, for example, about 30° C. The AD system 16 has a good performance at high $T_{sw,i}$ and $T_{hw,i}$ due to enhancing the evaporation and desorption processes, respectively. However, the performance of HDH system 14 compromises the total performance because it has higher freshwater amounts and GOR values.

For the second scheme 186 (e.g., refer to FIG. 1B), the only difference from the first scheme 12 is that the first saline fluid 22 is not cooled by the AD system 16. Alternatively, in some examples, the first saline fluid 22 is used to cool the adsorption process (e.g., associated with the first bed 16 and/or the second bed 28) prior to entering the HDH system 14. Therefore, in this desalination system 10 implemented by the second scheme 186, the cooling effect is produced and can be used for air conditioning applications as a by-product. The optimal performance of the desalination system 10 implemented by the second scheme 186 can also be obtained at MR=0.85 and Half cycle time=850 s because there is not a substantial difference in the operating parameters from that used in the first scheme 12. The coming paragraphs focus on the mass flowrate and temperature values of the heating fluid 130 and inlet saline fluid 22.

FIG. 10 shows the effect of the inlet saline fluid and heating fluid amounts on water production. It is clear that the increase of the first saline fluid 22 enhances the freshwater produced for both AD and HDH systems 16, 14. The trend of freshwater amounts against the inlet saline fluid amounts is the same as those discussed in FIGS. 5A and 5B for the first scheme 12. The only difference is that the water production in the second scheme 186 is less than those of the first scheme 12, for example, by about 3 kg/h (when $\dot{m}_{sw}$=0.8 kg/s—the highest values). This is because the inlet saline fluid 22 in the first scheme 12 is cooled by some degrees in the evaporator 30 leading to enhancing water condensation inside the dehumidifier 20.

Figure 11A:
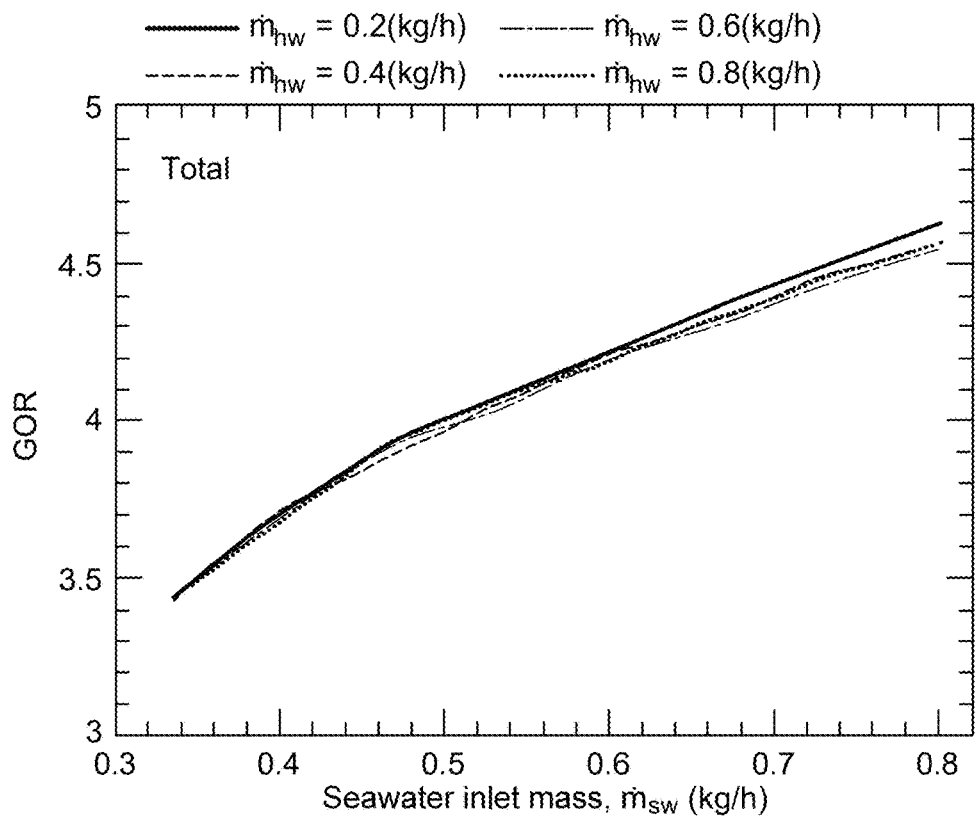
FIGS. 11A-11C are graphs illustrating the effect of mass flowrate of an inlet saline fluid on the system GOR at different heating water amounts for (a) hybrid (total), (b) HDH, and (c) AD under $T_{sw,i}$=30° C., $T_{hw,i}$=80° C., MR=0.85 kg/s, $\dot{m}_{cw}$=$m_{sw}$, $\dot{m}_{chw}$=0.1 kg/s, and Half cycle time=850 s for the second scheme of FIG. 1B.
Figure 11B:
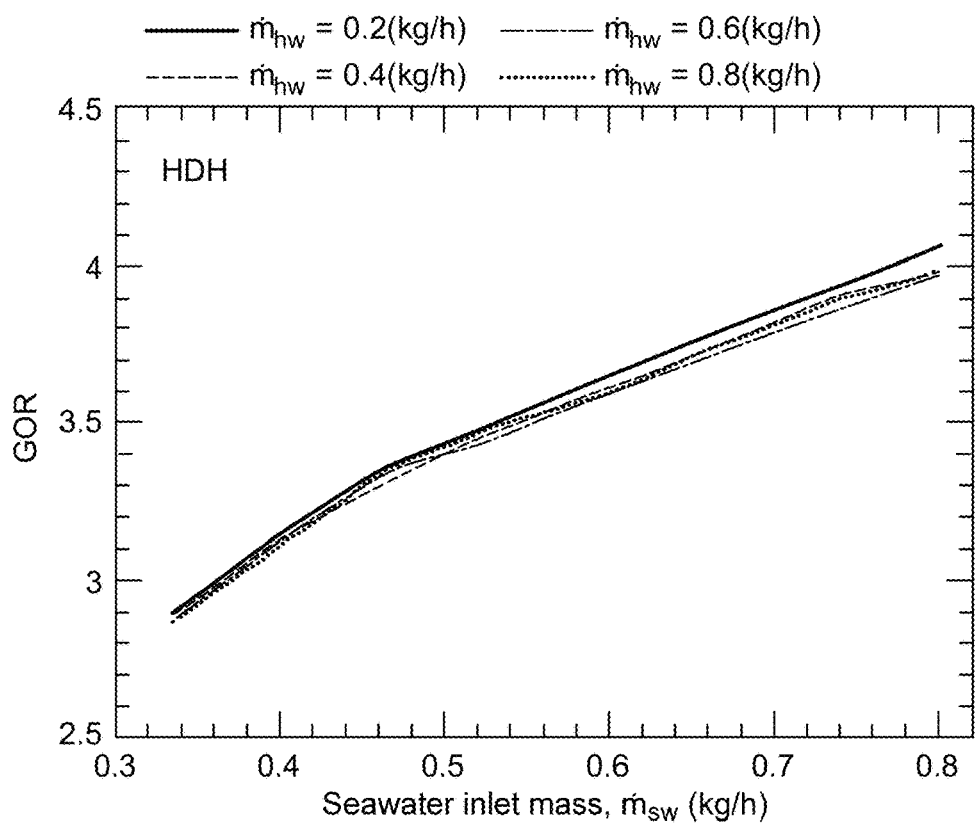
Figure 11C:
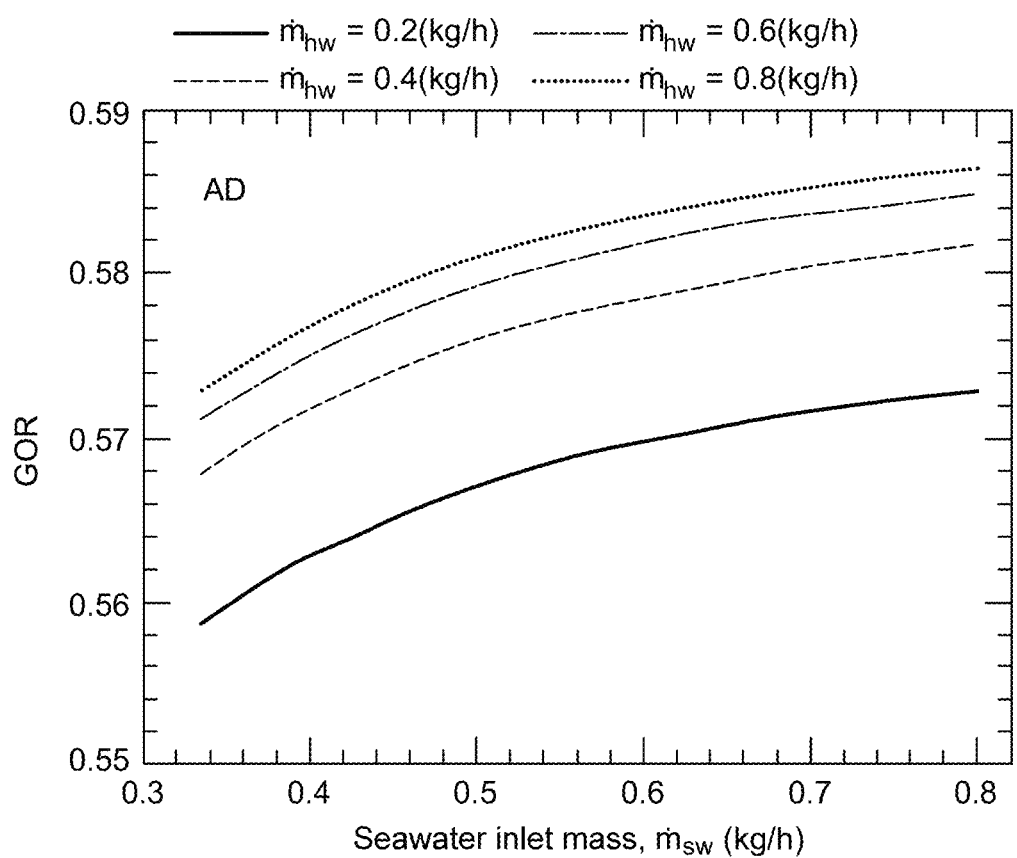
Figure 12:
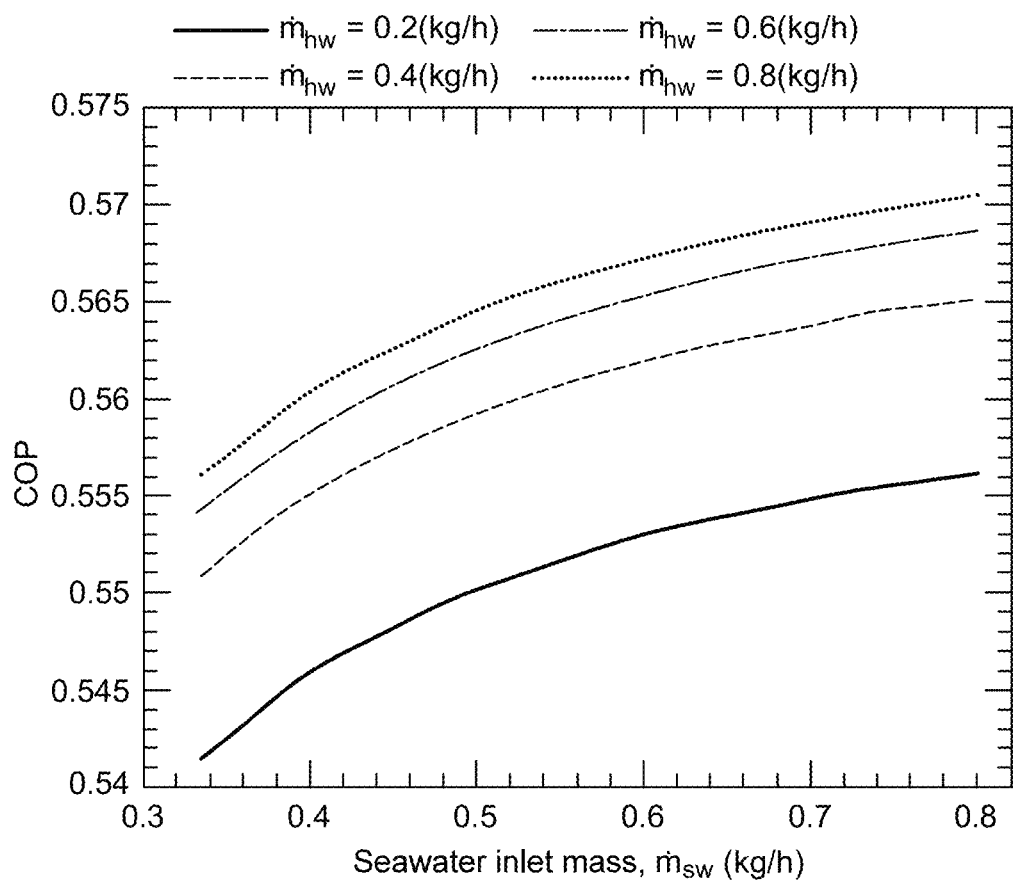
FIG. 12 is a graph illustrating the effect of mass flowrate of an inlet saline fluid on COP at different heating water amounts for AD under $T_{sw,i}$=30° C., $T_{hw,i}$=80° C., MR=0.85 kg/s, $\dot{m}_{cw}$=$\dot{m}_{sw}$, $\dot{m}_{chw}$=0.1 kg/s, and Half cycle time=850 s for the second scheme of FIG. 1B.

FIGS. 11A, 11B, and 11C are also similar to those discussed in FIGS. 7A, 7B, and 7C with slightly smaller GOR values, for example, by about 0.2 (for the desalination system 10). The performance observed in FIGS. 10A, 10B, 10C, 11A, 11B, and 11C indicates to $\dot{m}_{sw}$=0.8 kg and $\dot{m}_{hw}$=0.4 kg as a reasonably operating mass flowrates resulting in an optimal performance. The reduction in GOR and water production of the second scheme 186 in a comparison to the first scheme 12 is compromised by producing a cooling effect in the evaporator 30. This cooling effect is evaluated by COP as shown in FIG. 12 as a function of inlet saline fluid amounts at different heating fluid amounts. The COP values are between 0.54 and 0.57 which is better than some standalone adsorption refrigeration systems reported in the literature. See Mitra et al. (2017); and Q. W. Pan, R. Z. Wang, Study on operation strategy of a silica gel-water adsorption chiller in solar cooling application, Sol. Energy (2018), world wide web.doi.org/10.1016/j.solener.2018.03.062, each incorporated herein by reference in their entirety.

Figure 13A:
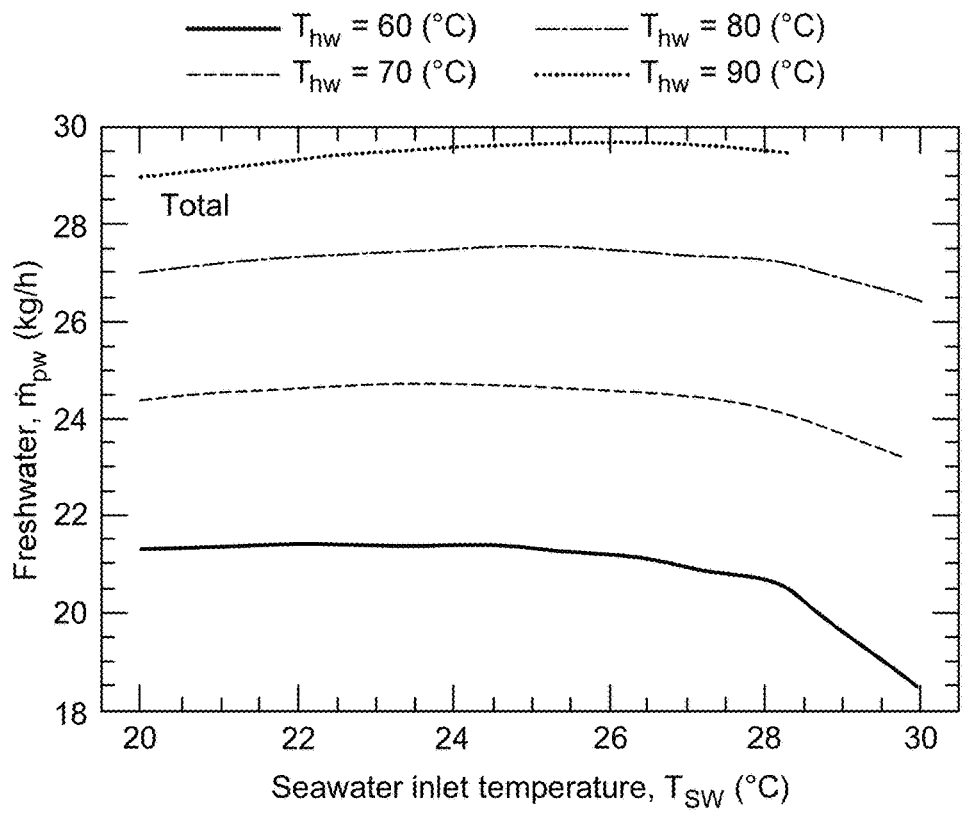
FIGS. 13A-13C are graphs illustrating the effect of heating water temperature on the system freshwater production at some selected inlet saline fluid temperature values for (a) hybrid (total), (b) HDH, and (c) AD under $\dot{m}_{hw}$=0.4, MR=0.85, $\dot{m}_{cw,i}$=$\dot{m}_{sw}$=0.8 kg/s, $\dot{m}_{chw}$=0.1 kg/s, and Half cycle time=850 s for the second scheme of FIG. 1B.
Figure 13B:
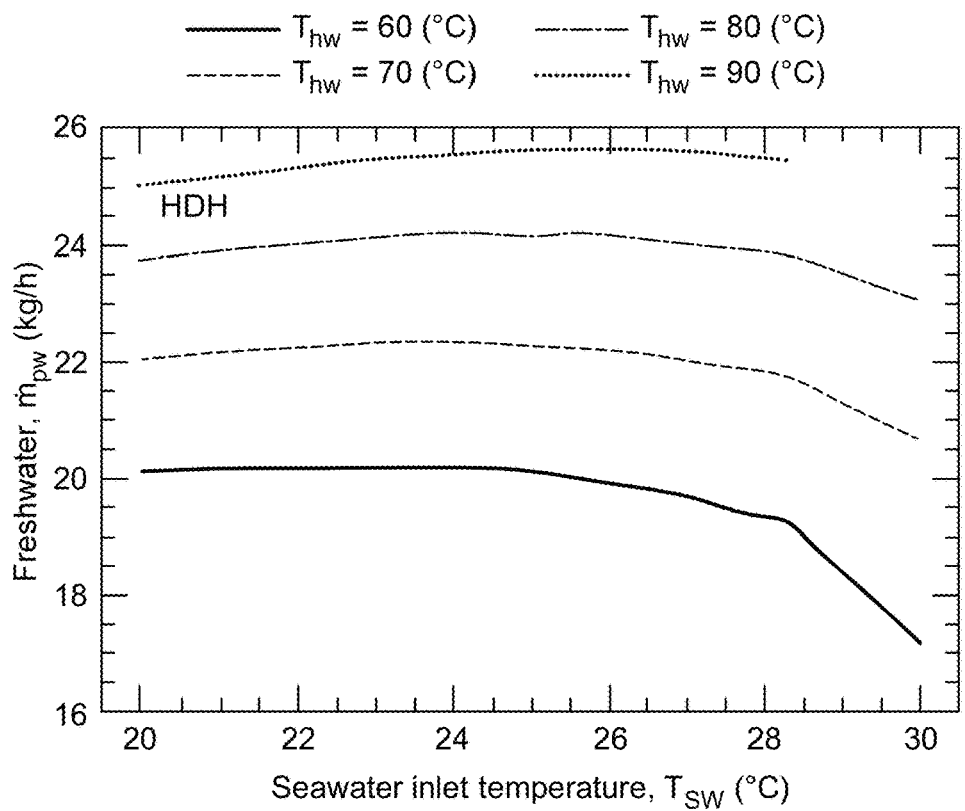
Figure 13C:
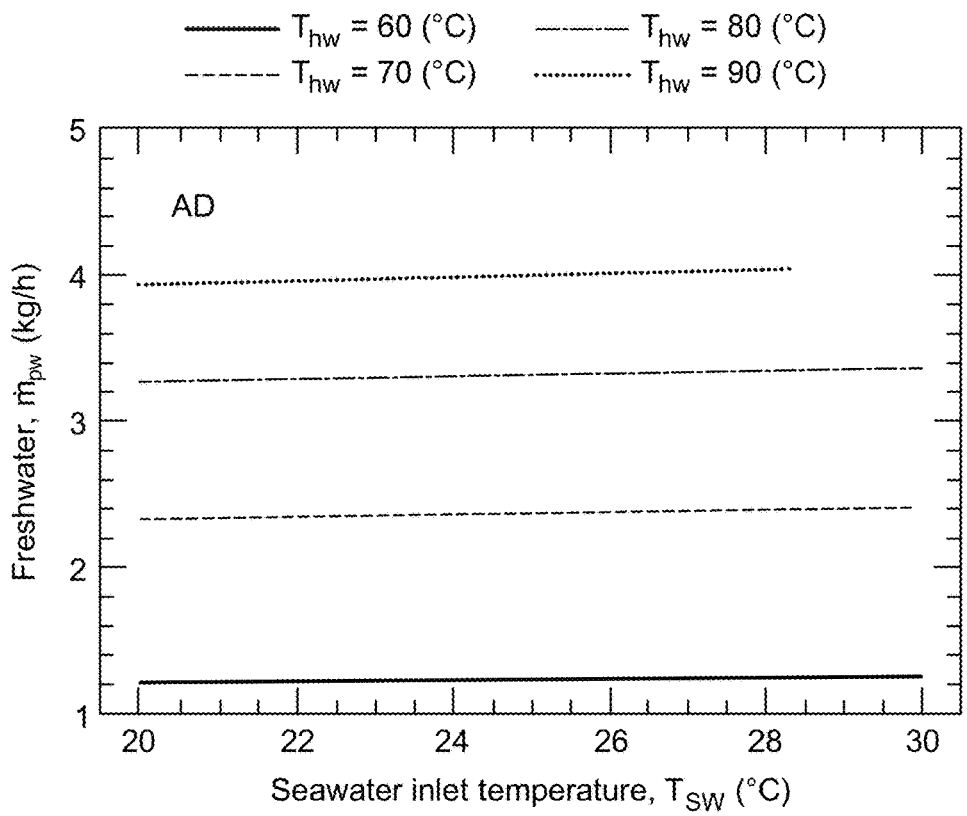
Figure 14A:
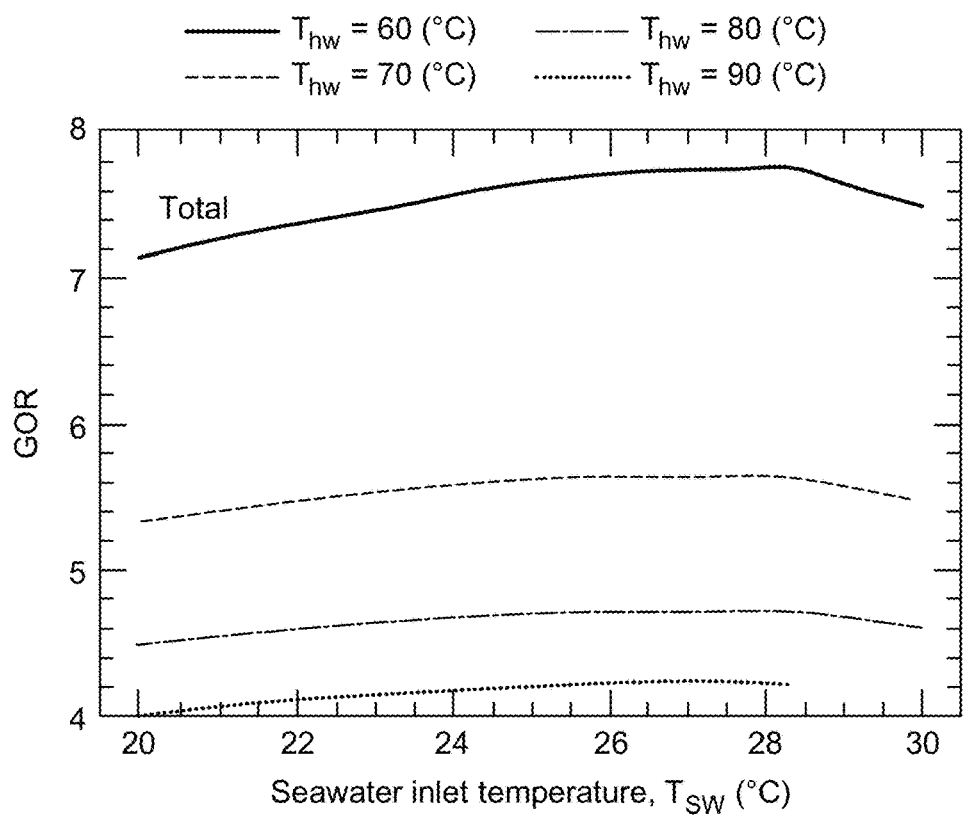
FIGS. 14A-14C are graphs illustrating the effect of heating water temperature on the system GOR at some selected inlet saline fluid temperature values for (a) hybrid (total), (b) HDH, and (c) AD under $\dot{m}_{hw}$=0.4, MR=0.85, $\dot{m}_{cw}$=$\dot{m}_{sw}$=0.8 kg/s, $\dot{m}_{chw}$=0.1 kg/s, and Half cycle time=850 s for the second scheme of FIG. 1B.
Figure 14B:
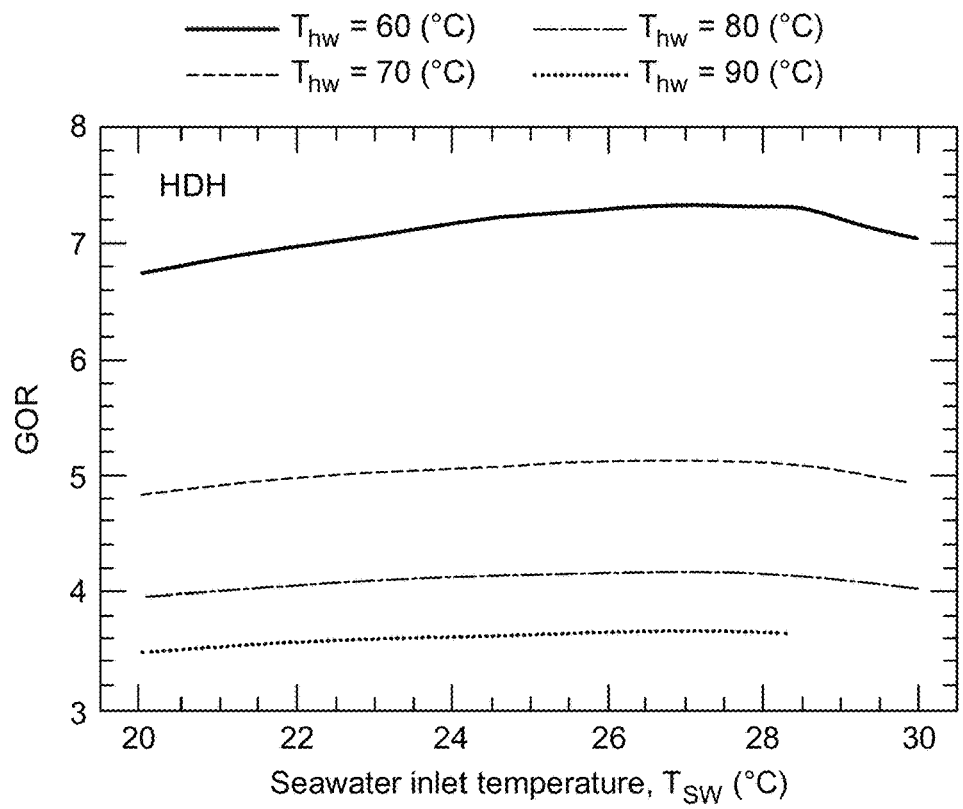
Figure 14C:
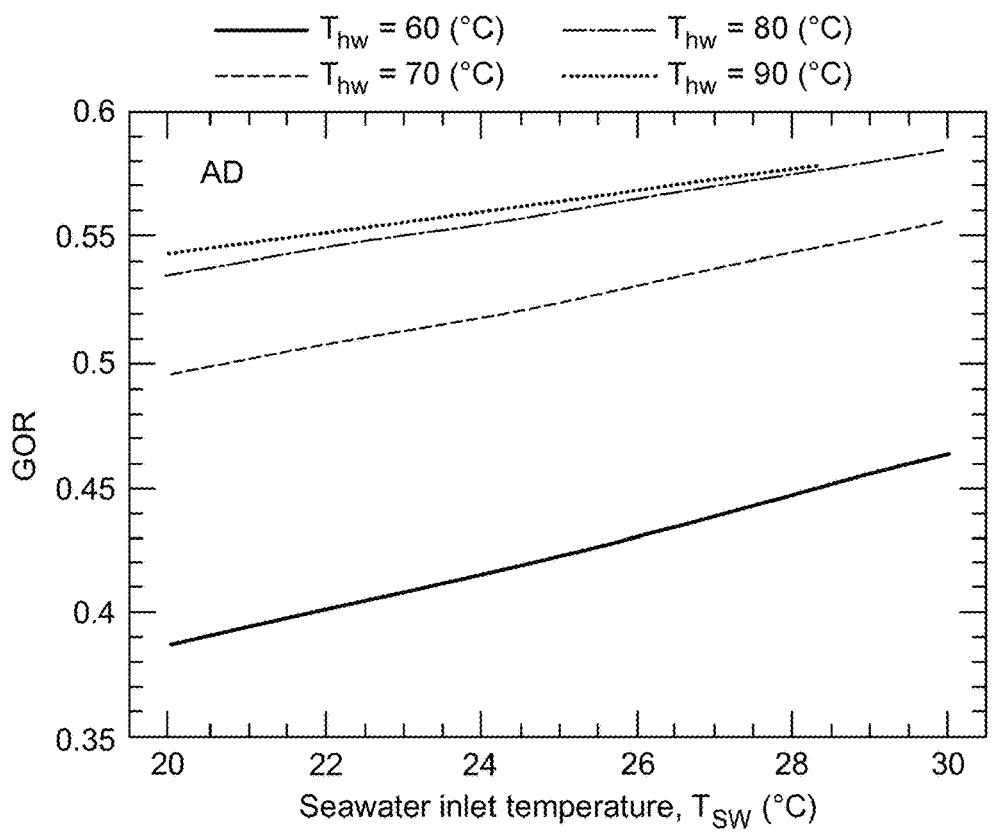

The effect of seawater and heating water temperature values on the hybrid system water production is shown in FIGS. 13A, 13B, and 13C. The water production trends against heating fluid and inlet fluid temperatures shown in FIGS. 13A, 13B, and 13C are similar to those of the first scheme 12. The difference here is the optimal values of water production are slightly less than those of the first scheme 12 in addition to that the optimal freshwater amounts are achieved under $T_{sw}$=25-28° C. (for the second scheme 186). The GOR values are shown in FIGS. 14A, 14B, and 14C as a function of inlet fluid temperature at certain temperature values of the inlet heating fluid. Again, there is no substantial change from the performance results of first scheme 12. The maximum hybrid GOR value is about 7.8 for $T_{sw}$=28° C. and $T_{hw}$=60° C. As evident, the $T_{hw}$=60° C. could be the efficient operating condition to obtain the optimal performances from the desalination system 10. The high temperature ($T_{hw}$=90° C.) could produce more water production but with lower GOR. It is concluded from first and second schemes 12, 186 that if the production time is important, $T_{hw}$=90° C. is a good choice; otherwise, the optimal performance can be obtained under $T_{hw}$=60° C.

Figure 15:
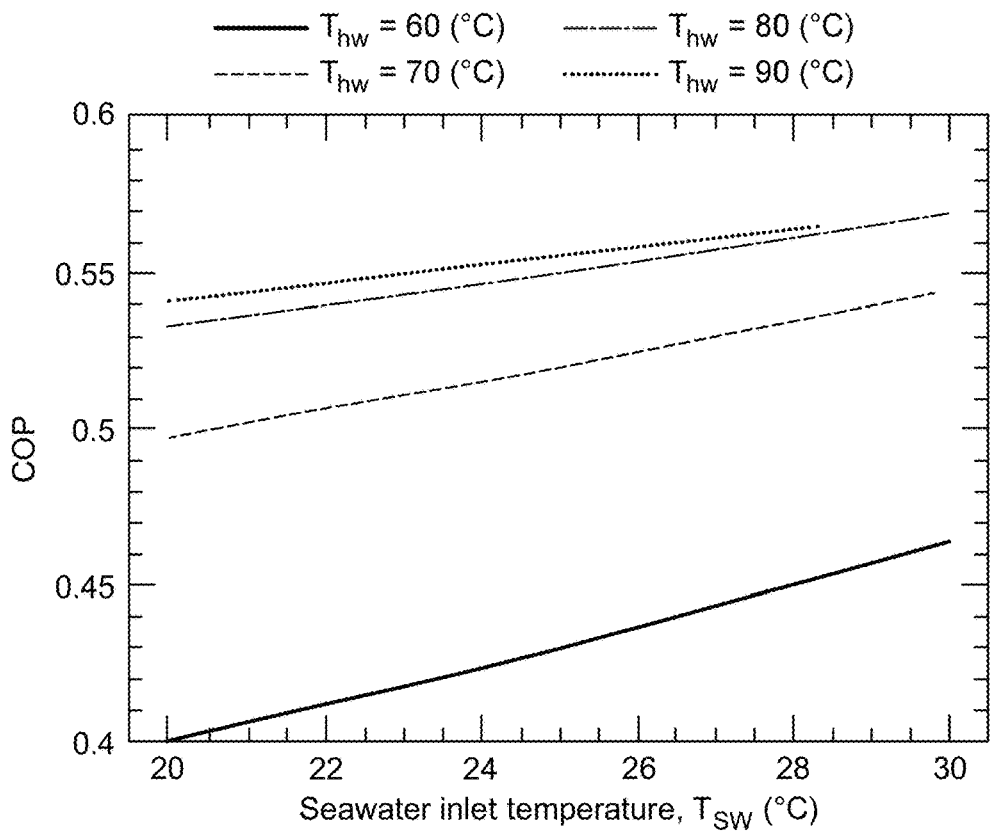
FIG. 15 is a graph illustrating the effect of heating temperature on COP at different saline fluid temperature values for AD under $\dot{m}_{hw}$32 0.4, MR=0.85, $\dot{m}_{cw}$=$\dot{m}_{sw}$=0.8 kg/s, $\dot{m}_{chw}$=0.1 kg/s, and Half cycle time=850 s for the second scheme of FIG. 1B.

As mentioned above, the difference between the first scheme 12 and the second scheme 186 is that the second scheme 186 produces a cooling effect which can be used for an air conditioning purpose. The COP of the AD as a part of the desalination system 10 is shown in FIG. 15 against inlet saline fluid temperature values. For $T_{hw}$=60° C. and $T_{sw}$=25-28° C. (as operating conditions suggested for the optimal GOR performance), the COP is found to be between 0.43 and 0.45. The high temperature values result in high COP values but the GOR values are minimized (which are preferred in the hybrid system).

Figure 16:
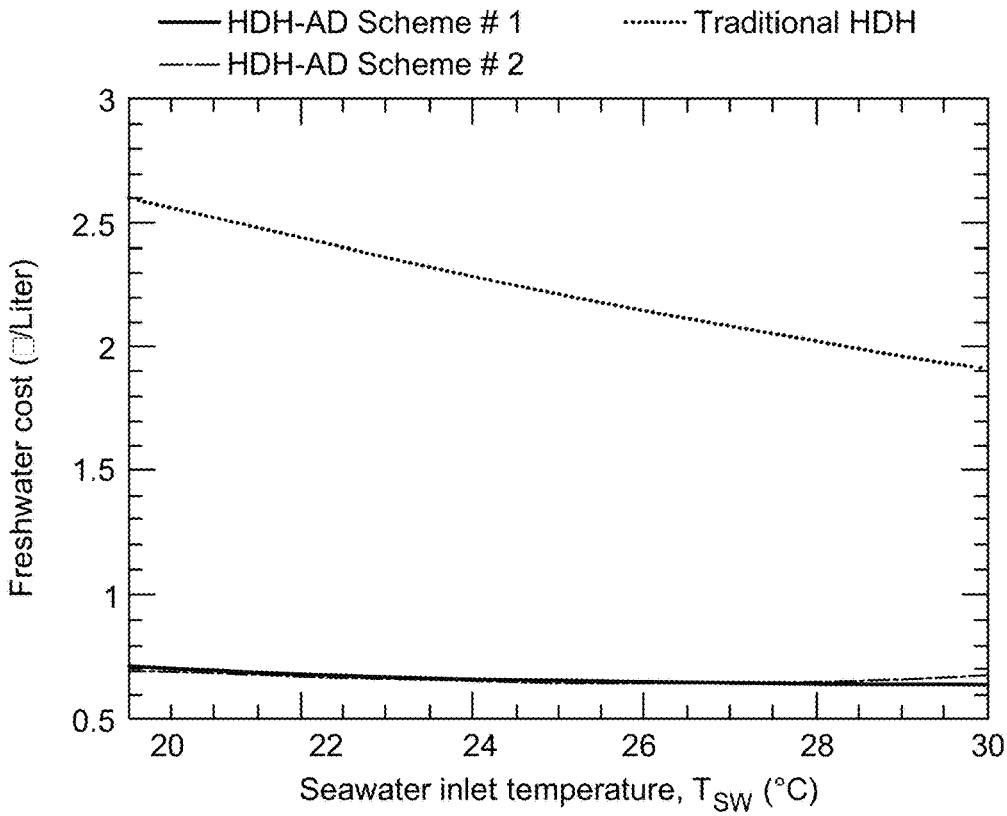
FIG. 16 is a graph illustrating freshwater cost against saline fluid temperature under optimal operating conditions ($T_{hw}$=60° C., $\dot{m}_{hw}$32 0.4, MR=0.85, $\dot{m}_{cw}$=$\dot{m}_{sw}$=0.8 kg/s, $\dot{m}_{chw}$=0.1 kg/s (the second scheme), and Half cycle time=850 s)

The optimal performance of the first and second schemes 12, 186 in terms of GOR values are obtained at $T_{he}$=60° C., $m_{hw}$=0.4, MR=0.85, $\dot{m}_{cw}$=$\dot{m}_{sw}$=0.8 kg/s, and Half cycle time=850 s as shown in FIGS. 9A, 9B, 9C, 14A, 14B, and 14C, respectively. For these optimal performances (shown in FIGS. 9A, 9B, 9C, 14A, 14B, and 14C), the freshwater cost is evaluated based on the method described above in connection with the economic analysis. FIG. 16 shows freshwater cost of the optimal performance of the first and second schemes 12, 186 and the traditional heated air HDH against inlet saline fluid temperature. The operating conditions of the HDH system are taken as similar to those of HDH AD schemes 12, 186 (the inlet saline fluid mass flowrate is 0.8 kg/s, MR=0.85 and the maximum temperature is 60° C.).

It can be observed from FIG. 16 that the disclosed HDH and AD systems 14, 16 have a much lower cost than the traditional HDH system. This is attributed to the higher GOR values of the HDH AD schemes 12, 186 disclosed herein. Another point is that the difference between the freshwater costs of both the HDH AD schemes 12, 186 is low. A general comparison between the two hybrid schemes 12, 186 with the traditional HDH is further illustrated below in Table 6 at the optimal conditions. The HDH system can produce more water about 69 kg/h when compared to >20 kg/h for both hybrid systems. This is due to the fact that the heating source is used directly to heat the recirculated air leading to exchanging more heat and water content in the humidifier and dehumidifier. However, the HDH freshwater is more expensive than those of the hybrid HDH AD systems. It is important to mention that the standalone HDH GOR value is about 2.3 in comparison to around 8 for the hybrid systems. The optimal freshwater cost of first scheme 12 is 0.64 ¢/Liter and that for the second scheme 186 is 0.65 ¢/Liter, while about 2.01 ¢/Liter for the HDH system. In general, the HDH (alone) GOR is <3.5 even at optimal operating conditions. See Mistry et al. (2010); and Narayana et al. (2010). Also, the second scheme 186 can produce a cooling effect (with COP>0.45) as a by-product, and the AD brine can be further dried to produce salt as a second by-product.

TABLE 6

A general comparison of the hybrid HDH-AD systems and HDH (air-heated) system under similar conditions.

| System | Scheme #1 | Scheme #2 | Air-heated HDH |
|---|---|---|---|
| Water production | Good (>22 kg/h) | Good (a little lower than Scheme #1) | High (about 69 kg/h) |
| GOR | High (about 8) | High (about 7.6) | Low (about 2.0) |
| COP | — | >0.45 | — |
| Cost (¢/Liter) | 0.64 | 0.65 | 2.01 |

The AD system 16 can be further improved by investigating the use of more efficient adsorbents such as MOFs. In addition, the HDH performance can be further enhanced by applying a thermodynamic balancing approach. See Narayan et al. (2013). Therefore, the performance of hybrid HDH AD systems has a good potential to be further improved.

The hybridization capability of the adsorption desalination (AD) system 16 and the humidification dehumidification desalination (HDH) system 14 are introduced and assessed. Two schemes (e.g., alternative designs) 12, 186 of a hybrid HDH AD system 10 are investigated (e.g., see FIGS. 1A and 1B). Both the schemes 12, 186 are composed of the dehumidifier 20, humidifier 18, two adsorbent beds 26, 28 (for continuous operation), condenser 32, and evaporator 30. In some examples, the used adsorption pair is silica gel and water. For both the schemes 12, 186, the brine 34 exiting from the humidifier 18 is accumulated and used as a refrigerant source to feed the AD system 16 through its evaporator 30. Moreover, the condenser 32 is used to condense the desorbed water coming from the desorption process and simultaneously heating up the circulated air between the humidifier 18 and dehumidifier 20. The water production is collected from the dehumidifier 20 (by condensing water from the humid air 42) as well as from the condenser 32 (by condensing the desorbed water coming from the desorption process). The difference between the two schemes 12, 186 is the inlet saline fluid 22 is first cooled by the evaporator 30 for the first scheme 12, whereas it is used for cooling the adsorption process for the second scheme 186.

An experimentally validated model is used to carry out the simulation. The key parameters used to tune the hybrid system performance are seawater mass flowrate and temperature, heating water mass flowrate and temperature, cycling time (important for adsorption and desorption processes), and HDH mass flowrate ratio.

The results demonstrate that the first scheme 12 is more efficient (in term of GOR values) when the cooling effect as (a by-product) is not important; otherwise, the second scheme 186 could be a perfect choice. Both schemes 12, 186 can achieve GOR values more then 7.5 with water product 20-30 kg/h under a certain conditions (maximum heating temperature is 60° C., inlet saline fluid temperature is between 28-30° C., mass flowrate of the first saline fluid 22 is 0.8 kg/s, and heating fluid mass flowrate is 0.4 kg/s, HDH mass flowrate ratio is 0.85, and Half cycle time is 850 s). Under these conditions, the COP (cooling effect) of the second scheme 186 is >0.45.

It is also observed from the performance of the two schemes 12, 186 that the performance of HDH system 14 dominates the total (hybrid) performance; however, the AD system 16 is used to control the performance of the HDH system 14 and lowering the energy consumption. The performance of the disclosed hybrid HDH AD systems is much better than those of traditional HDH systems. In particular, the evaluated cost of freshwater shows a significant enhancement (about 3 times) when the HDH AD schemes are used instead of the traditional HDH. Moreover, the brine 34 extracted from AD system 16 could be further treated to produce salt as a second by-product.

Validation and Error Analysis

To validate the AD and HDH modeling simulation, a comparison between the present results and some data from the literature is implemented. For the AD system, the experimental data of Alsaman et al. is selected because they were using silica-gel and water as adsorption pair. See A. S. Alsaman, A. A. Askalany, K. Harby, M. S. Ahmed, Performance evaluation of a solar-driven adsorption desalination-cooling system, Energy 128 (2017) 196-207, http://doi.org/10_1016/j.energy.2017.04.010, which is incorporated herein by reference in its entirety. The operative and constructive parameters are similar to those listed in Tables 2 and 3 in addition to that the heating water mass flowrate was 0.2 kg/s and that for chilled water is 0.1 kg/s. FIG. 17A shows the operating temperature values (for the condenser, the adsorbent beds, and the evaporator) history for both experimental data and present simulated results. It is clear that the present results are in excellent match with the experimental data.

Figure 17B:
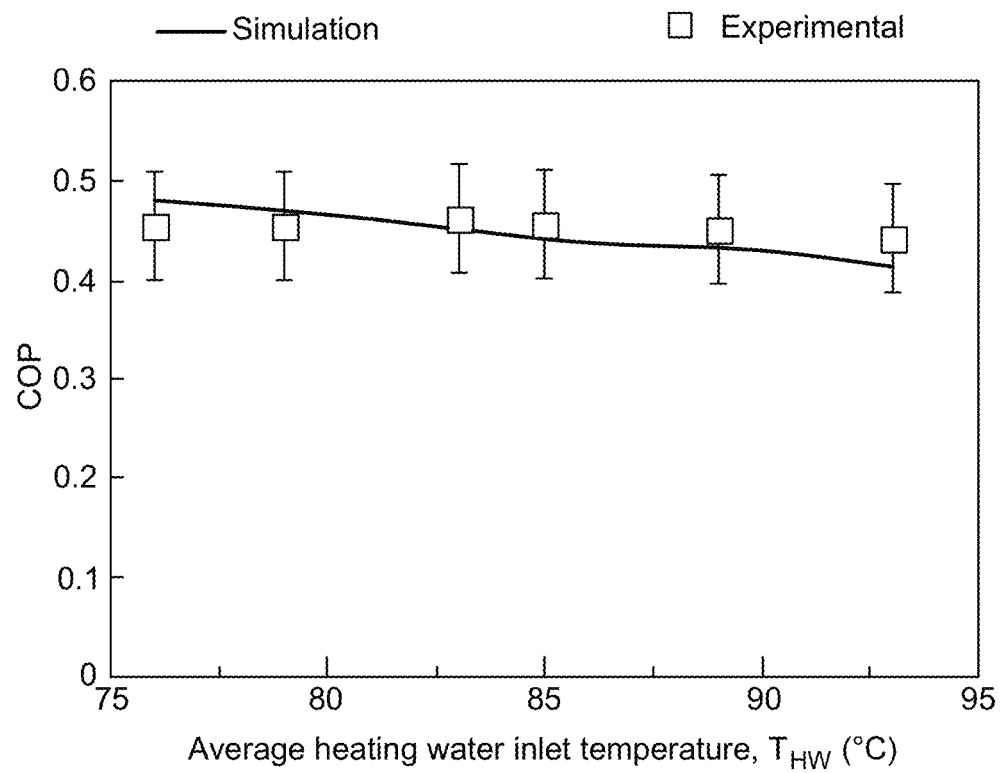
FIG. 17B is a graph illustrating a comparison of experimental COP values and those of the present simulation.
Figure 17C:
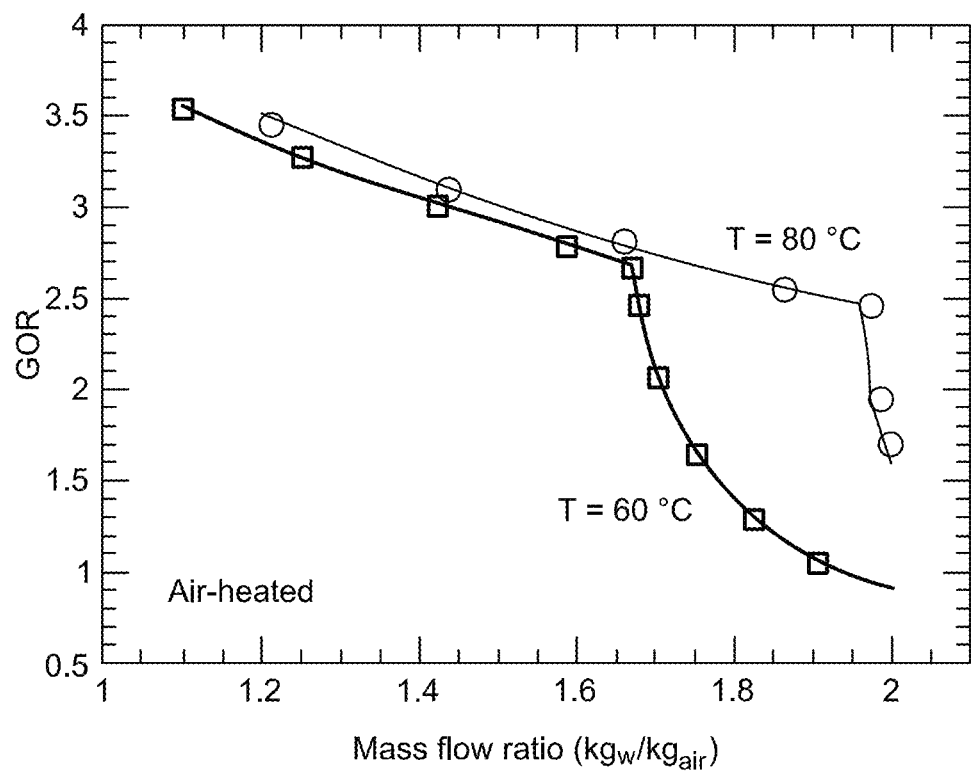
FIG. 17C is a graph illustrating a comparison of present simulation results and reported data of HDH system in term of GOR values (symbols are the reported data, and lines are the present results)
Figure 17D:
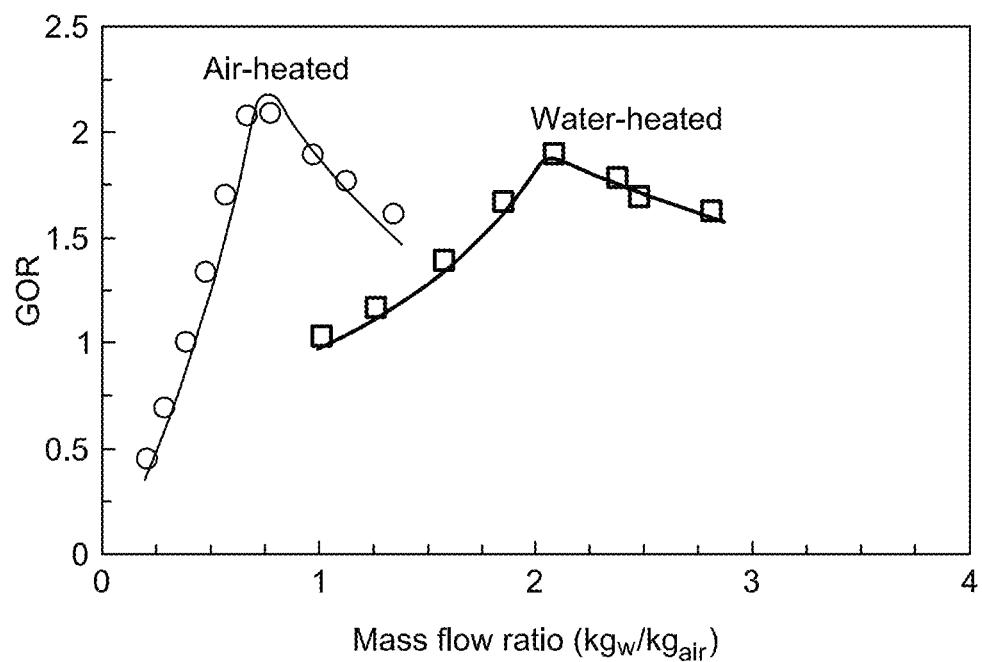
FIG. 17D is a graph illustrating a comparison between present simulation results and reported data of HDH system in term of GOR values (symbols are the reported data, and lines are the present results)

The experimental COP of AD system is used to check the accuracy of simulation results, as shown in FIG. 17B. The error bars of the experimental data are calculated by the uncertainty propagation from the reported temperature and pressure errors (i.e., temperature error is ±6% and pressure error is ±5%) as follows:

$$\text{error\_COP}_x = \sqrt{\left(\frac{\delta COP}{\delta x_1}\sigma_{x_1}\right)^2 + \left(\frac{\delta COP}{\delta x_2}\sigma_{x_2}\right)^2 + \ldots + \left(\frac{\delta COP}{\delta x_n}\sigma_{x_n}\right)^2} \quad (A1)$$

where x is the measured parameter (having an error) and a is the parameter error value. Id. The uncertainty value of COP based on the reported T and P error values can be estimated as $$\text{error\_COP} = \sqrt{(\text{error\_COP}_T)^2 + (\text{error\_COP}_P)^2} \quad (A2)$$

It is important to mention that Eq. (26) also contains mass flow rates of heating and chilled water; however, these errors are not considered here since they are not reported in the main ref. Id. The simulation COP results are in excellent agreement with the experimental data as shown in FIG. 17B.

The HDH model is validated with respect to the reported data of Mistry et al. in terms of GOR values against mass flowrate ratio values under heating temperature values of 60 and 80° C. See K. H. Mistry, J. H. Lienhard V, S. M. Zubair, Effect of entropy generation on the performance of humidification-dehumidification desalination cycles, Int. J. Therm. Sci. 49 (2010) 1837-1847, world wide web.doi.org/10.1016/j.ijthermalsci.2010.05.002, which is incorporated herein by reference in its entirety. The effectiveness of both the humidifier and the dehumidifier are about 0.9 while the air exits from them is assumed to be saturated. The minimum temperature is about 30° C. Under these conditions, for the air-heated HDH system, the reported data and present results are in an excellent agreement, as shown in FIG. 17C. Moreover, the HDH model is validated against the GOR data of Sharqawy et al. for both air-heated and water-heated HDH (under the effectiveness of both the humidifier and dehumidifier are 0.85, maximum temperature is 60° C., inlet seawater temperature is 30° C., and relative humidity is about 90% at the exit of both the humidifier and dehumidifier). See M. H. Sharqawy, M. A. Antar, S. M. Zubair, A. M. Elbashir, Optimum thermal design of humidification dehumidification desalination systems, Desalination 349 (2014) 10-21, which is incorporated herein by reference in its entirety. The agreement between the present results and reported data are excellent, as shown in FIG. 17D.

Figure 18A:
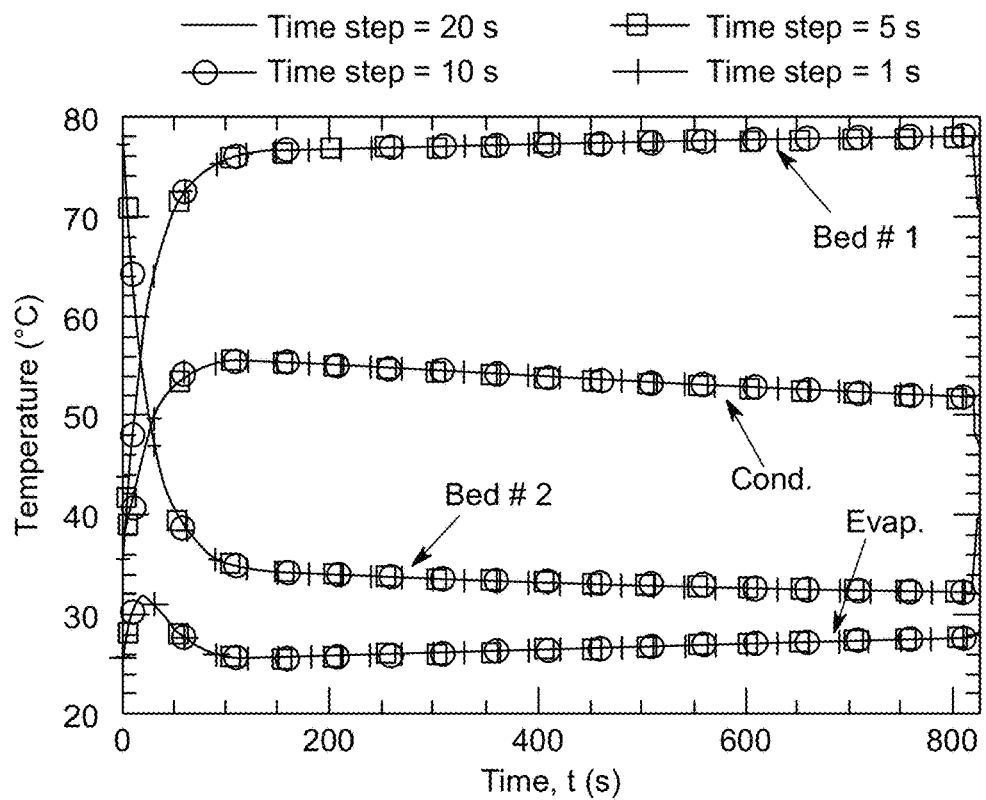
FIGS. 18A and 18B are graphs illustrating the effect of time-step values used to couple AD and HDH models in a simulation.
Figure 18B:
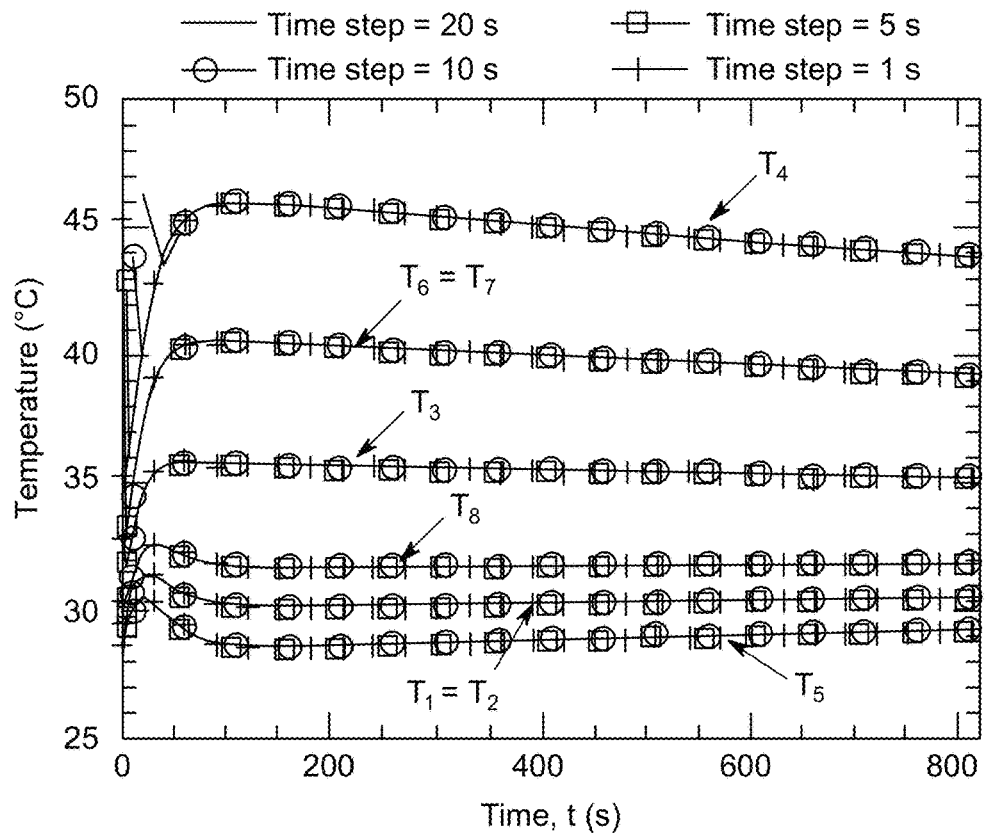

As described in constructive and operating conditions above, "ode45" algorithm is used to solve the transient model of AD system. It is divided the time-step automatically to satisfy a specified tolerance (e.g., it is considered as $10^{-10}$). Thus, the numerical error is so small. However, to update the values of coupled parameters (such as $T_{cond}$ and $T_4$) between AD and HDH systems, another time-steps scheme is used to update the coupled values of both HDH and AD. Four time-step schemes are tested such as 1, 5, 10, and 20 s, as shown in FIGS. 18A and 18B for a one-half cycle. It is clearly shown that the investigated time-step schemes have almost the same temperature trends for both the HDH and AD systems. The only discrepancy observed is the maximum heating temperature ($T_4$) values of HDH at the first 50 s (after the initial values) for the large time-step scheme (i.g., 20 s) due to a larger discretization error. Thus, the smaller time steps ≤10 s are preferred since the switching time (for both the preheating and precooling processes) is investigated as 20 s.

Figure 19:
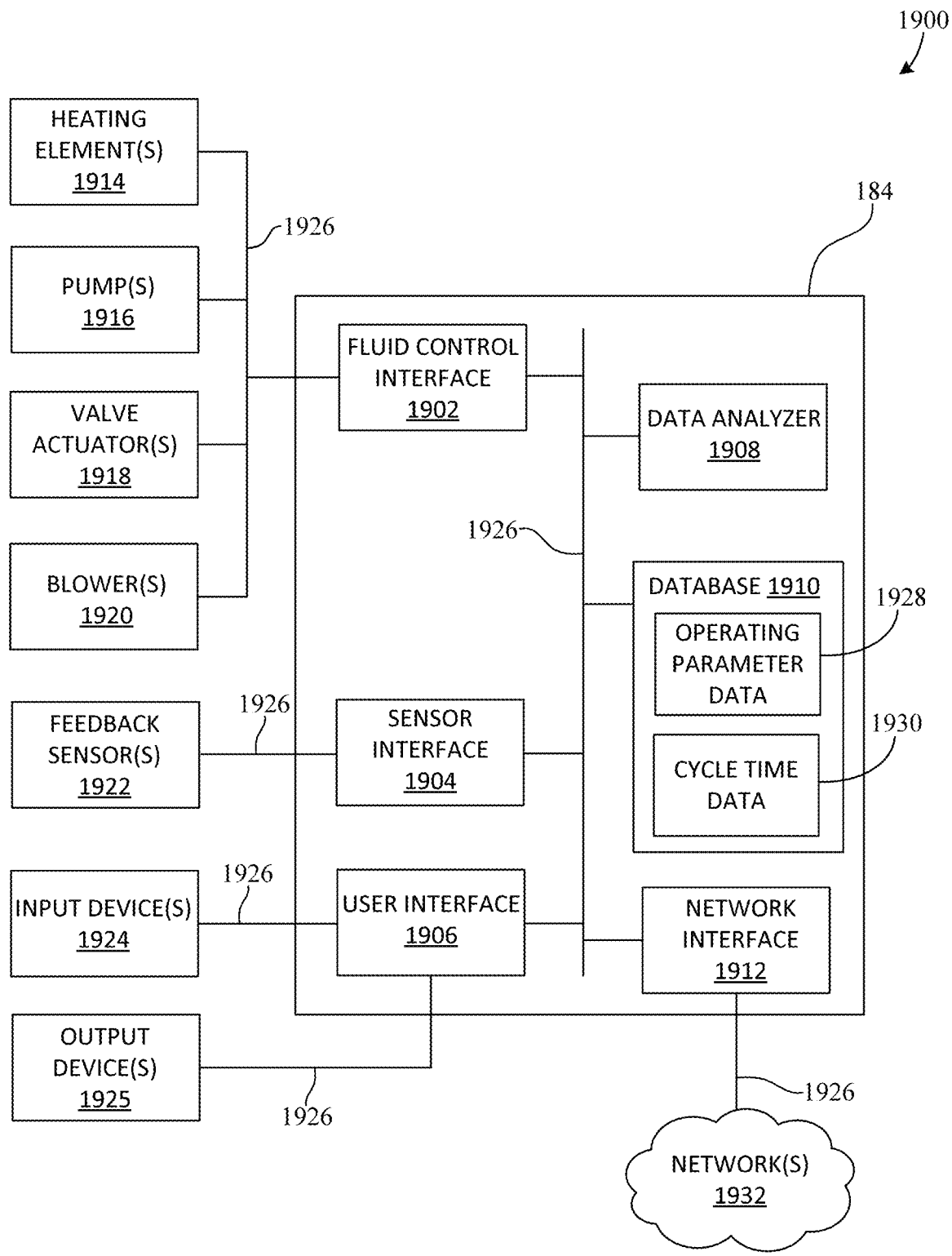
FIG. 19 is a block diagram of an example desalination control system in accordance with the teachings of this disclosure.

FIG. 19 is a block diagram of an example desalination control system 1900 in accordance with the teachings of this disclosure. In some examples, the desalination control system 1900 is implemented by the controller 184 of FIGS. 1A and 1B. According to the illustrated example of FIG. 19, the desalination control system 1900 includes an example fluid control interface 1902, an example sensor interface 1904, an example user interface 1906, an example data analyzer 1908, an example database 1910, and an example network interface 1912. In particular, to control one or more operating parameters associated with the desalination system 10, the desalination control system 1900 of FIG. 19 is communicatively coupled to one or more example heating elements 1914, one or more example pumps 1916, one or more example valve actuators 1918, one or more example blowers 1920, one or more example feedback sensors 1922, one or more input device(s) 1924, and one or more output device(s) 1925 via example communication link(s) 1926 such as, for example, one or more signal or transmission wires, a bus, radio frequency, etc. In some examples, the desalination control system 1900 is configured to direct the heating element(s) 1914, the pump(s) 1916, the valve actuator(s) 1918, and/or the blower(s) 1920 to control (a) a mass flowrate of the first saline fluid 22, (b) a temperature of the first saline fluid 22, (c) a mass flowrate of the second auxiliary fluid 130, (d) a temperature of the second auxiliary fluid 130, (e) cycling time associated with the bed(s) 26, 28, (f) a mass flowrate ratio associated with the HDH system 14, or (g) a combination thereof. Such parameters may be predetermined, preprogrammed into the desalination control system 1900, and/or otherwise stored in the database 1910 as part of operating parameter data 1928 and/or cycle time data 1930.

The heating element(s) 1914 of FIG. 19 are operatively coupled to the primary heating source 36 of FIGS. 1A and 1B to facilitate temperature control of the second auxiliary fluid 130. Additionally, the heating element(s) 1914 are communicatively coupled to the fluid control interface 1902 via the link(s) 1926, for example, to receive one or more control signals or commands and/or electrical power from the fluid control interface 1902. The heating element(s) 1914 of FIG. 19 can be implemented, for example, using one or more heating coils (e.g., constructed of wire) and/or any other suitable heating element. As such, the heating element(s) 1914 may form part of an electric heater. In some examples, the heating element(s) 1914 are structured and/or configured to increase a temperature of the second auxiliary fluid 130 (i.e., heat the second auxiliary fluid 130) before the second auxiliary fluid 130 is provided to the bed(s) 26, 28, for example, in response to the heating element(s) 1914 receiving an electric current from the fluid control interface 1902.

The pump(s) 1916 of FIG. 19 are operatively interposed between particular components of the desalination system 10, which facilitate transporting one or more of the aforementioned fluids 22, 34, 40, 42, 128, 130 between the components. Each of the pump(s) 1916 can be implemented, for example, using one of (a) a centrifugal pump, (b) a positive displacement pump, (c) etc., or (d) a combination thereof. In some examples, each of the pump(s) 1916 includes at least one motor (e.g., an electric motor) operatively coupled thereto and communicatively coupled to the fluid control interface 1902 via the link(s) 1926.

In some examples, a first one of the pump(s) 1916 (e.g., a seawater pump) is structured and/or configured to control a flowrate of the first saline fluid 22 that is input to the desalination system 10 from the saline fluid source 104, for example, in response to the first one of the pump(s) 1916 receiving one or more control signals or commands and/or electrical power from the fluid control interface 1902. In such examples, the first one of the pump(s) 1916 can be operatively interposed between, for example, the saline fluid source 104 and (a) the evaporator 30 (e.g., see FIG. 1A) or (b) at least one of the bed(s) 26, 28 (e.g., see FIG. 1B). Further, in some examples, a second one of the pump(s) 1916 is structured and/or configured to control a flowrate of the second saline fluid 34 that is input to the evaporator 30 from the humidifier 18. In such examples, the second one of the pump(s) 1916 can be operatively interposed between, for example, the humidifier 18 and the evaporator 30. Further still, in some examples, a third one of the pump(s) 1916 is structured and/or configured to control a flowrate of the second auxiliary fluid 130 that is input to the bed(s) 26, 28. In such examples, the third one of the pump(s) 1916 can be operatively interposed between, for example, the primary heating source 36 and at least one of the bed(s) 26, 28. Further still, in some examples, a fourth one of the pump(s) 1916 is structured and/or configured to control a flowrate of the first auxiliary fluid 128 that is input to the bed(s) 26, 28 from the primary cooling source 122. In such examples, the fourth one of the pump(s) 1916 is operatively interposed between, for example, the primary cooling source 122 and at least one of the bed(s) 26, 28.

The valve actuator(s) 1918 of FIG. 19 are operatively coupled to respective ones of the valve(s) 154, 155, 156, 157, 180 of the desalination system 10. Each of the valve actuator(s) 1918 can be implemented, for example, using one of an electric valve actuator, a pneumatic valve actuator, a hydraulic valve actuator, etc., as previously mentioned. In particular, the valve actuator(s) 1918 of FIG. 19 are structured and/or configured to control positions of respective ones of the valve(s) 154, 155, 156, 157, 180, for example, in response to the valve actuator(s) 1918 receiving one or more control signals or commands and/or electrical power from the fluid control interface 1902.

The blower(s) 1920 of FIG. 19 are operatively interposed between particular components of the HDH system 14, which facilitate circulating the air 42. Each of the blower(s) 1920 can be implemented, for example, using one of (a) a centrifugal blower, (b) a positive displacement blower, (c) a regenerative blower, (d) etc., or (e) a combination thereof. However, in some examples, the desalination control system 1900 of FIG. 19 is implemented differently, for example, using one or more fans and/or one or more compressors in addition or alternatively to the blower(s) 1920. In some examples, each of the blower(s) 1920 includes at least one motor (e.g., an electric motor) operatively coupled thereto and communicatively coupled to the fluid control interface 1902 via the link(s) 1926.

In some examples, a first one of the blower(s) 1920 is structured and/or configured to control a flowrate of the air 42 circulating through the humidifier 18, the dehumidifier 20, and the condenser 32, for example, in response to the first one of the blower(s) 1920 receiving one or more control signals or commands and/or electrical power from the fluid control interface 1902. In such examples, a first one of the blower(s) 1920 is operatively interposed between the humidifier 18 and the dehumidifier 20.

The feedback sensor(s) 1922 of FIG. 19 are operatively coupled to particular components of the desalination system 10 to measure and/or detect one or more of the operating parameters associated with the desalination system 10, which enable the desalination control system 1900 to better control the operating parameters. The feedback sensor(s) 1922 can be implemented, for example, using (a) one or more flowrate sensors, (b) one or more temperature sensors, (c) one or more pressure sensors, (d) etc., or (e) a combination thereof. The feedback sensor(s) 1922 are communicatively coupled to the sensor interface 1904 via link(s) 1926. In particular, the feedback sensor(s) 1922 are configured to generate sensor data during desalination and provide the sensor data to the sensor interface 1904. In some examples, the sensor data is indicative of (a) the mass flowrate of the first saline fluid 22, (b) the temperature of the first saline fluid 22, (c) the mass flowrate of the second auxiliary fluid 130, (d) the temperature of the second auxiliary fluid 130, (e) a mass flowrate ratio associated with the HDH system 14, or (f) a combination thereof.

The input device(s) 1924 of FIG. 19 can be implemented, for example, using (a) one or more buttons, (b) one or more switches, (c) one or more levers, (d) one or more touch screens, (e) one or more keyboards, (0 one or more microphones, (g) etc., or (h) a combination thereof. The input device(s) 1924 is/are communicatively coupled to the user interface 1906 via the link(s) 1926. In particular, in response to a user interacting with the input device(s) 1924, the input device(s) 168 detects resulting user input(s) and/or selection(s) and generates associated control data (e.g., a request to start desalination). The input device(s) 1924 then provide such control data to the user interface 1906 for processing.

The output device(s) 1925 can be implemented, for example, using one or more display devices such as a light emitting diode (LED), a liquid crystal display, a touchscreen, a speaker, etc. In particular, the output device(s) 1925 convey information associated with the desalination system 10 to one or more end users. For example, the output device(s) 1925 generate visual data and/or sounds indicative of one or more of the operating parameters associated with the desalination system 10.

The fluid control interface 1902 of FIG. 19 facilitates interactions between the desalination control system 1900 and (a) the heating element(s) 1914, (b) the pump(s) 1916, (c) the valve actuator(s) 1918, (d) the blower(s) 1920, or (e) a combination thereof. In some examples, the fluid control interface 1902 is communicatively coupled, via the link(s) 1926, to heating element(s) 1914. In such examples, the fluid control interface 1902 is configured to direct to the heating element(s) 1914 to control the temperature of the second auxiliary fluid 130. Additionally, in some examples, the fluid control interface 1902 is communicatively coupled, via the link(s) 1926, to the pump(s) 1916. In such examples, the fluid control interface 1902 is configured to direct the pump(s) 1916 to control one or more of the aforementioned flowrates associated with the desalination system 10.

Additionally, in some examples, the fluid control interface 1902 is communicatively coupled, via the link(s) 1926, to the valve actuator(s) 1918. In such examples, the fluid control interface 1902 is configured to direct the valve actuator(s) 1918 to control a position of, for example, one of the (a) the first valve 154, (b) the second valve 155, (c) the third valve 156, (d) the fourth valve 157, (e) one or more other valves associated with the desalination system 10, or (f) a combination thereof. For example, the fluid control interface 1902 generates one or more control signals or commands and/or otherwise provides the control signal(s) or command(s) and/or electrical power to the valve actuator(s) 1918. In response, each the valve actuator(s) 1918 generates an output and applies the output to respective ones of the valve(s) 154, 155, 156, 157.

In such examples, during the first adsorption process associated with the first bed 26, the fluid control interface 1902 directs the valve actuator(s) 1918 to open the first valve 154 and close the second valve 155 (e.g., see FIGS. 1A and 1B). Conversely, during the first desorption process associated with the first bed 26, the fluid control interface 1902 directs the valve actuator(s) 1918 to close the first valve 154 and open the second valve 155. Similarly, in some examples, during the second adsorption process associated with the second bed 28, the fluid control interface 1902 directs the valve actuator(s) 1918 to open the third valve 156 and close the fourth valve 157. Conversely, during the second desorption process associated with the second bed 28, the fluid control interface 1902 directs the valve actuator(s) 1918 to close the third valve 156 and open the fourth valve 157 (e.g., see FIGS. 1A and 1B).

Additionally, in some examples, the fluid control interface 1902 is communicatively coupled, via the link(s) 1926, to the blower(s) 1920. In such examples, the fluid control interface 1902 is configured to direct the blower(s) 1920 to control the flowrate of the air 42, as previously mentioned.

The user interface 1906 of FIG. 19 facilitates interactions and/or communications between one or more end users (e.g., plant personnel) and the desalination control system 1900. The user interface 1906 includes, for example, a human-machine interface (HMI) and/or a graphical user interface (GUI). In some examples, the user interface 1906 is communicatively coupled, via the link(s) 1926, to the input device(s) 1924 to receive control data therefrom, for example, in response to a user interacting with the input device(s) 1924. In particular, in such examples, the data provided by the input device(s) 1924 enables the data analyzer 1908 and/or, more generally, the desalination control system 1900 to determine when to operate and/or how to operate the desalination system 10. For example, the user interface 1906 receives a request from the input device(s) 1924 to start or stop desalination. In another example, the user interface 1906 receives a request from the input device(s) 1924 that corresponds to an adjustment of an operating parameter associated with the desalination system 10.

Further, in some examples, the user interface 1906 is also communicatively coupled, via the link(s) 1926, to the output device(s) 1925 to provide data thereto. In such examples, the user interface 1906 directs the output device(s) 1925 to generate visual data (e.g., one or more images, text, etc.) and/or one or more sounds.

The network interface 1912 of FIG. 19 facilitates interactions and/or communications between the desalination control system 1900 and one or more external systems such as, for example, a process control system (PCS) and/or a process control network (PCN). As such, in some examples, the network interface 1912 is communicatively coupled, via the link(s) 1926, to one or more network(s) 1932 to provide data thereto and/or receive data therefrom. The network(s) 1932 includes, for example, any of a controller area network (CAN), a local area network (LAN), a wide area network (WAN), a satellite network, the Internet, etc.

The data analyzer 1908 of FIG. 19 calculates and/or determines one or more adjustments for the heating element(s) 1914, the pump(s) 1916, the valve actuator(s) 1918, and/or the blower(s) 1920 that are to be executed by the fluid control interface 1902, for example, based on the operating parameter data 1928, the cycle time data 1930, and/or the sensor data. In some examples, the data analyzer 1908 determines when to carry out and/or transition processes associated with the respective beds 26, 28 to provide substantially continuous and/or synchronized adsorption and desorption processes. As such, in some examples, the data analyzer 1908 accesses and/or uses the operating parameter data 1928, the cycle time data 1930, and/or the sensor data in the database 1910.

In some examples, the data analyzer 1908 determines to initiate (e.g., simultaneously), based on the cycle time data 1930, the first cooling processes associated with the first bed 26 and the second heating processes associated with the second bed 28. As a result, in such examples, the first adsorption process associated with the first bed 26 occurs during the second desorption process associated with the second bed 28 (e.g., see FIGS. 1A and 1B). Conversely, in some examples, the data analyzer 1908 determines to initiate (e.g., simultaneously), based on the cycle time data 1930, the first heating processes associated with the first bed 26 and the second cooling processes associated with the second bed 28. As a result, in such examples, the first desorption process associated with the first bed 26 occurs during second adsorption processes associated with the second bed 28.

In some examples, the cycle time data 1930 includes the cycle times illustrated above in Table 1. For example, with respect to the first bed 26, the cycle time data 1930 includes a first time interval (e.g., about 640 seconds) during which the first adsorption process is to occur. Further, in such examples, the cycle time data 1930 of FIG. 19 also includes a second time interval (e.g., about 20 seconds) during which the first preheating process is to occur. Further still, in such examples, the cycle time data 1930 includes a third time interval (e.g., about 640 seconds) during which the first desorption process is to occur. Further still, in such examples, the cycle time data 1930 of FIG. also includes a fourth time interval (e.g., about 20 seconds) during which the first precooling process is to occur.

Additionally, in some examples, with respect to the second bed 28, the cycle time data 1930 of FIG. 19 also includes a fifth time interval (e.g., about 640 seconds) during which the second desorption process is to occur. Further, in such examples, the cycle time data 1930 also includes a sixth time interval (e.g., about 20 seconds) during which the second precooling process is to occur. Further still, in such examples, the cycle time data 1930 also includes a seventh time interval (e.g., about 640 seconds) during which the second adsorption process is to occur. Further still, in such examples, the cycle time data 1930 also includes an eighth time interval (e.g., about 20 seconds) during which a second preheating process is to occur.

The database 1910 of FIG. 19 stores (e.g., temporarily and/or permanently) and/or provides access to at least a portion of the data 1928, 1930 in the database 1910. In some examples, the database 1910 is communicatively coupled, via the link(s) 1926, to one or more of the fluid control interface 1902, the sensor interface 1904, the user interface 1906, the data analyzer 1908, and/or the network interface 1912. For example, any one or more of the fluid control interface 1902, the sensor interface 1904, the user interface 1906, the data analyzer 1908, and/or the network interface 1912 transmit and/or otherwise provide (e.g., repeatedly and/or continuously) data to the database 1910. Conversely, in some examples, the database 1910 transmits and/or otherwise provides (e.g., repeatedly or continuously) data to any one or more of the fluid control interface 1902, the sensor interface 1904, the user interface 1906, the data analyzer 1908, and/or the network interface 1912.

Although an example desalination control system 1900 is illustrated in FIG. 19, one or more of the elements, processes, and/or devices depicted in FIG. 19 may be combined, divided, re-arranged, omitted, eliminated, and/or implemented in any other way. Further, the example desalination control system 1900 of FIG. 19 may include one or more elements, processes, and/or devices in addition or alternatively to those illustrated in FIG. 19, and/or may include more than one of any of the illustrated elements, processes, and devices.

Additionally, one or more of the example controller 184, the example fluid control interface 1902, the example sensor interface 1904, the example user interface 1906, the example data analyzer 1908, the example database 1910, the example network interface 1912 and/or, more generally, the example desalination control system 1900 of FIG. 19 may be implemented by hardware, software, firmware and/or any combination of thereof. For example, one or more (e.g., all) of the example controller 184, the example fluid control interface 1902, the example sensor interface 1904, the example user interface 1906, the example data analyzer 1908, the example database 1910, the example network interface 1912, and/or, more generally, the example desalination control system 1900 could be implemented by one or more circuits (e.g., an analog or digital circuit, a logic circuit, a programmable processor, etc.). Further, in some examples, at least one of the example controller 184, the example fluid control interface 1902, the example sensor interface 1904, the example user interface 1906, the example data analyzer 1908, the example database 1910, the example network interface 1912, and/or the example desalination control system 1900 include(s) a tangible machine-readable storage device or storage disk (e.g., a memory storing the software and/or firmware).

Figure 20:
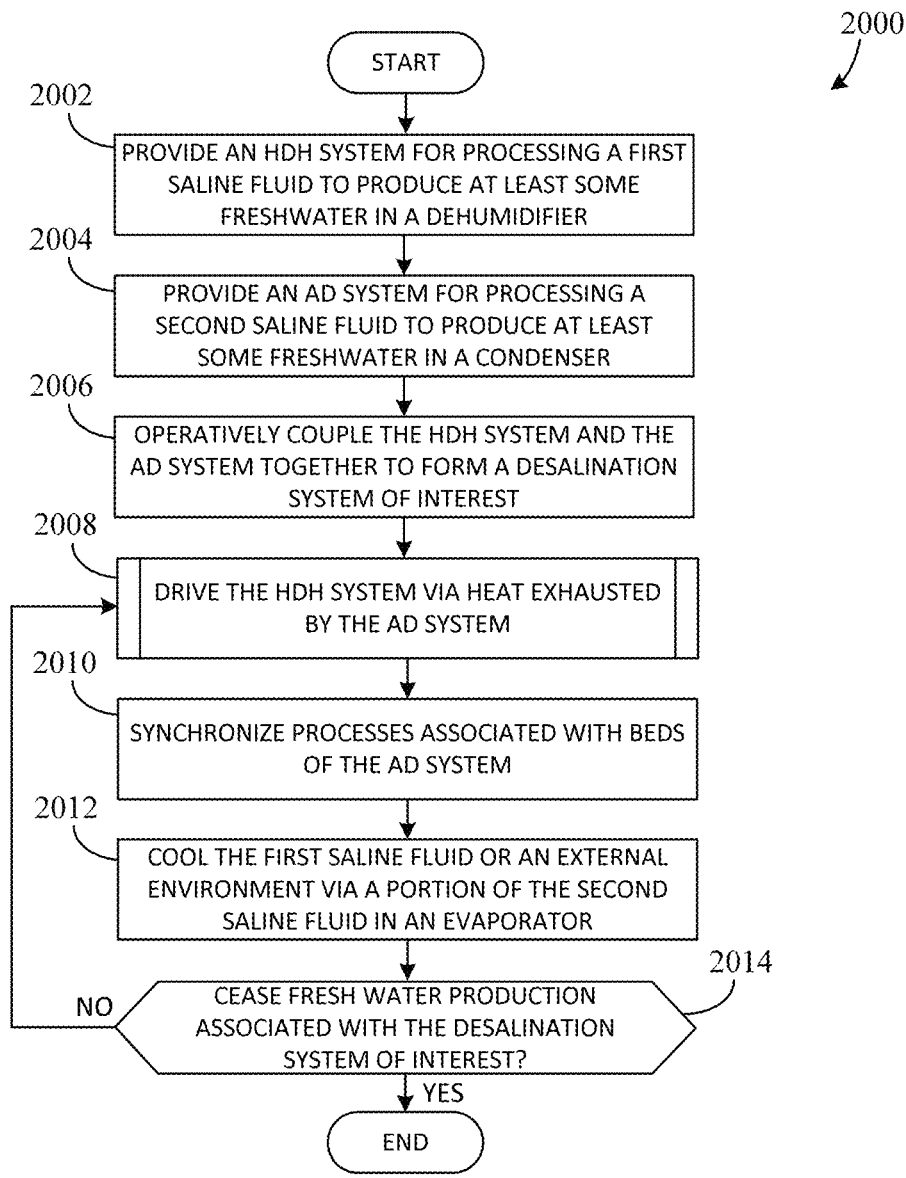
FIG. 20 is a flowchart representative of an example method that can be executed to implement the example desalination system of FIGS. 1A and 1B and/or the example desalination control system of FIG. 19.
Figure 21:
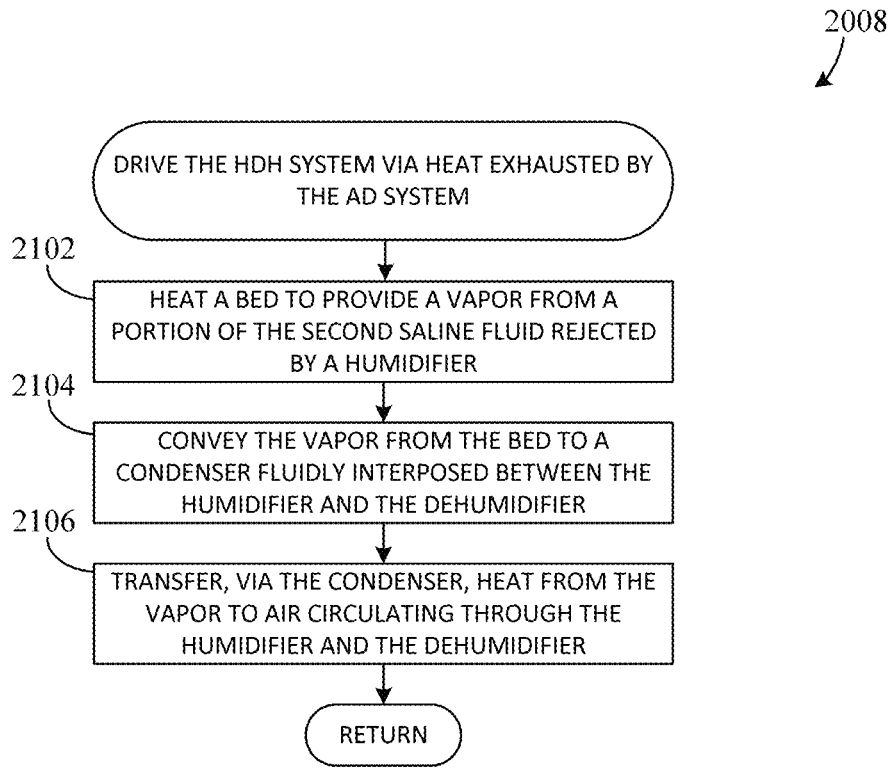
FIG. 21 is a flowchart representative of an example method that may be executed to implement the example desalination control system of FIG. 19 to drive an HDH system via heat exhausted by an AD system.

Flowcharts representative of example hardware logic or machine-readable instructions for implementing the example desalination control system 1900 of FIG. 19 are shown in FIGS. 20 and 21. The machine-readable instructions may be a program or portion of a program for execution by a processor such as the processor 2202 shown in the example processor platform 2200, which is discussed in greater detail below in connection with FIG. 22. The program may be embodied in software stored on a tangible machine-readable storage medium such as a CD-ROM, a floppy disk, a hard drive, or a memory associated with the processor 2202, but the entire program and/or parts thereof could be alternatively executed by a different device and/or embodied in firmware or dedicated hardware. Further, although the example program is described with reference to the flowcharts illustrated in FIGS. 20 and 21, many other methods of implementing the example desalination control system 1900 may alternatively be used. For example, the order of execution of the blocks may be changed, and/or some of the blocks described may be changed, eliminated, or combined. Additionally or alternatively, any of the blocks may be implemented by one or more hardware circuits (e.g., discrete and/or integrated analog and/or digital circuitry, logic circuit, a comparator, etc.).

As mentioned above, the example processes of FIGS. 20 and 21 may be implemented using executable or coded instructions (e.g. computer or machine readable instructions) stored on a tangible machine-readable storage medium such as a hard disk drive, a compact disk (CD), a flash memory, and/or other storage device or disk in which information is stored for any duration of time. As used herein, the term tangible machine-readable storage medium is expressly defined to include any type of computer or machine-readable storage device or disk and exclude propagating signals and all transmission media. Additionally or alternatively, the example methods of FIGS. 20 and 21 may be implemented using coded instructions stored on a non-transitory machine-readable medium in which information is stored for any duration, which includes any type of computer or machine readable storage device or disk and excludes propagating signals and transmission media.

FIG. 20 is a flowchart representative of an example method 2000 that can be executed to implement the desalination system 10 of FIGS. 1A and 1B and/or the desalination control system 1900 of FIG. 19. The example method 2000 of FIG. 20 begins by providing an HDH system for processing a first saline fluid to produce at least some freshwater in a dehumidifier (block 2002). In some examples, the HDH system 14 of FIGS. 1A and 1B is provided, which is structured and/or configured to process the first saline fluid 22 to produce the first portion 56 of the freshwater 24 in the dehumidifier 20, as previously discussed.

The example method 2000 of FIG. 20 also includes providing an AD system for processing a second saline fluid to produce at least some freshwater in a condenser (block 2004). In some examples, the AD system 16 of FIGS. 1A and 1B is provided, which is structured and/or configured to process the second saline fluid 34 to produce the second portion 90 of the freshwater 24 in the condenser 32, as previously discussed.

The example method 2000 of FIG. 20 also includes operatively coupling the HDH system and the AD system together to form a desalination system of interest (block 2006). In some examples, the HDH system 14 of FIGS. 1A and 1B and the AD system 16 are operatively coupled together to form the desalination system 10 such that heat exhausted by the first bed 26 and/or the second bed 28 is transferable via the condenser 32 from the vapor 40, which is obtained from the second saline fluid 34, to the first saline fluid 22 to drive the HDH system 14.

The example method 2000 of FIG. 20 also includes driving the HDH system via heat exhausted by the AD system (block 2008). In some examples, the desalination control system 1900 of FIG. 19 drives (e.g., via the fluid control interface 1902) the HDH system 14 via heat exhausted from AD system 16, which is discussed further below in connection with FIG. 21. In such examples, the desalination control system 1900 opens the fourth valve 157 to convey the vapor 40 from the second bed 28 to the condenser 32 while the primary heating source 36 heats the second bed 28. Additionally or alternatively, the desalination control system 1900 opens the second valve 155 to convey the vapor 40 from the first bed 26 to the condenser 32 while the primary heating source 36 heats the first bed 26.

The example method 2000 of FIG. 20 also includes synchronizing processes associated with beds of the AD system (block 2010). In some examples, the desalination control system 1900 of FIG. 19 synchronizes (e.g., via the fluid control interface 1902 and/or the data analyzer 1908) the processes associated with the respective first and second beds 26, 28 of the AD system 16. In such examples, the desalination control system 1900 controls, via the valve actuator(s) 1918, one or more (e.g., all) of the first valve 154, the second valve 155, the third valve 156, and/or the fourth valve 157 to synchronize (a) the first adsorption and desorption processes associated with the first bed 26 and (b) the second adsorption and desorption processes associated with the second bed 28. As a result of such synchronization, the first bed 26 and the second bed. 28 alternate exhausting heat for driving HDH tom 14 during operation of the desalination system 10.

The example method 2000 of FIG. 20 also includes cooling the first saline fluid or an external environment via a portion of the second saline fluid in an evaporator (block 2012). In some examples, the desalination control system 1900 of FIG. 19 cools (e.g., via the fluid control interface 1902) the first saline fluid 22 or the external environment 188 via a portion of the second saline fluid 34 in the evaporator 30. For example, the desalination control system 1900 opens the throttling device 180 to convey at least some of the second saline fluid 34 from the humidifier 18 to the evaporator 30. Then, in some examples, to cool the first saline fluid 22, the desalination control system 1900 controls the pump(s) 1916 to convey the first saline fluid 22 from the saline fluid source 104 to the evaporator 30 such that heat transfer occurs in the evaporator 30 between the first saline fluid 22 and the second saline fluid 34 (e.g., see FIG. 1A). As such, in some examples at block 2012, the example method 2000 of FIG. 20 also includes transferring, via the evaporator 30, heat from the first saline fluid 22 to a portion of the second saline fluid 34 in the evaporator 30 before the first saline fluid 22 is conveyed from the evaporator 30 to the dehumidifier 20 (e.g., see FIG. 1B).

Additionally or alternatively, to cool the external environment 188 while at least a portion of the second saline fluid 34 is in the evaporator 30, the desalination control system 1900 controls the pump(s) 1916 to convey the third auxiliary fluid 190 to the evaporator 30 such that heat transfer occurs in the evaporator 30 between the third auxiliary fluid 190 and the second saline fluid 34. As such, in some examples at block 2012, the example method 2000 of FIG. 20 also includes transferring, via the evaporator 30, heat from the third auxiliary fluid 190 to a portion of the second saline fluid 34 in the evaporator 30 before the third auxiliary fluid 190 is conveyed from the evaporator 30 to the external environment 188. That is, in such examples, the third auxiliary fluid 190, which has now been cooled, is conveyable from the evaporator 30 to the external environment 188 for further heat exchange.

The example method 2000 of FIG. 20 also includes determining whether to cease fresh water production associated with the desalination system of interest (block 2014). In some examples, the desalination control system 1900 of FIG. 19 determines (e.g., via the data analyzer 1908) whether to cease freshwater production associated with the desalination system 10. In such examples, if the desalination control system 1900 provides a negative determination (block 2014: NO), control of the example method 2000 of FIG. 20 returns to block 2008. On the other hand, if the desalination control system 1900 provides a positive determination (block 2014: YES), the example method 2000 of FIG. 20 ends.

Although the example method 2000 is described in connection with the flowchart of FIG. 20, one or more other methods of implementing the example desalination system 10 and/or the example desalination control system 1900 may alternatively be used. For example, the order of execution of the blocks 2002, 2004, 2006, 2008, 2010, 2012, 2014 may be changed, and/or at least some operations of the blocks 2002, 2004, 2006, 2008, 2010, 2012, 2014 described may be changed, eliminated, or combined.

FIG. 21 is a flowchart representative of an example method 2008 that may be executed to implement the example desalination control system 1900 of FIG. 19 to drive an HDH system via heat exhausted by an AD system. Example operations of blocks 2102, 2104, 2106 may be used to implement block 2008 of FIG. 20. In particular, the example method 2008 of FIG. 21 is effective in driving the HDH system 16 of FIGS. 1A and 1B via heat exhausted by the AD system 14.

The example method of 2008 of FIG. 21 begins by heating a bed to provide a vapor from a portion of the second saline fluid rejected by a humidifier (block 2102). In some examples, the desalination control system 1900 of FIG. 19 heats (e.g., via the fluid control interface 1902) the first bed 26 and/or the second bed 28 to provide the vapor 40. For example, the desalination control system 1900 controls the heating element(s) 1914 and/or the pump(s) 1916 to supply the second auxiliary fluid 130 to the first bed 26 and/or the second bed 28. As previously mentioned, the vapor 40 of FIGS. 1A and 1B originates from a portion of the second saline fluid 34 that is rejected by the humidifier 18 and provided to the evaporator 30 for evaporation of the second saline fluid 34.

The example method of 2008 of FIG. 21 also includes conveying the vapor from the bed to a condenser fluidly interposed between the humidifier and the dehumidifier (block 2104). In some examples, the desalination control system 1900 of FIG. 19 conveys (e.g., via the fluid control interface 1902) the vapor 40 from the first bed 26 and/or the second bed 28 to the condenser 32. As previously mentioned, the condenser 32 of FIGS. 1A and 1B is fluidly interposed between the humidifier 18 and the dehumidifier 20 of the HDH system 14. In such examples, the desalination control system 1900 controls, via the valve actuator(s) 1918, the position of the second valve 155 and/or the position of the fourth valve 157 to allow the vapor 40 to flow to the condenser 32.

The example method of 2008 of FIG. 21 also includes transferring, via the condenser, heat from the vapor to air circulating through the humidifier and the dehumidifier (block 2106). In some examples, the condenser 32 of FIGS. 1A and 1B is configured to transfer heat from the vapor 40 to the air 42 circulating through the humidifier 18 and the dehumidifier 20, which increases the temperature of the air 42.

After performing the operation of block 2106, the example method 2008 of FIG. 21 returns to a calling function such as the example method 2000 of FIG. 20.

Although the example method 2008 is described in connection with the flowchart of FIG. 21, one or more other methods of implementing the example desalination control system 1900 may alternatively be used. For example, the order of execution of the blocks 2102, 2104, 2106 may be changed, and/or at least some operations of the blocks 2102, 2104, 2106 described may be changed, eliminated, or combined.

Figure 22:
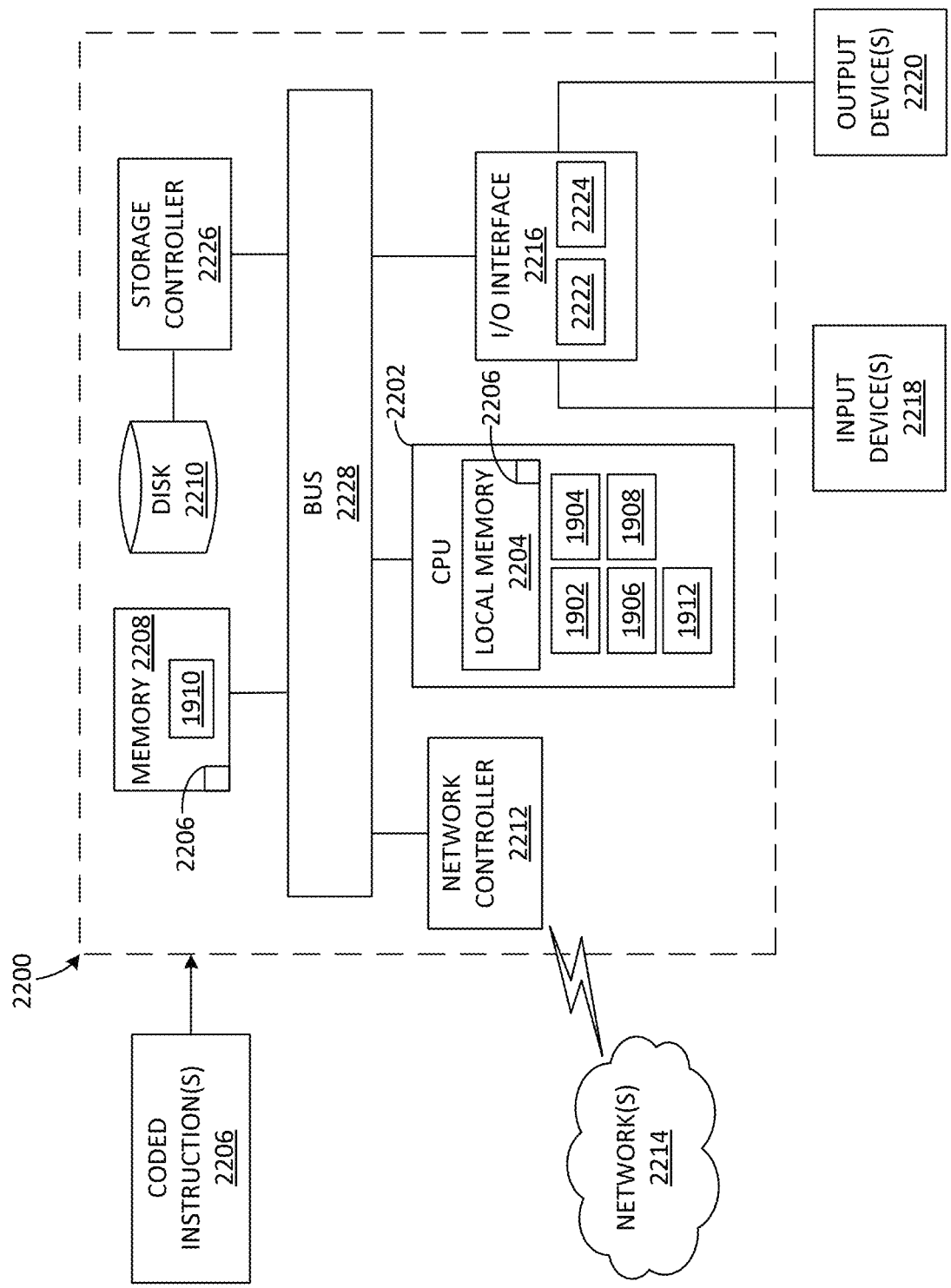
FIG. 22 is a block diagram of an example processor platform structured to execute instructions to carry out the methods of FIGS. 20 and 21 and/or, more generally, to implement the desalination control system 1900 of FIG. 19.

FIG. 22 is a block diagram of an example processor platform 2200 structured to execute instructions to carry out the methods of FIGS. 20 and 21 and/or, more generally, to implement the desalination control system 1900 of FIG. 19. For example, the processor platform 2200 can be a personal computer, a server, a mobile device (e.g., a cell phone, a smart phone, a tablet, etc.) or any other type of computing device. According to the illustrated example of FIG. 22, the processor platform 2200 includes a central processing unit (CPU) 2202 (sometimes referred to as a processor), which is hardware (e.g., one or more integrated circuits, logic circuits, microprocessors, etc.). The CPU 2202 of FIG. 22 includes a local memory 2204 such as, for example, a cache. According to the illustrated example of FIG. 22, the CPU 2202 implements the example fluid control interface 1902, the example sensor interface 1904, the example user interface 1906, and the example data analyzer 1908, and the example network interface 1912.

Coded instruction(s) 2206 to implement the methods of FIGS. 20 and 21 may be stored in a main memory 2208 of the processing platform 2200. The memory 2208 may include a volatile memory (e.g., random access memory device(s) such as Dynamic Random Access Memory (DRAM)) and a non-volatile memory (e.g., flash memory). Such processes and/or instructions may also be stored on a storage medium disk 2210 associated with the processor platform 2200, such as a hard drive (HDD) or portable storage medium, or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the processing platform 2200 communicates, such as a server or computer for example.

Further, the claimed advancements may be provided as a utility application, background daemon, or component of an operating system, or combination thereof, executing in conjunction with the CPU 2202 and an operating system such as, for example, Microsoft Windows 7, Microsoft Windows 10, UNIX, Solaris, LINUX, Apple MAC-OS or any other system(s) known to those skilled in the art.

The hardware elements in order to achieve the processing platform 2200 may be realized by various circuitry elements, known to those skilled in the art. For example, the CPU 2202 may be a Xenon or Core processor from Intel of America or an Opteron processor from AMD of America, or may be other processor types that would be recognized by one of ordinary skill in the art. Alternatively, the CPU 2202 may be implemented on an FPGA, ASIC, PLD or using discrete logic circuits, as one of ordinary skill in the art would recognize. Further, the CPU 2202 may be implemented as multiple processors cooperatively working in parallel to perform the instructions of the inventive processes described above.

In some examples, the processor platform 2200 of FIG. 22 also includes a network controller 2212 such as, for example, an Intel Ethernet PRO network interface card from Intel Corporation of America for interfacing with one or more networks 2214. As can be appreciated, the network(s) 2214 can be one or more public networks (e.g., the Internet), private networks (e.g., a local area network (LAN), a wide area network (WAN), etc.) and/or sub-networks (e.g., a public switched telephone network (PSTN), an integrated services digital network (ISDN), etc.). The network(s) 2214 can also be wired, such as an Ethernet network, or can be wireless such as a cellular network including EDGE, 3G and 4G wireless cellular systems. The wireless network can also be WiFi, Bluetooth, or any other wireless form of communication that is known.

The processing platform 2200 of FIG. 22 includes a general purpose I/O interface circuit 2216 that interfaces and/or otherwise communicates with one or more input devices 2218 and/or one or more output devices 2220. The I/O interface circuit 2216 of FIG. 22 may be implemented as an Ethernet interface, a universal serial bus (USB), a PCI express interface, and/or any other type of standard interface.

The input devices 2218 are connected to the I/O interface 2216 and may include, for example, a keyboard, a mouse, a touchscreen, a button, a microphone, a voice recognition system, a camera, and/or any other suitable device(s) for enabling a user to input data and/or commands to the CPU 2202.

The output device(s) 2220 are also connected to the I/O interface circuit 2216 and may include display devices such as, for example, a light-emitting diode (LED), a liquid crystal display, a touchscreen, a printer, a scanner (e.g., an OfficeJet or DeskJet from Hewlett Packard), a speaker, and/or any other device(s) for providing or presenting information (e.g., visual information and/or audible information) to a user. As such, in some examples, the I/O interface circuit 2216 includes a display controller 2222 such as, for example, a NVIDIA GeForce GTX or Quadro graphics adaptor from NVIDIA Corporation of America for interfacing with a display (e.g., a Hewlett Packard HPL2445w LCD monitor). Additionally, in some examples, the I/O interface circuit includes a sound controller 2224 such as, for example, Sound Blaster X-Fi Titanium from Creative, to interface with a speaker and/or a microphone.

The processor platform 2200 of FIG. 22 also includes a general purpose storage controller 2226 that connects the storage medium disk 2210 with a communication bus 2228. The storage controller 2226 may also control access to the memory 2208. The communication bus 2228 of FIG. 22 may be an ISA, EISA, VESA, PCI, etc. for interconnecting all of the components of the processor platform 2200. For example, the CPU 2202 communicates with the main memory 2208 via the bus 2228.

It will be appreciated that the desalination systems, apparatus, and related methods for use with saline fluids disclosed in the foregoing description provide numerous advantages. Examples disclosed herein provide a desalination system including an HDH system and an AD system that are operatively coupled together. Examples disclosed herein provide a single heating source for operating both the HDH system and the AD system. As a result, examples disclosed herein reduce costs associated with freshwater production and/or improve performance of the desalination system. Additionally, some disclosed examples provide a cooling effect via an AD evaporator, which can be advantageously used to further improve system performance and/or for air conditioning purposes.

Although certain example systems, apparatus, methods, and articles of manufacture have been disclosed herein, the scope of coverage of this patent is not limited thereto. Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

What is claimed is:

1. A desalination system, comprising:
a humidification-dehumidification (HDH) system including a humidifier and a dehumidifier that, together, are configured to process a first saline fluid to produce freshwater in the dehumidifier; and
an adsorption desalination (AD) system operatively coupled to the HDH system, the AD system including a first bed, a second bed, an evaporator, and a condenser that, together, are configured to process a second saline fluid to produce freshwater in the condenser,
wherein:
the condenser is configured to transfer heat exhausted by the first or second bed from a vapor, obtained from the second saline fluid, to air circulating through the humidifier and the dehumidifier to drive the HDH system, and
the evaporator is configured to provide a cooling effect to a refrigerant.

2. The desalination system of claim 1, further including a single heating source configured for use with both the HDH system and the AD system.

3. The desalination system of claim 1, wherein the HDH system and the AD system provide a gained output ratio of about 7.6 or more during operation of the desalination system.

4. The desalination system of claim 1, wherein:
each of the first and second beds is fluidly coupled between the evaporator and the condenser, and
the evaporator is fluidly coupled to the humidifier and configured to receive the second saline fluid from the humidifier.

5. The desalination system of claim 4, wherein:
the evaporator is fluidly coupled to the dehumidifier, and
the evaporator is configured to cool, via the second saline fluid, the first saline fluid before the first saline fluid is conveyed from the evaporator to the dehumidifier.

6. The desalination system of claim 4, wherein the evaporator is configured to cool, via the second saline fluid, the refrigerant.

7. The desalination system of claim 6, wherein:
the first bed is fluidly coupled to the dehumidifier, and
the first saline fluid cools the first bed when the first saline fluid is conveyed through the first bed from a fluid source to the dehumidifier.

8. The desalination system of claim 4, further including a throttling device operatively interposed between the humidifier and the evaporator, the throttling device configured to adjust one or more fluid parameters associated with the second saline fluid when the second saline fluid passes across the throttling device.

9. The desalination system of claim 4, wherein the AD system further includes:
a first valve operatively interposed between the first bed and the evaporator;
a second valve operatively interposed between the first bed and the condenser;
a third valve operatively interposed between the second bed and the evaporator;
a fourth valve operatively interposed between the second bed and the condenser; and
a controller configured to control, via one or more valve actuators, the first, second, third, and fourth valves to synchronize (a) first adsorption and desorption processes associated with the first bed and (b) second adsorption and desorption processes associated with the second bed.

10. The desalination system of claim 9, wherein the first and second beds alternate exhausting the heat for the condenser during operation of the desalination system.

11. The desalination system of claim 9, wherein:
the second valve is configured to control a flow of the vapor from the first bed to the condenser based on a position of the second valve, and
the fourth valve is configured to control a flow of the vapor from the second bed to the condenser based on a position of the fourth valve.

12. The desalination system of claim 1, wherein:
the dehumidifier is fluidly coupled between the humidifier and a saline fluid source associated with supplying the first saline fluid, and
the first saline fluid is conveyable through the dehumidifier from the fluid source to the humidifier.

13. The desalination system of claim 12, wherein the humidifier includes one or more nozzles operatively coupled thereto, the one or more nozzles configured to receive the first saline fluid from the dehumidifier and spray the first saline fluid in the humidifier.

14. The desalination system of claim 12, wherein:
   the condenser is fluidly coupled between the humidifier and the dehumidifier, and
   the air is conveyable through the condenser from the humidifier to the dehumidifier.

15. A method for providing a desalination system, comprising:
   providing an HDH system including a humidifier and a dehumidifier that, together, are configured to process a first saline fluid to produce freshwater in the dehumidifier;
   providing an AD system including a first bed, a second bed, an evaporator, and a condenser that, together, are configured to process a second saline fluid to produce freshwater in the condenser; and
   operatively coupling the HDH system and the AD system together such that heat exhausted by the first or second bed is transferrable via the condenser from a first vapor, obtained from the second saline fluid, to the first saline fluid to drive the HDH system.

16. A desalination method, comprising:
   processing a first saline fluid via an HDH system to produce freshwater in a dehumidifier of the HDH system;
   processing a second saline fluid via an AD system to produce freshwater in a condenser of the AD system;
   transferring, via the condenser, heat exhausted by a first or second bed of the AD system from a vapor, obtained from the second saline fluid, to the first saline fluid to drive the HDH system; and
   providing a cooling effect to a refrigerant via an evaporator of the AD system.

17. The desalination method of claim 16, further including transferring, via the evaporator, heat from the first saline fluid to a portion of the second saline fluid in the evaporator before the first saline fluid is conveyed from the evaporator to the dehumidifier.

18. The desalination method of claim 16, further including transferring, via the evaporator, heat from an auxiliary fluid to a portion of the second saline fluid in the evaporator before the auxiliary fluid is conveyed from the evaporator to the refrigerant.

19. The desalination method of claim 18, further including synchronizing heating and cooling processes of a first bed of the AD system with heating and cooling processes associated with a second bed of the AD system.

* * * * *